US009074379B2

(12) United States Patent
Ciuperca

(10) Patent No.: US 9,074,379 B2
(45) Date of Patent: Jul. 7, 2015

(54) HYBRID INSULATED CONCRETE FORM AND METHOD OF MAKING AND USING SAME

(71) Applicant: Romeo Ilarian Ciuperca, Norcross, GA (US)

(72) Inventor: Romeo Ilarian Ciuperca, Norcross, GA (US)

( * ) Notice: Subject to any disclaimer, the term of this patent is extended or adjusted under 35 U.S.C. 154(b) by 16 days.

(21) Appl. No.: 13/834,697

(22) Filed: Mar. 15, 2013

(65) Prior Publication Data

US 2014/0263942 A1 Sep. 18, 2014

(51) Int. Cl.

| | |
|---|---|
| ***B28B 7/02*** | (2006.01) |
| ***B28B 7/34*** | (2006.01) |
| ***E04C 5/16*** | (2006.01) |
| ***E04G 17/04*** | (2006.01) |
| ***B29C 33/02*** | (2006.01) |
| ***E04G 11/12*** | (2006.01) |
| ***E04G 17/065*** | (2006.01) |
| ***E04B 2/86*** | (2006.01) |
| ***E04G 17/14*** | (2006.01) |
| *B28B 7/00* | (2006.01) |

(Continued)

(52) U.S. Cl.

CPC .............. *E04G 17/047* (2013.01); *B29C 33/02* (2013.01); *B28B 7/346* (2013.01); *B28B 7/0032* (2013.01); *E04G 9/065* (2013.01); *B28B 7/348* (2013.01); *E04G 2009/028* (2013.01); *E04G 11/12* (2013.01); *E04G 17/0658* (2013.01); *E04B 1/4178* (2013.01); *E04B 2/8647* (2013.01); *E04B 2002/867* (2013.01); *E04B 2002/8682* (2013.01); *E04B 2002/8688* (2013.01); *E04G 17/14* (2013.01)

(58) Field of Classification Search

CPC ... E04G 17/047; E04G 17/14; E04G 17/0658; E04G 11/12; E04G 9/065; E04B 2/8647; E04B 2002/8682; E04B 2002/8688; E04C 5/20; B28B 7/0014; B28B 7/0032; B28B 7/346; B28B 7/348

USPC ................. 249/40–41, 78–80, 134, 148, 163, 249/189–190, 216, 168, 169; 52/309.7, 52/309.11; 264/333

See application file for complete search history.

(56) References Cited

U.S. PATENT DOCUMENTS 1,723,631 A * 8/1929 Pollock et al. .................. 249/42
1,830,397 A * 11/1931 Kleitz ............................ 249/38

(Continued)

FOREIGN PATENT DOCUMENTS

EP 0031167 A2 7/1981
EP 2065530 A2 6/2009
WO WO 2011123526 A2 * 10/2011

OTHER PUBLICATIONS

Notice of Allowance mailed Sep. 25, 2014 in U.S. Appl. No. 13/626,087, filed Sep. 25, 2012.

(Continued)

*Primary Examiner* — Dimple Bodawala

(74) *Attorney, Agent, or Firm* — Robert E. Richards; Richards IP Law

(57) ABSTRACT

The invention comprises a product. The product comprises a foam insulating panel having a first primary surface and an opposite second primary surface. A removable concrete form is spaced from the foam insulating panel and a concrete receiving space is defined between the second primary surface of the foam insulating panel and the removable concrete form. A method of using a hybrid insulated concrete form is also disclosed.

18 Claims, 35 Drawing Sheets

(51) Int. Cl.
*E04G 9/06* (2006.01)
*E04G 9/02* (2006.01)
*E04B 1/41* (2006.01)

(56) References Cited

U.S. PATENT DOCUMENTS

| | | | | | |
|---|---|---|---|---|---|
| 2,053,135 | A | | 10/1935 | Dalton | |
| 2,057,732 | A | * | 10/1936 | Navarre | 249/19 |
| 2,887,757 | A | * | 5/1959 | Miles | 52/699 |
| 3,168,772 | A | * | 2/1965 | Williams | 249/42 |
| 3,732,138 | A | | 5/1973 | Almog | |
| 3,985,329 | A | | 10/1976 | Liegens | |
| 4,052,031 | A | | 10/1977 | Melfi | |
| 4,090,336 | A | | 5/1978 | Carroll | |
| 4,138,892 | A | | 2/1979 | Davis | |
| 4,516,372 | A | | 5/1985 | Grutsch | |
| 4,646,498 | A | | 3/1987 | Schneller et al. | |
| 4,765,109 | A | | 8/1988 | Boeshart | |
| 4,866,897 | A | | 9/1989 | Yount | |
| 4,885,888 | A | | 12/1989 | Young | |
| 4,889,310 | A | | 12/1989 | Boeshart | |
| 5,107,648 | A | | 4/1992 | Roby | |
| 5,497,592 | A | * | 3/1996 | Boeshart | 52/699 |
| 5,735,093 | A | * | 4/1998 | Grutsch | 52/309.11 |
| 5,761,874 | A | * | 6/1998 | Hayakawa | 52/701 |
| 5,809,723 | A | | 9/1998 | Keith et al. | |
| 5,809,728 | A | | 9/1998 | Tremelling | |
| 5,966,885 | A | | 10/1999 | Chatelain | |
| 5,987,830 | A | * | 11/1999 | Worley | 52/309.11 |
| 6,079,176 | A | | 6/2000 | Westra et al. | |
| 6,138,981 | A | | 10/2000 | Keith et al. | |
| 6,263,638 | B1 | * | 7/2001 | Long, Sr. | 52/794.1 |
| 6,305,135 | B1 | | 10/2001 | Inaba | |
| 6,612,083 | B1 | | 9/2003 | Richards | |
| 6,688,066 | B1 | | 2/2004 | Cottier et al. | |
| 6,725,616 | B1 | | 4/2004 | Pease | |
| 6,898,912 | B2 | * | 5/2005 | Bravinski | 52/426 |
| 6,945,506 | B2 | * | 9/2005 | Long, Sr. | 249/213 |
| 7,254,925 | B2 | * | 8/2007 | Stefanutti et al. | 52/309.9 |
| 7,934,693 | B2 | | 5/2011 | Bravinski | |
| 8,532,815 | B1 | * | 9/2013 | Ciuperca | 700/198 |
| 8,545,749 | B2 | | 10/2013 | Ciuperca | |
| 8,555,583 | B2 | * | 10/2013 | Ciuperca | 52/309.12 |
| 8,555,584 | B2 | * | 10/2013 | Ciuperca | 52/309.7 |
| 8,636,941 | B1 | | 1/2014 | Ciuperca | |
| 8,745,943 | B2 | * | 6/2014 | Ciuperca | 52/309.7 |
| 8,756,890 | B2 | * | 6/2014 | Ciuperca | 52/426 |
| 8,844,227 | B1 | * | 9/2014 | Ciuperca | 52/309.11 |
| 8,877,329 | B2 | * | 11/2014 | Ciuperca | 428/215 |
| 2003/0170093 | A1 | * | 9/2003 | Janeway | 411/548 |
| 2003/0192272 | A1 | | 10/2003 | Bravinski | |
| 2004/0118063 | A1 | * | 6/2004 | Shidler | 52/309.11 |
| 2004/0177580 | A1 | * | 9/2004 | Tremelling | 52/426 |
| 2005/0108985 | A1 | | 5/2005 | Bravinski | |
| 2006/0080923 | A1 | * | 4/2006 | Fleischhacker | 52/403.1 |
| 2008/0041004 | A1 | | 2/2008 | Gibbar et al. | |
| 2008/0173788 | A1 | * | 7/2008 | Brewka et al. | 249/189 |
| 2009/0173870 | A1 | | 7/2009 | Long, Sr. | |
| 2009/0229205 | A1 | * | 9/2009 | Bradley | 52/309.12 |
| 2009/0229214 | A1 | * | 9/2009 | Nelson | 52/700 |
| 2009/0242729 | A1 | * | 10/2009 | Ward | 249/40 |
| 2010/0319295 | A1 | * | 12/2010 | Nelson | 52/677 |
| 2011/0131892 | A1 | | 6/2011 | Del Pino | |
| 2011/0239566 | A1 | * | 10/2011 | Ciuperca et al. | 52/259 |
| 2012/0058299 | A1 | | 3/2012 | Serwin | |
| 2013/0074432 | A1 | * | 3/2013 | Ciuperca | 52/309.4 |
| 2013/0074433 | A1 | * | 3/2013 | Ciuperca | 52/426 |
| 2014/0041329 | A1 | * | 2/2014 | Ciuperca | 52/309.4 |
| 2014/0084132 | A1 | | 3/2014 | Ciuperca | |
| 2014/0087158 | A1 | * | 3/2014 | Ciuperca | 428/215 |
| 2014/0174647 | A1 | * | 6/2014 | Ciuperca | 156/253 |
| 2014/0212643 | A1 | * | 7/2014 | Ciuperca | 428/210 |
| 2014/0260034 | A1 | * | 9/2014 | Ciuperca | 52/405.3 |
| 2014/0332658 | A1 | * | 11/2014 | Ciuperca | 249/40 |
| 2014/0333010 | A1 | * | 11/2014 | Ciuperca | 264/338 |
| 2015/0007524 | A1 | * | 1/2015 | Ciuperca | 52/741.4 |

OTHER PUBLICATIONS

International Search Report and Written Opinion issued Sep. 3, 2014, International Application No. PCT/US2014/27329.
Office Action mailed Oct. 9, 2014 in U.S. Appl. No. 13/626,103, filed Sep. 25, 2012.
Response file Dec. 3, 2014 in U.S. Appl. No. 14/229,566, filed Mar. 28, 2014.
Second Preliminary Amendment file Dec. 3, 2014 in U.S. Appl. No. 14/311,310, filed Jun. 22, 2014.
U.S. Appl. No. 14/531,644, filed Nov. 3, 2014.
Preliminary Amendment filed Nov. 3, 2014 in U.S. Appl. No. 14/531,644, filed Nov. 3, 2014.
Office Action mailed Oct. 10, 2014 in U.S. Appl. No. 14/227,490, filed Mar. 27, 2014.
Amendment and Response to Office Action filed Dec. 3, 2014 in U.S. Appl. No. 14/229,566, filed Mar. 28, 2014.
U.S. Appl. No. 14/229,566, filed Mar. 28, 2014.
U.S. Appl. No. 14/227,490, filed Mar. 27, 2014.
Preliminary Amendment filed on Mar. 27, 2014 in U.S. Appl. No. 14/227,490, filed Mar. 27, 2014.
U.S. Appl. No. 14/040,965, filed Sep. 30, 2013.
Office Action mailed Apr. 18, 2014 in U.S. Appl. No. 14/040,965, filed Sep. 30, 2013.
Response filed May 23, 2014 in U.S. Appl. No. 14/040,965, filed Sep. 30, 2013.
U.S. Appl. No. 13/626,087, filed Sep. 25, 2012.
Response filed May 7, 2014 in U.S. Appl. No. 13/626,087, filed Sep. 25, 2012.
Office Action mailed Mar. 3, 2014 in U.S. Appl. No. 13/626,087, filed Sep. 25, 2012.
Office Action mailed Mar. 27, 2014 in U.S. Appl. No. 13/834,574, filed Mar. 15, 2013.
Office Action mailed Jul. 3, 2014 in U.S. Appl. No. 13/834,574, filed Mar. 15, 2013.
Response filed Mar. 23, 2014 in U.S. Appl. No. 13/834,574, filed Mar. 15, 2013.
U.S. Appl. No. 13/834,574, filed Mar. 15, 2013.
U.S. Appl. No. 13/834,697, filed Mar. 15, 2013.

* cited by examiner

HYBRID INSULATED CONCRETE FORM AND METHOD OF MAKING AND USING SAME

FIELD OF THE INVENTION

The present invention generally relates to insulated concrete forms. More particularly, this invention relates to an insulated concrete form that is stronger than conventional insulated concrete forms so that it can hold the weight of a full lift of concrete and extend from floor to ceiling. The present invention also relates to an insulated concrete form that is easier to assemble and easier to use. The present invention relates to a concrete form in which one side of the form provides integral insulation that remains attached to the wall while the other side of the form is removed once the concrete hardens. The present invention also relates to an insulated concrete form that results in stronger concrete cured therein. The present invention also relates to an insulated concrete form that produces a wall that resists or prevents water intrusion. The present invention also relates to methods of using the hybrid insulated concrete form of the present invention. The present invention also related to a concrete structure that has a longer useful life than conventional concrete structures. The present invention further relates to a high efficiency building system that reduces energy consumption. The present invention also relates to a modular structure, such as a home or building that is relatively inexpensive to construct.

BACKGROUND OF THE INVENTION

Concrete walls, and other concrete structures, traditionally have been made by building a form. The forms are usually made from plywood, wood, metal and other structural members. Unhardened (i.e., plastic) concrete is poured into the space defined by opposed spaced form members. Once the concrete hardens sufficiently, although not completely, the forms are removed leaving a concrete wall, or other concrete structure or structural member in place.

Historically concrete has been placed in forms made of plywood reinforced by different types of framing members. Concrete has high thermal mass and since most concrete buildings are built using conventional forms, the concrete assumes the ambient temperature. Concrete buildings are exposed to ambient temperatures therefore making them as hot or as cold as the environment. Thus, although they have many advantages, concrete buildings have relatively poor energy efficiency.

Insulated concrete form systems are known in the prior art and typically are made from a plurality of modular form members. In order to assist in keeping the modular form members properly spaced when concrete is poured between the stacked form members, transverse tie members are used in order to prevent transverse displacement or rupture of the modular form members due to the hydrostatic pressure created by fluid and unhardened concrete contained therein. U.S. Pat. Nos. 5,497,592; 5,809,725; 6,668,503; 6,898,912 and 7,124,547 (the disclosures of which are all incorporated herein by reference) are exemplary of prior art modular insulated concrete form systems.

Insulated concrete forms reduce heat transmission and provide improved energy efficiency to the building in which they are used. However the insulated concrete forms of the prior art have multiple shortcomings.

Concrete is a relatively heavy material. It weighs approximately 2400 lbs per cubic yard. When placed into a vertical form in a plastic state, the pressure at the bottom of a form filled with concrete is measured by multiplying the height of the wall by 150 lbs per square foot. In other words when pouring a 10 feet tall wall, the pressure at the bottom of a form will be 1,500 lbs/ft$^2$. In addition, safety codes and various concrete regulating bodies demand that commercial forms be built to withstand approximately 2.5 times the static concrete pressure a form is actually intended to hold.

Conventional forms typically use aluminum or some type of plywood reinforced by a metal framing system. Opposed form members are held together by a plurality of metal ties that provide the form with the desired pressure rating. Conventional forms are designed to be strong, safe and durable to meet the challenges of any type construction, residential or commercial, low-rise or high-rise, walls, columns, piers or elevated slabs. While insulated concrete forms of the prior art provide relatively high energy efficiency, they lack the strength to withstand the relatively high fluid concrete pressures experienced by conventional concrete forms. Consequently, they are relegated mostly to residential construction or low-rise construction and find few applications in commercial construction.

In order to achieve relatively high energy efficiency, one can insulate concrete in a variety of method. One such method uses insulated concrete forms made from foams with relatively high R values. However all types of foam have relatively low strength and structural properties. Therefore, insulated concrete forms of the prior art are relatively weak and cannot withstand the same high pressures experienced by conventional forms. Prior art insulated concrete forms have attempted to solve this problem by using higher density foams and/or by using a high number of ties between the foam panel members. However, such prior art insulated concrete form systems still suffer from several common problems.

First, all insulated concrete forms are made of two opposing foam panels connected by a plurality of connecting ties. The concrete is placed between the foam panels in a plastic state. Once the concrete hardens the form stays in place whereby both foam panels are attached to the inside and outside face of the concrete wall, respectively. The ties anchor each layer of the foam panels into the concrete. In this configuration, the concrete thermal mass is mostly if not completely encapsulated within the two foam panels. Therefore, the concrete wall has a foam panel attached to both the inside and outside face. In many cases it is not necessary to insulate both the inside and outside face of the wall. Since concrete has a high thermal mass, it may be desirable in certain cases that the thermal mass be exposed to the climate controlled inside of the building. In same cases, it may be desirable for the concrete wall to be exposed to the outside while the concrete face facing the inside of the building needs to be insulated. State of the art insulated concrete forms are not designed to have any of the foam panels removed, they are only designed to stay in place. If only one side of the concrete requires an insulating foam panel, it would be very difficult, expensive and time consuming to remove the other foam panel from an insulated concrete form once the concrete has been cured. Conventional concrete forms are designed to be removed once the concrete has achieved a desired strength. However, conventional concrete forms do not provide insulation to the concrete wall, either during concrete curing or after removal.

Second, in the construction of an exterior wall of a building, multiple insulated concrete form modules are stacked upon and/or placed adjacent to each other in order to construct a concrete form of a desired height, length and configuration. In some insulated concrete form systems, the form spacers/interconnectors are placed in the joints between adjacent concrete form modules. Such form systems are not strong enough to build a form more than a few feet high. Concrete is then placed in the form and allowed to harden sufficiently before another course of insulating forms are added on top of the existing forms. Such systems result in cold joints between the various concrete layers necessary to form a floor-to-ceiling wall or a multi-story building. Cold joints in a concrete wall weaken the wall therefore requiring that the wall be thicker and/or use higher strength concrete than would otherwise be necessary with a wall that did not have cold joints. This generally limits current use of insulated concrete forms to buildings of a single story or two in height or to infill wall applications.

Third, the use of multiple form modules to form a wall, or other building structure, creates numerous joints between adjacent concrete form modules; i.e., between both horizontally adjacent form modules and vertically adjacent form modules. The sum of all these joints makes the prior art insulated concrete forms inherently unstable and concrete blowouts are not uncommon. Since the wall forms are unstable, the use of additional forming materials, such as plywood, to stabilize the modular insulated concrete forms is required before concrete is poured. These additional materials are costly and time consuming to install. The multiple joints also provide numerous opportunities for water to seep into and through the concrete wall. Furthermore, some of the prior art wall spacer systems create holes in the insulated concrete forms through which water can seep, either in or out. Thus, the prior art modular insulated concrete forms do little, or nothing, to prevent water intrusion in the finished concrete wall.

Fourth, prior art modular insulated concrete form systems are difficult and time consuming to put together, particularly at a constructions site using unskilled labor.

Fifth, prior art modular insulated concrete form systems do little, or nothing, to produce a stronger concrete wall.

Sixth, prior art modular insulated concrete form systems do not meet the high pressure ratings that conventional concrete forms do.

Seventh, prior art modular insulated concrete form systems are designed to form walls and are not suitable for forming columns or piers.

Eighth, prior art modular insulated concrete form systems do not allow for forming of structural, load bearing high-rise construction Ninth, prior art modular insulated concrete form systems only allow for one type of wall cladding to be applied, such as a directly applied finish system. To install all other wall claddings, additional systems have to be installed, sometimes at greater expense than even in the conventional concrete forming systems. Some prior art modular insulated concrete form systems do not allow for the use of other types of wall cladding systems.

U.S. Pat. Nos. 8,555,583 and 8,756,890 (the disclosures of which are both incorporated herein by reference) disclose very effective and efficient insulated concrete form systems for constructing floor-to-ceiling vertical walls. However, for certain applications or certain building designs, it may be desirable to have a vertical concrete wall that is insulated only on one side. Furthermore, in order to make a more economical insulated concrete wall, it may be desirable to insulate the concrete wall on only one side.

SUMMARY OF THE INVENTION

The present invention satisfies the foregoing needs by providing a hybrid insulated concrete form system. In a preferred disclosed embodiment, the present invention provides an insulated concrete wall that is insulated on only one side.

In one disclosed embodiment, the present invention comprises a product. The product comprises a foam insulating panel having a first primary surface and an opposite second primary surface. A removable concrete form is spaced from the foam insulating panel. A concrete receiving space is defined between the foam insulating panel and the removable concrete form.

In another disclosed embodiment, the present invention comprises a product. The product comprises a foam insulating panel having a first primary surface and an opposite second primary surface, the first primary surface of the foam insulating panel forming the exterior portion of a wall of a building. The product also comprises a concrete structure attached to and contacting the second surface of the foam insulating panel, the concrete structure forming the interior portion of the wall of the building. The foam insulating panel is adhesively attached to the concrete structure by the cement from which the concrete structure is made.

In another disclosed embodiment, the present invention comprises a product. The product comprises a foam insulating panel having a first primary surface and an opposite second primary surface, the first primary surface of the foam insulating panel forming the interior portion of a wall of a building. The product also comprises a concrete structure attached to and contacting the second surface of the foam insulating panel, the concrete structure forming the exterior portion of the wall of the building. The foam insulating panel is attached to the concrete structure by the cement from which the concrete structure is made.

In another disclosed embodiment, the present invention comprises a concrete form. The concrete form comprises a removable concrete form and a foam insulating panel spaced from the removable concrete form defining a space therebetween. The concrete form also comprises a plurality of anchor members attached to the foam insulating panel and extending into the space between the removable concrete form and the foam insulating panels such that an end of the anchor members are disposed between the foam insulating panel and the removable concrete form.

In another disclosed embodiment, the present invention comprises a method. The method comprises positioning a foam insulating panel in a desired position and positioning a removable concrete form spaced from the foam insulating panel to define a concrete receiving space therebetween.

In another disclosed embodiment, the present invention comprises a method. The method comprises positioning a foam insulating panel in a desired position and positioning a removable concrete form spaced from the foam insulating panel to define a concrete receiving space therebetween. The method also comprises placing concrete in the concrete receiving space and allowing the concrete to at least partially cure. The method further comprises removing the removable concrete form.

In yet another disclosed embodiment, the present invention comprises a method. The method comprises positioning a foam insulating panel in a desired position, the foam insulating panel having a first primary surface and an opposite second primary surface. An anchor member having a first end and an opposite second end is disposed in the foam insulating panel such that it penetrates the foam insulating panel from the first primary surface to the second primary surface and the second end of the anchor member extends outwardly from the second primary surface. The method also comprises positioning a removable concrete form spaced from the second primary surface of the foam insulating panel such that a first end of the anchor member is disposed between the foam insulating panel and the removable concrete form.

In a further disclosed embodiment, the present invention comprises a product. The product comprises a vertical wall. The vertical concrete wall has a foam insulating panel attached to only one primary side thereof. The foam insulating panel is attached to the vertical concrete wall by the cement from which the concrete wall is made.

Accordingly, it is an object of the present invention to provide an improved concrete forming system.

Another object of the present invention is to provide a hybrid insulated concrete form system.

Another object of the present invention is to provide an improved insulated concrete structure, especially an insulated vertical concrete wall.

Another object of the present invention is to provide a concrete wall that includes integrally attached insulation on only one side.

Another object of the present invention is to provide an insulated concrete form system that is relatively easy to manufacture and/or to assemble.

Still another object of the present invention is to provide an insulated concrete form system that produces stronger concrete than prior art insulated concrete form systems, or any other concrete form system.

Another object of the present invention is to provide a system for constructing a relatively high energy efficient exterior building envelope.

Another object of the present invention is to provide an insulated concrete form system that provides improved temperature stability for the curing of concrete.

A further object of the present invention is to provide an insulated concrete form system that permits the placement of concrete during cold weather, which thereby allows construction projects to proceed rather than be shutdown due to inclement weather.

Yet another object of the present invention is to provide an insulated concrete form that has a reinforcing layer on an outer surface of a foam insulating panel anchored to the concrete so that it provides a substrate for attaching wall cladding or decorative surfaces, such as ceramic tile, stone, thin brick, stucco or the like. Anchors embedded in the concrete also provide a mechanical anchor system for wall claddings.

A further object of the present invention is to provide an insulated concrete form system that can withstand pressures equivalent to conventional concrete form systems.

Another object of the present invention is to provide an insulated concrete form that retains the heat generated by the hydration of cement during the early stage of concrete setting and curing.

Another object of the present invention is to provide an integrated anchor/attachment system for relatively easy and inexpensive attachment of a variety of exterior or interior wall cladding systems.

Still another object of the present invention is to provide an insulated concrete form system that provides an improved curing environment for concrete.

Another object of the present invention is to provide an insulated concrete form system that provides a panel anchor member to which elongate panel bracing members can be attached.

A further object of the present invention is to provide an insulated concrete form system that provides a panel anchor member to which exterior or interior wall systems can be attached.

These and other objects, features and advantages of the present invention will become apparent after a review of the following detailed description of the disclosed embodiments and the appended drawing and claims.

DETAILED DESCRIPTION OF THE DISCLOSED EMBODIMENTS

U.S. Pat. Nos. 8,756,890; 8,555,584; 8532,815; 8,545,749; and 8,877,329 and U.S. Patent Application Publication No. 2014/0084132 are all incorporated herein by reference in their entirety.

Figure 1:
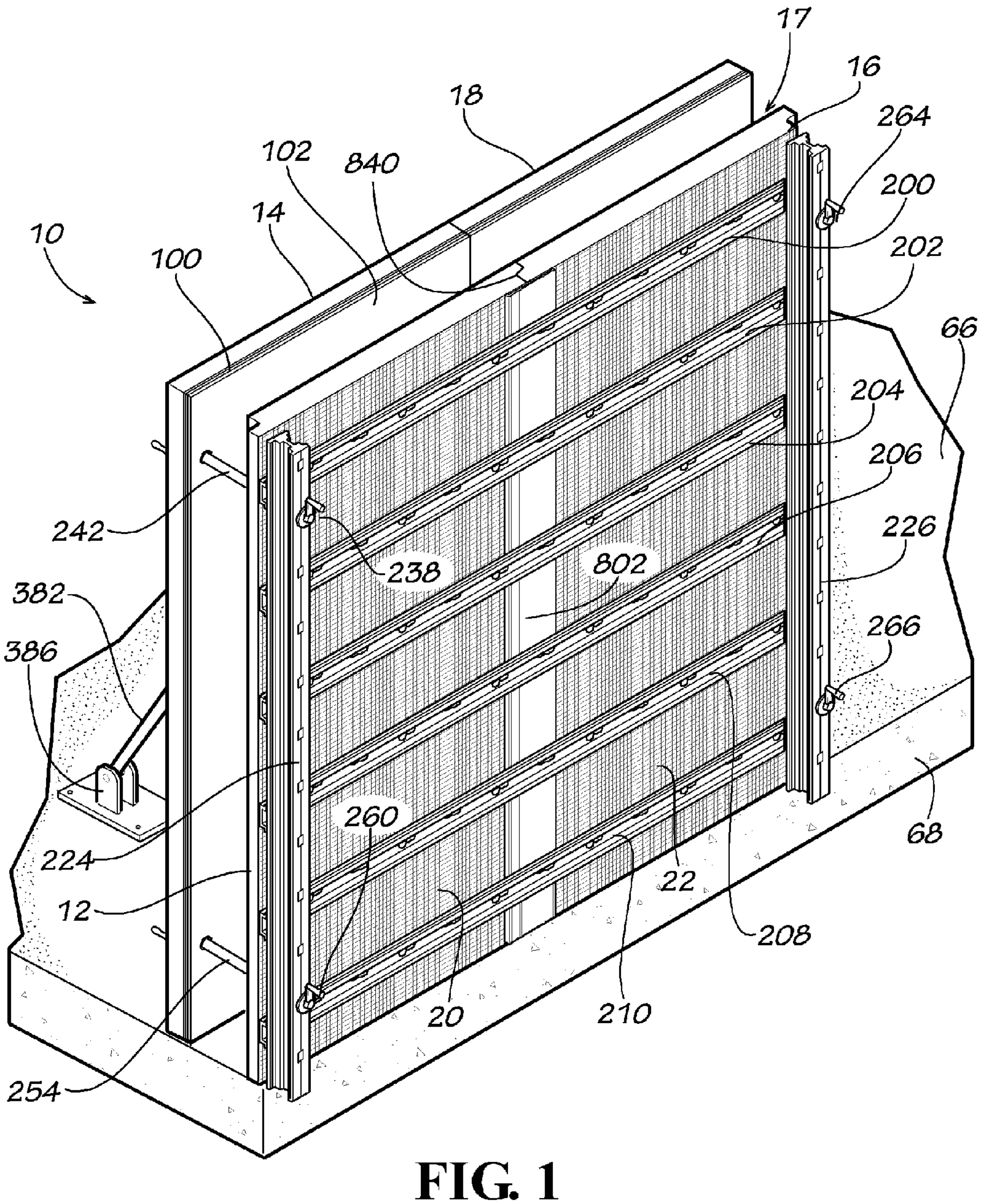
FIG. 1 is a perspective view of a disclosed embodiment of a hybrid insulated concrete form in accordance with the present invention.

Referring now to the drawing in which like numbers indicate like elements throughout the several views, there is shown in FIG. 1 a disclosed embodiment of a hybrid insulated concrete form 10 in accordance with the present invention. The hybrid insulated concrete form 10 includes a first exterior foam insulating panel 12 generally parallel to and horizontally spaced from a first interior conventional removable concrete form 14. Adjacent the first exterior foam insulating panel 12 is a second exterior foam insulating panel 16; adjacent the first interior conventional removable concrete form 14 is a second interior conventional removable concrete form 18. The foam insulating panels 12, 16 and the conventional removable concrete forms 14, 18 define a concrete receiving space 17 therebetween.

The foam insulating panels 12, 16 can be made from any insulating material that is sufficiently rigid to withstand the pressures of the concrete placed in the hybrid insulated concrete form 10 and have sufficient heat insulating properties, as discussed below. The foam insulating panels 12, 16 are preferably made from a closed cell polymeric foam material, such as molded expanded polystyrene or extruded expanded polystyrene. Other polymeric foams can also be used including, but nor limited to, polyisocyanurate and polyurethane. If the foam insulating panels 12, 16 are made from a material other than polystyrene, the foam insulating panels should each have insulating properties equivalent to approximately 0.5 to approximately 8 inches of expanded polystyrene foam; preferably at least 0.5 inches of expanded polystyrene foam; more preferably at least 1 inch of expanded polystyrene foam; most preferably at least 2 inches of expanded polystyrene foam; especially at least 3 inches of expanded polystyrene foam; more especially at least 4 inches of expanded polystyrene foam and most especially at least 6 inches of expanded polystyrene foam. Preferably, the foam insulating panels 12, 16 each have insulating properties equivalent about 0.5 inches of expanded polystyrene foam; about 1 inch of expanded polystyrene foam; about 2 inches of expanded polystyrene foam; about 3 inches of expanded polystyrene foam; about 4 inches of expanded polystyrene foam; about 6 inches of expanded polystyrene foam or about 8 inches of expanded polystyrene foam. Expanded polystyrene foam has an R-value of approximately 4 to 5 per inch thickness. Therefore, the foam insulating panels 12, 16 each should have an R-value of greater than 4, preferably greater than 8, more preferably greater than 12, most preferably greater than 16, especially greater than 20. The foam insulating panels 12, 16 preferably each have an R-value of approximately 4 to approximately 40; more preferably between approximately 10 to approximately 40; especially approximately 12 to approximately 40; more especially approximately 20 to approximately 40. The foam insulating panels 12, 16 preferably each have an R-value of approximately 4, more preferably approximately 8, especially approximately 12, most preferably approximately 16, especially approximately 20 or more especially approximately 40.

The foam insulating panels 12, 16 should also each have a density sufficient to make them substantially rigid, such as approximately 1 to approximately 3 pounds per cubic foot, preferably approximately 1.5 pounds per cubic foot. Extruded expanded closed cell polystyrene foam is available under the trademark Neopor® and is available from Georgia Foam, Gainesville, Ga. Extruded polystyrene is available from Dow Chemical, Midland, Mich., USA. The foam insulating panels 12, 16 can be made by molding to the desired size and shape, by cutting blocks or sheets of pre-formed expanded polystyrene foam into a desired size and shape or by extruding the desired shape and then cutting to the desired length. Although the foam insulating panels 12, 16 can be of any desired size, it is specifically contemplated that the foam insulating panels will be of a height equal to the distance from a floor to a ceiling where a building wall or column is to be constructed. In other instances, it may be desirable that the foam insulating panels 12, 16 are the height of multiple stories, such as the height of a two story home. Thus, the height of the foam insulating panels will vary depending on the wall height of a particular building design. However, for ease of handling, the foam insulating panels 12, 16 will each generally be 9 feet 6 inches high and 4 feet 1 inches wide. These dimension will also vary depending on whether the panels are the interior panel or the exterior panel, as is explained in U.S. Pat. Nos. 8,555,583 and 8,756,890 (the disclosure of which are both incorporated herein by reference in their entirety).

Optionally applied to the outer surface 11 (FIGS. 4 and 5) of each of the foam insulating panels 12, 16 is a layer of reinforcing material, such as the layers of reinforcing material 20, 22 (FIGS. 1 and 2), and as also disclosed in U.S. Pat. Nos. 8,555,583 and 8,756,890 (the disclosures of which are both incorporated herein by reference in their entirety). The layers of reinforcing material 20, 22 can be made from continuous materials, such as sheets or films, or discontinuous materials, such as fabrics, webs or meshes. The layers of reinforcing material 20, 22 can be made from material such as polymers, for example polyethylene or polypropylene, from fibers, such as fiberglass, basalt fibers, aramid fibers or from composite materials, such as carbon fibers in polymeric materials, or from metal, such as steel or aluminum wires, sheets or corrugated sheets, and foils, such as metal foils, especially aluminum foil. The layers of reinforcing material 20, 22 can be made from metal, but preferably are made from synthetic plastic materials that form the warp and weft strands of a fabric, web or mesh. A preferred material for the layers of reinforcing material 20, 22 is disclosed in U.S. Pat. No. 7,625,827 (the disclosure of which is incorporated herein by reference in its entirety). Also, the layers of reinforcing material 20, 22 can be made from carbon fiber, alkaline resistant fiberglass, basalt fiber, aramid fibers, polypropylene, polystyrene, vinyl, polyvinyl chloride (PVC), or nylon, or from composite materials, such as carbon fibers in polymeric materials, or the like. For example, the layers of reinforcing material 20-22 can be made from the mesh or lath disclosed in any of U.S. Pat. Nos. 5,836,715; 6,123,879; 6,263,629; 6,454,889; 6,632,309; 6,898,908 or 7,100,336 (the disclosures of which are all incorporated herein by reference in their entirety). If an extruded foam panel is used, the foam can be extruded between two layers of reinforcng material, such as sheets of metal, such as sheets of aluminum, fibreglass matt, and the like.

The layers of reinforcing material 20, 22 can be adhered to the outer surfaces 11 of the foam insulating panels 12, 16 by a conventional adhesive that is compatible with the material from which the foam insulating panels are made. However, it is preferred that the layers of reinforcing material 20, 22 be laminated to the outer surfaces 11 of the foam insulating panels 12, 16 using a polymeric material that also forms a weather or mositure barrier on the exterior surface of the foam insulating panels. The weather barrier can be applied to a layers of reinforcing material 20, 22 on the surface 11 of the foam insulating panels 12, 16 by any suitable method, such as by spraying, brushing or rolling. The moisture barrier can be applied as the laminating agent for the layers of reinforcing material 20, 22 or it can be applied in addition to an adhesive used to adhere the layers of reinforcing material to the outer surfaces 11 of the foam insulating panels 12, 16. Suitable polymeric materials for use as the moisture barrier are any water-proof polymeric material that is compatible with both the material from which the layer of reinforcing material 20, 22 and the foam insulating panels 12, 16 are made; especially, liquid applied weather membrane materials. Useful liquid applied weather membrane materials include, but are not limited to, WeatherSeal® by Parex of Anaheim, Calif. (a 100% acrylic elastomeric waterproof membrane and air barrier which can be applied by rolling, brushing, or spraying) or Senershield® by BASF (a one-component fluid-applied vapor impermeable air/water-resistive barrier that is both waterproof and resilient) available at most building supply stores. For relatively simple applications, where cost is an issue or where simple exterior finish systems are desired, the layers of reinforcing material 20, 22 can be omitted.

A preferred elastomeric weather membrane is a combination of WeatherSeal® and 0.1% to approximately 50% by weight ceramic fibers, preferably 0.1% to 40% by weight, more preferably 0.1% to 30% by weight, most preferably 0.1% to 20% by weight, especially 0.1% to 15% by weight, more especially 0.1% to 10% by weight, most especially 0.1% to 5% by weight. Ceramic fibers are fibers made from materials including, but not limited to, silica, silicon carbide, alumina, aluminum silicate, aluminum oxide, zirconia, and calcium silicate. Wollastonite is an example of a ceramic fiber. Wollastonite is a calcium inosilicate mineral ($CaSiO_3$) that may contain small amounts of iron, magnesium, and manganese substituted for calcium. Wollastonite is available from NYCO Minerals of NY, USA. Bulk ceramic fibers are available from Unifrax I LLC, Niagara Falls, N.Y., USA. Ceramic fibers are known to block heat transmission and especially radiant heat. When placed on the exterior surface of a building wall, ceramic fibers improve the energy efficiency of the building envelope.

Optionally, Wollastonite can be used in the elastomeric weather membrane to both increase resistance to heat transmission and act as a fire retardant. Therefore, the elastomeric weather membrane can obtain fire resistance properties. A fire resistant membrane over the exterior face of the foam insulating panel can increase the fire rating of the wall assembly by delaying the melting of the foam insulating panel.

The foam insulating panels 12, 16 each include a plurality of panel anchor members, such as the panel anchor member 24, as disclosed in U.S. Pat. Nos. 8,756,890; 8,555,584; and 8,877,329 (the disclosures of which are all incorporated herein by reference in their entirety). The panel anchor member 24 (FIGS. 3-5) is preferably formed from a polymeric thermosetting or thermoplastic material, such as polyethylene, polypropylene, nylon, acrylonitrile-butadiene-styrene (ABS), glass filled thermoplastics or thermosetting plastics, such as vinyl ester fiberglass, or the like. For particularly large or heavy structures, the panel anchor member 24 is preferably formed from glass filled or mineral fiber filled thermoplastics, such as nylon. The panel anchor member 24 can be formed by any suitable process, such as by molding, injection molding, extrusion or pultrusion. Also, where structural loads are placed upon the panel anchor members, they can be made of metal, such as aluminum or steel, and by casting, molding or stamping.

Figure 5:
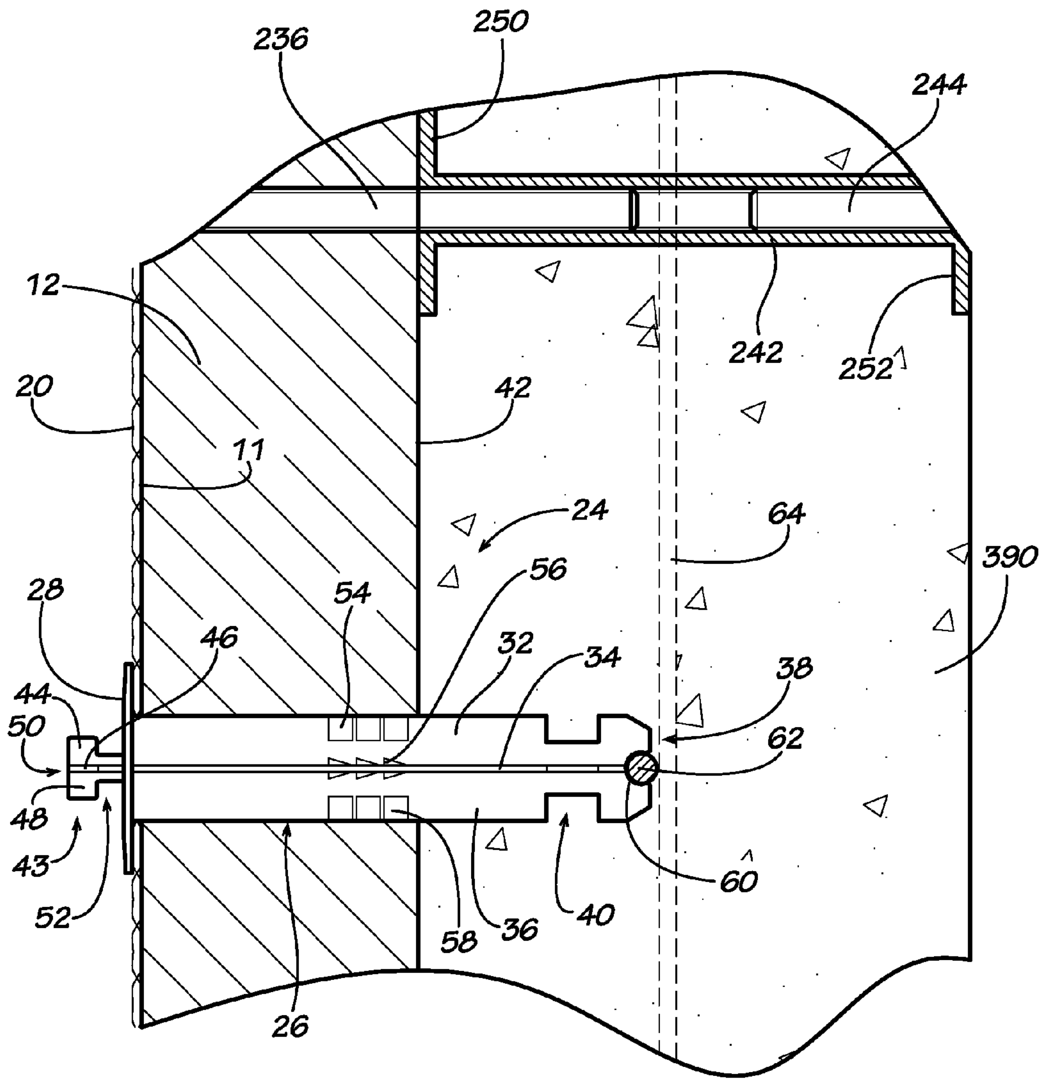
FIG. 5 is a partial detailed cross-sectional view of the hybrid insulated concrete form shown in FIG. 4 shown with the strongbacks and whalers removed.

Each panel anchor member 24 includes an elongate panel-penetrating portion 26 and a flange 28 adjacent an end of the panel-penetrating portion. The flange 28 can be any suitable shape, such as square, oval or the like, but in this embodiment is shown as circular. The flange 28 prevents the panel anchor member 24 from pulling out of the foam insulating panel 12. The flange 28 also traps a portion of the layer of reinforcing material 20 between it and the outer surface 11 of the foam insulating panel 12, thereby mechanically attaching the layer of reinforcing material to the foam insulating panel. The panel-penetrating portion 26 can be any suitable cross-sectional shape, such as square, round, oval or the like, but in this embodiment is shown as having a generally plus sign ("+") cross-sectional shape. The panel-penetrating portion 26 comprises four leg members 32, 34, 36 (only three of which are shown in FIG. 5) extending radially outwardly from a central core member. The plus sign ("+") cross-sectional shape of the panel-penetrating portion 26 prevents the panel anchor member 24 from rotating around its longitudinal axis during concrete placement. The plus sign ("+") cross-sectional shape also increases the surface area of the panel-penetrating portion 26, which thereby increases the friction between the panel-penetrating portion and the foam insulating panel 12, 16. This increased friction holds the panel anchor member 24 in the foam insulating panels 12, 14 more securely.

Figure 4:
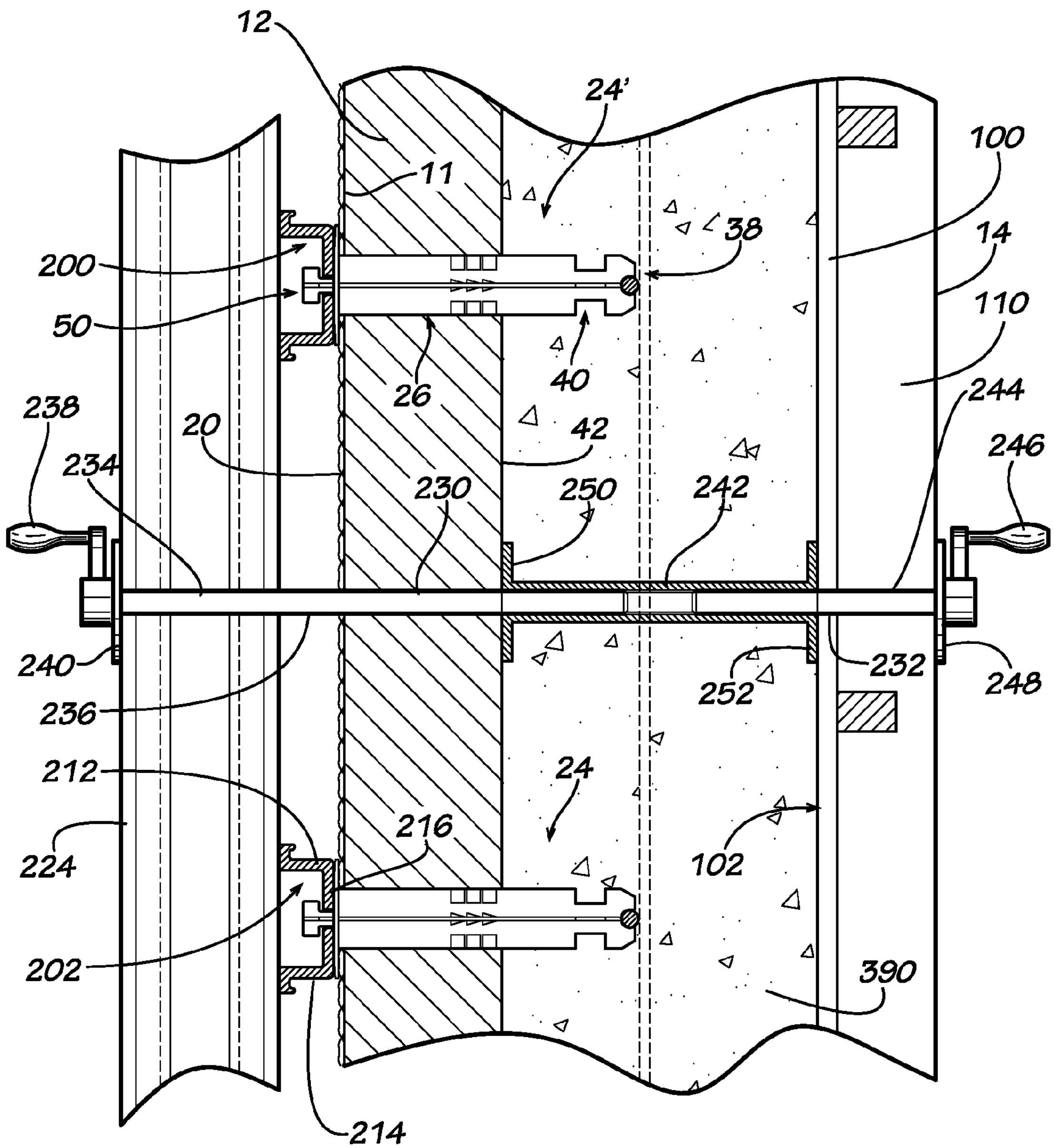
FIG. 4 is a partial detailed cross-sectional view of the hybrid insulated concrete form shown in FIG. 3.
Figure 6:
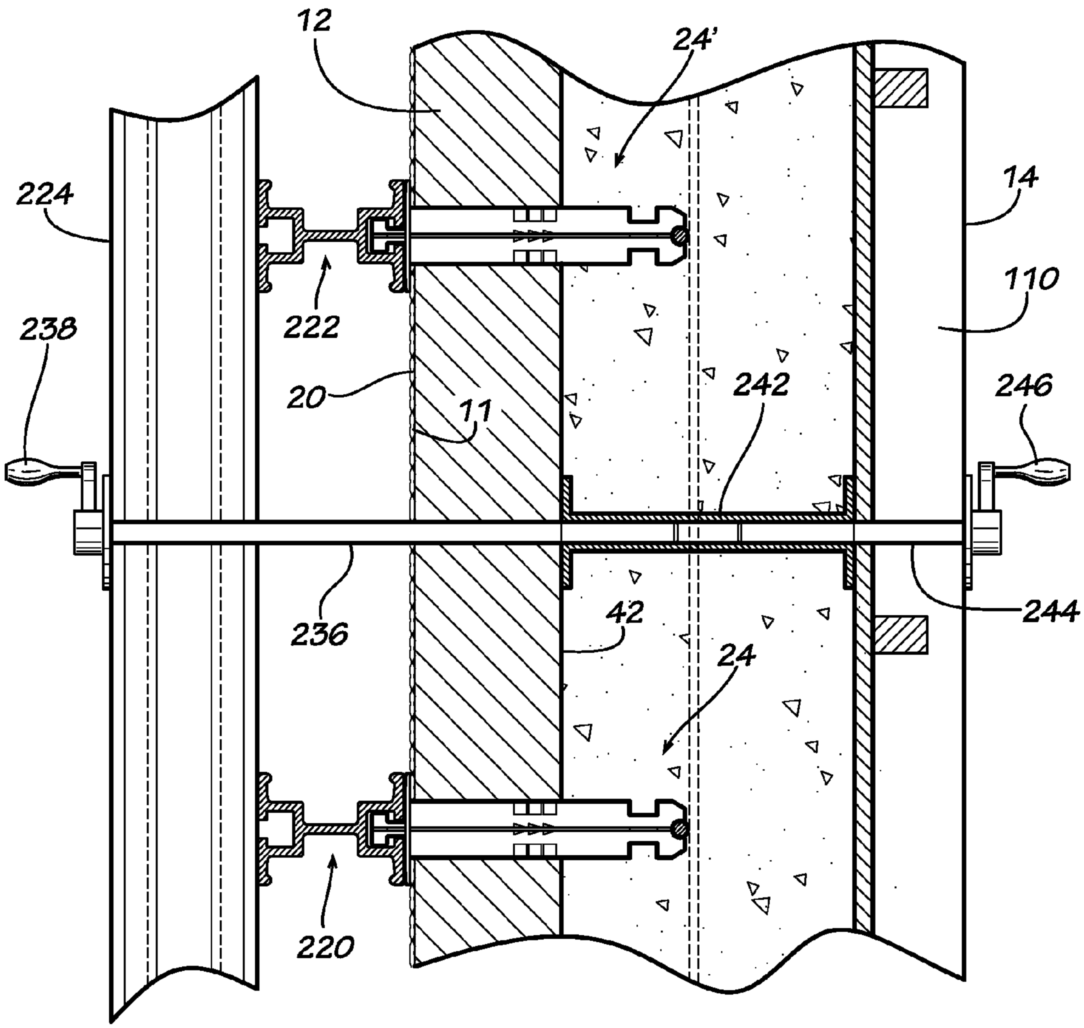
FIG. 6 is a partial detailed cross-sectional side view of an alternate disclosed embodiment of the hybrid insulated concrete form shown in FIG. 4.

Formed adjacent an end 38 of the panel anchor member 24 opposite the flange 28 is a notch 40. The notch 40 is formed in each of the four legs 32-36 adjacent an end 38 of the panel anchor member 24 opposite the flange 28. The notch 40 can be any shape, such as triangular, round, oval or the like, but in this embodiment is shown as having a generally rectangular shape (FIGS. 4 and 5). The notch 40 provides a portion of the panel-penetrating portion 26 with an effectively reduced diameter or dimension for a solid anchorage point into the concrete. As can be seen in FIGS. 4-6, when the flange 28 contacts the layer of reinforcing material 20 (or the outer surface 11 of the foam insulating panel 12, if the layer of reinforcing material is not used), the end 38 of the panel-penetrating portion 26 extend beyond the inner surface 42 of the foam insulating panel 12 into the concrete receiving space 17, preferably approximately halfway between the foam insulating panel 12 and the conventional removable concrete form 14.

The diameter of the flange 28 should be as large as practical to hold the foam insulating panel 12 securely to the hardened concrete in the concrete receiving space 17. Furthermore, the diameter of the flange 28 should be as large as practical to securely hold the layer of reinforcing material 20, if used, against the outer surface 11 of the foam insulating panel 12. It is found as a part of the present invention that a flange 28 having a diameter of approximately 2 to approximately 4 inches, especially approximately 3 inches, is useful in the present invention. Furthermore, the spacing between adjacent panel anchor members 24 will vary depending on factors including the concrete to be formed between the foam insulating panel 12 and the conventional removable concrete form 14 and the type of exterior cladding to be used on the exterior of the foam insulating panel. However, it is found as a part of the present invention that a spacing of adjacent panel anchor members 24 of approximately 6 inch to approximately 24 inch centers, especially 16 inch centers, is useful in the present invention.

Extending longitudinally outwardly from the flange 28 opposite the panel-penetrating portion 26 is a second anchor portion 43 (FIG. 5). The second anchor portion 43 can be any suitable cross-sectional shape, such as square, round, oval or the like, but in this embodiment is shown as having a generally plus sign ("+") cross-sectional shape. The second anchor portion 43 comprises four leg members 44, 46, 48, 49 (FIGS. 5 and 37) extending radially outwardly from a central core member. Formed adjacent an end 50 of the second anchor portion 43 intermediate the flange 28 and the end 50 is a notch 52. The notch 52 is formed in each of the four leg members 44-49 adjacent the end 50 of the second anchor portion 43. The notch 52 can be any suitable shape, such as triangular, round, oval or the like, but in this embodiment is shown as having a generally rectangular shape (FIG. 5). The notch 52 provides a portion of the second anchor portion 48 with an effectively reduced diameter or dimension for attachment to a whaler or a vertical stud member, as explained further below.

Optionally, on each of the four legs members 32-36 intermediate the ends 38, 50 of the panel anchor member 24 is formed a plurality of fins 54, 56, 58 (only three of which are visible in FIG. 5). The fins 54-58 are formed on the panel-penetrating portion 26 such that when the flange 28 contacts the layer of reinforcing material 20 (or the outer surface 11 of the foam insulating panel 12 if the layer of reinforcing material is not used), the fins are located between the outer surface 11 and the inner surface 42 of the foam insulating panel 12. The fins 54-58 can be any suitable shape, such as round, but in this embodiment are shown as generally rectangular and flaring outwardly from the leg members 32-36 toward the flange 28. Thus, as the end 38 of the panel anchor member 24 is inserted into and through the foam insulating panel 12, the fins 54-58 on the leg members 32-36 slightly compress the foam material allowing them to slide into the foam insulating panel. However, once the flange 28 contacts the layer of reinforcing material 20 (or the outer surface 11 of the foam insulating panel 12 if the layer of reinforcing material is not used), the fins 54-58 resist removal of the panel anchor member 24 from the foam insulating panel. The fins 54-58 therefore provide a one-way locking mechanism; i.e., the panel anchor member 24 can be relatively easily inserted onto the foam insulating panel 12, but once fully inserted, the panel anchor member is locked in place and cannot easily be removed from the foam insulating panel. Therefore, the fins 54-58 prevent the panel anchor member 24 from falling out of the foam insulating panel 12 during transportation, setup and concrete placement. However, for certain situations or certain types of exterior wall cladding, it may be desirable to omit the fins 54-58.

The leg members 32, 36 include a U-shaped cutout 60 adjacent the end 38 of the panel anchor member 24. The U-shaped cutout 60 is designed and adapted to receive and hold a rebar or wire mesh for reinforcing the concrete in the concrete receiving space 17. Aligned rows of panel anchor members, such as the panel anchor members 24, 24", provide aligned rows of U-shaped cutouts 60 such that adjacent parallel rows of rebar, such as the rebar 62, of desired length can be attached to the rows of panel anchor members. Crossing columns of rebar, such as the rebar 64, can be laid on top of the rows of rebar, such as the rebar 62, to form a conventional rebar grid. Where the rebar 62 intersects the rebar 64, the two rebar can be tied together with wire ties in a conventional manner known in the art. Of course, in addition to the use of rebar, or in place of the use of rebar, reinforcing fibers, such as steel fibers, synthetic fibers or mineral fibers, such as Wollastonite, can be used. Many different types of steel fibers are known and can be used in the present invention, such as those disclosed in U.S. Pat. Nos. 6,235,108; 7,419,543 and 7,641,731 and PCT patent application International Publication Nos. WO 2012/080326 and WO 2012/080323 (the disclosures of which are incorporated herein by reference in their entireties). Particularly preferred steel fibers are Dramix® 3D, 4D and 5D steel fibers available from Bekaert, Belgium and Bekaert Corp., Marietta, Ga., USA. Plastic fibers can also be used, such as those disclosed in U.S. Pat. Nos. 6,753,081; 6,569,525 and 5,628,822 (the disclosures of which are incorporated herein by reference in their entireties).

The foam insulating panel 12 is prepared by forming a plurality of plus sign ("+") shaped holes, such as the hole 63, in the foam insulating panels 12, 16 to receive the end 38 and panel penetrating portion 26 of each of the panel anchor members, such as the panel anchor member 24. Holes, such as the hole 63, in the foam insulating panels 12, 16 can be formed by conventional drilling, such as with a rotating drill bit, by water jets, by hot knives or by saw cutting knives. When the foam insulating panels 12, 16 each include a layer of reinforcing material 20, 22, the layer of reinforcing material is preferably adhered to the foam insulating panels before the holes are formed in those panels. It is also preferable to form the holes in the foam insulating panels 12, 16 after the moisture barrier or weather membrane is applied to the outer surface 11 of the foam insulating panels, as described above. First, a hole matching the cross-sectional shape of the panel-penetrating portion 26 of the panel anchor member 24 can be formed in the foam insulating panels 12, 16 using saw cutting knives. The holes, such as the hole 63, formed in the foam insulating panels 12, 16 extend from the outer surface 11 to the inner surface 42 of the foam insulating panels so that the foam panel-penetrating portion 26 of the panel anchor member 24 can be inserted complete through the foam insulating panels, as shown in FIG. 5. The foam insulating panel 12 is then assembled by inserting the panel-penetrating portion 26 of the panel anchor member 24 through the hole 63 in the composite foam insulating panel 12 until the flange 28 contacts the layer of reinforcing material 20 (or the outer surface 11 of the foam insulating panel 12 if the layer of reinforcing material is not used). The foam insulating panel 12 is then placed on a concrete footing or a flat surface, such as the top surface 66 of a concrete slab 68 (FIG. 1).

Figure 7:
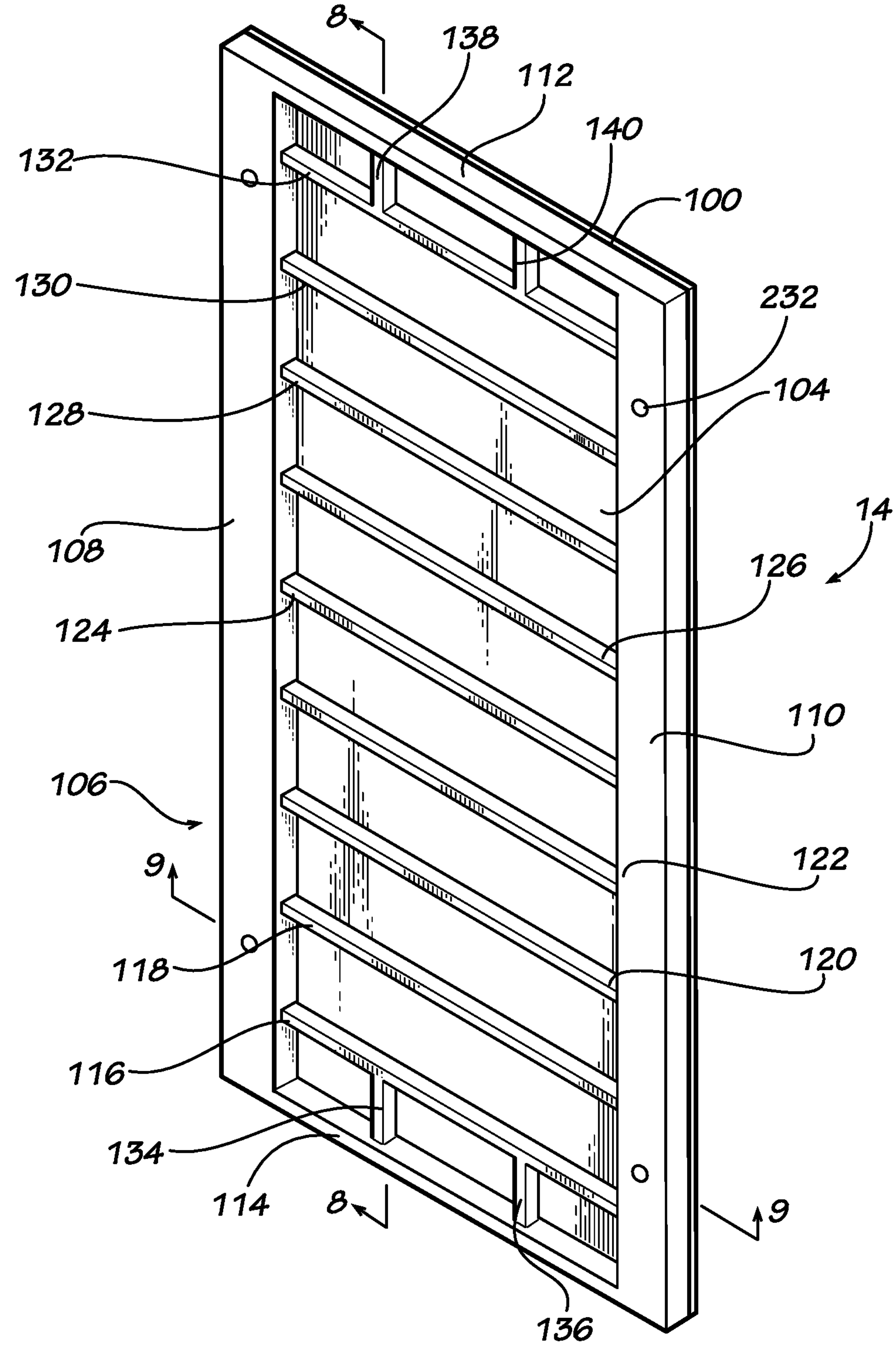
FIG. 7 is a perspective view of a conventional removable concrete form for use in a disclosed embodiment of a hybrid insulated concrete form in accordance with the present invention.
Figure 8:
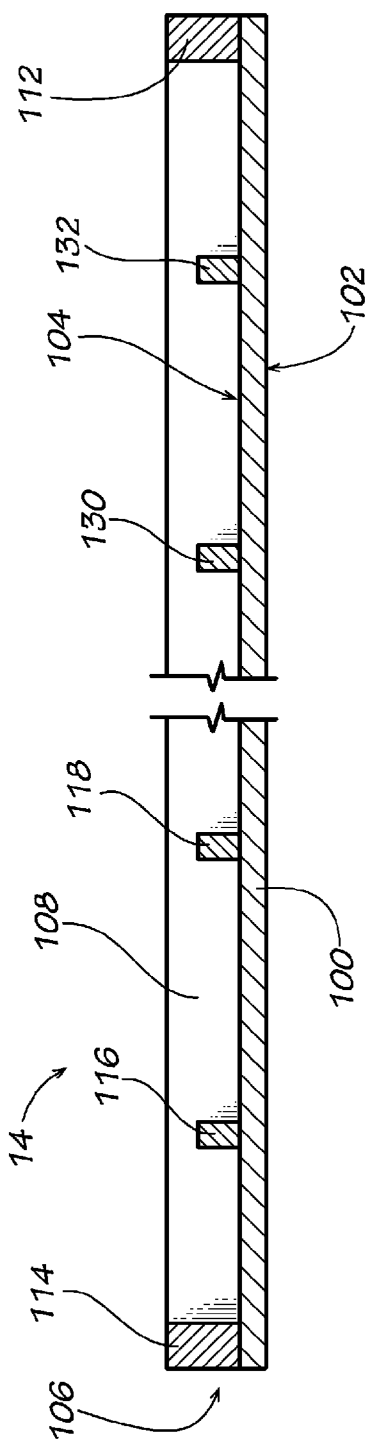
FIG. 8 is a cross-sectional view taken along the line 8-8 of the conventional removable concrete form shown in FIG. 7.
Figure 9:
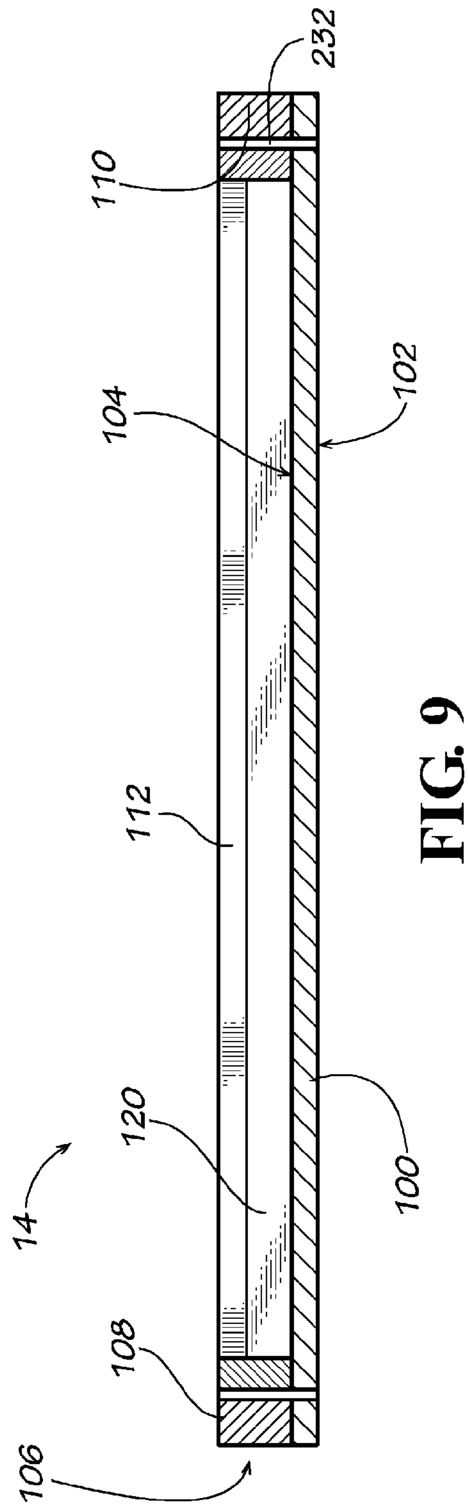
FIG. 9 is a cross-sectional view taken along the line 9-9 of the conventional removable concrete form shown in FIG. 7.

The conventional removable concrete forms 14, 18 each comprise a rectangular concrete forming face panel 100 made of a material typically used in prior art concrete forms (FIGS. 7-9). Most prior art removable concrete forms use wood, plywood, wood composite materials, or wood or composite materials with polymer coatings for the concrete forming panel of their concrete forms. A preferred prior art material for the face panel 100 is a sheet of high density overlay (HDO) plywood. The prior art face panel 100 can be any useful thickness depending on the anticipated load to which the form will be subjected. However, thicknesses of ½ inch to ⅞ inch are typically used. The face panel 100 has a first primary surface 102 for contacting plastic concrete and an opposite second primary surface 104. The first primary surface 102 is usually smooth and flat. However, the first primary surface 102 can also be contoured so as to form a desired design in the concrete, such as a brick or stone pattern. The first primary surface 102 can also include a polymer coating to make the surface smoother, more durable and/or provide better release properties.

Attached to the face panel 100 is a rectangular frame 106, which comprises two elongate longitudinal members 108, 110 and two elongate transverse members 112, 114. The longitudinal members 108, 110 and the transverse members 112, 114 are attached to each other by any suitable means used in the prior art, such as by welding, and to the face panel 100 by any suitable means used in the prior art, such as by bolting or screwing the face panel to the frame. The frame 106 also comprises at least one, and preferably a plurality, of transverse bracing members 116, 118, 120, 122, 124, 126, 128, 130, 132. The transverse bracing members 116-132 are attached to the longitudinal members 108, 110 by any suitable means used in the prior art. The frame 106 also includes bracing members 134, 136 and 138, 140. The bracing members 134, 136 extend between the transverse member 114 and the bracing member 116. The bracing members 134, 136 are attached to the transverse member 114 and the bracing member 116 by any suitable means used in the prior art. The bracing members 138, 140 extend between the transverse member 112 and the bracing member 132. The bracing members 138, 140 are attached to the transverse member 112 and the bracing member 132 by any suitable means used in the prior art. The frame 106 helps prevent the face panel 100 from flexing or deforming under the hydrostatic pressure of the plastic concrete when placed in the concrete receiving space 17. The frame 106 can be made from any suitable material, such as wood or metal, such as aluminum or steel, depending on the load to which the form 14 will be subjected. The particular design of the frame 106 is not critical to the present invention. There are many different designs of frames for removable concrete forms and they are all applicable to the present invention. Conventional removable concrete forms, such as the conventional removable concrete forms 14, 18, are available from Wall-Ties & Forms, Inc., Shawnee, Kans., USA or under the designation Wall Formwork from Doka, Amstetten, Austria and Lawrenceville, Ga., USA.

Figure 2:
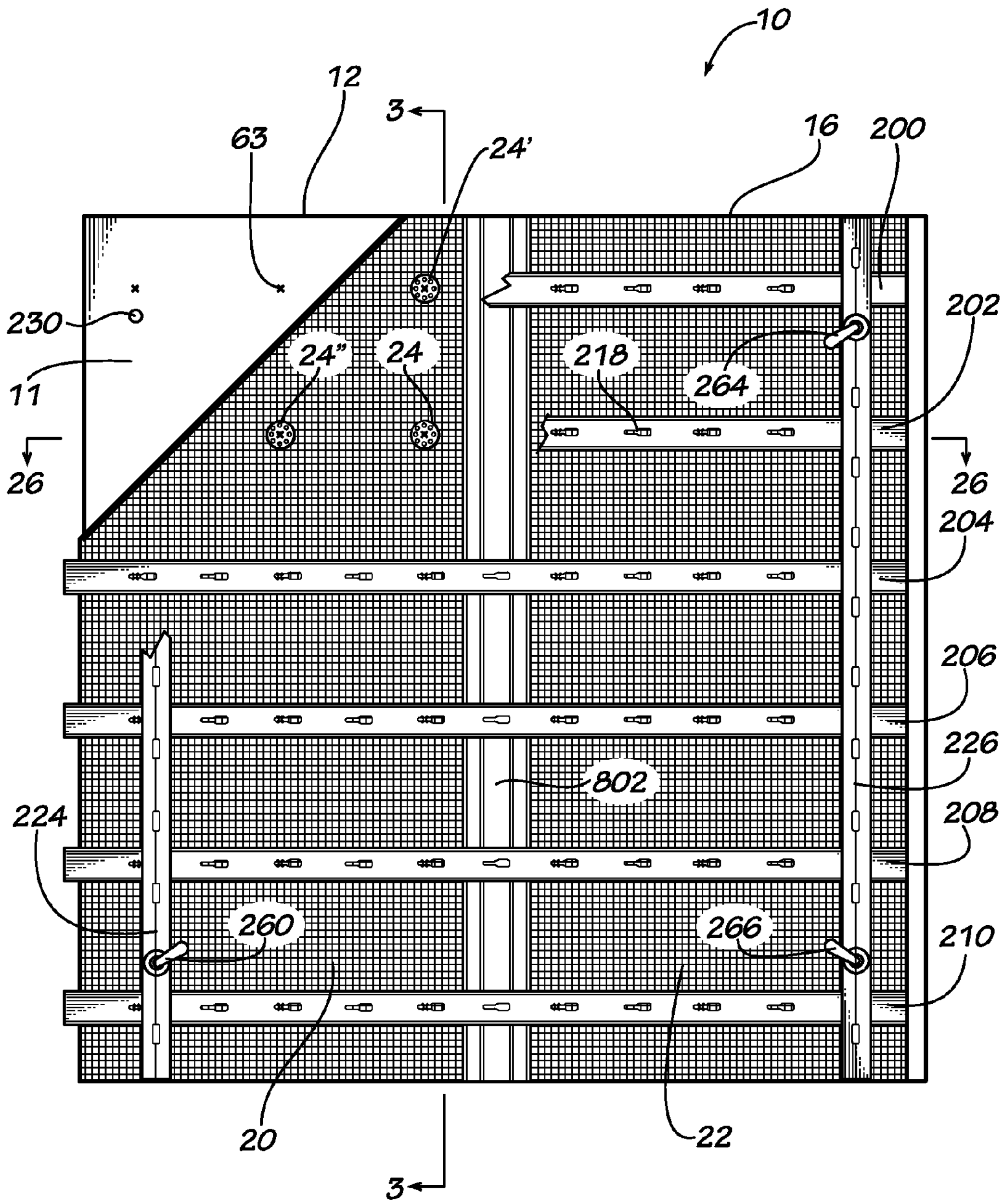
FIG. 2 is a partially cut away side plan view of the hybrid insulated concrete form shown in FIG. 1.
Figure 3:
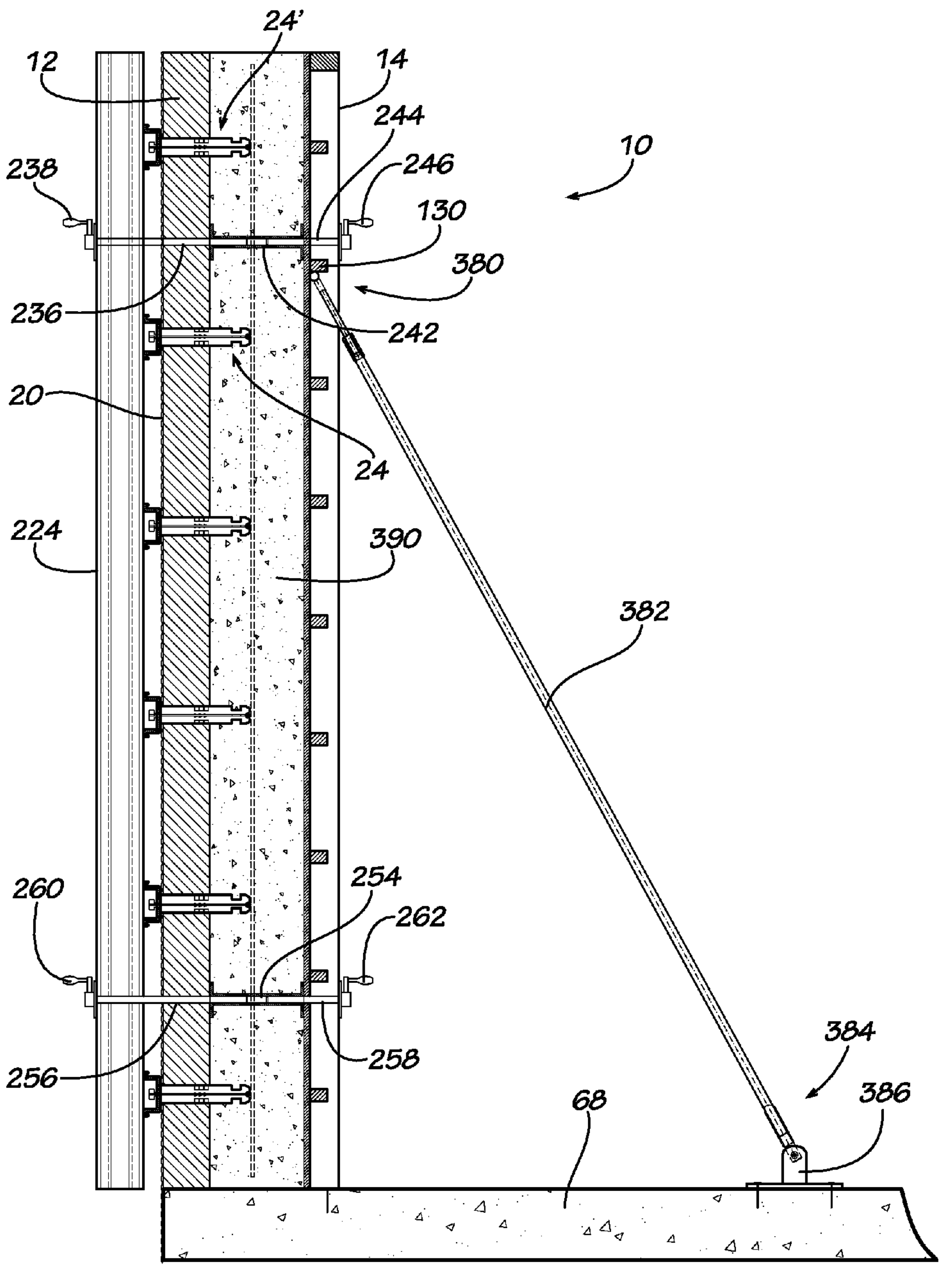
FIG. 3 is a cross-sectional view taken along the line 3-3 of the hybrid insulated concrete form shown in FIG. 2.

The conventional removable concrete form 14 is erected to a vertical position on the surface 66 of the slab 68 and horizontally spaced from the foam insulating panel 12 with the face panel 100 facing the foam insulating panel, as shown in FIGS. 1, 2 and 3. The first surface 102 of the face panel 100 and the inner surface 42 of the foam insulating panel 12 define the concrete receiving space 17. The foam insulating panel 16 is erected adjacent the foam insulating panel 12 and the conventional removable concrete form 18, which is identical to the conventional removable concrete form 14, is positioned adjacent the conventional removable concrete form 14. The conventional removable concrete form 14 and the conventional removable concrete form 18 are connected to each other in a manner well known in the art. Additional foam insulating panels (not shown) and additional conventional removable concrete forms (not shown) can be joined together in a similar manner to provide a concrete form of a desired size, shape and configuration.

It is a specific feature of the present invention that whalers (also know as wales or walers) may be used in combination with the panel anchor members, such as the panel anchor member 24, to further reinforce the foam insulating panels 12, 16 and increase the pressure rating thereof; especially when wet, unhardened (i.e., plastic) concrete is poured into the concrete receiving space 17 and the hydrostatic pressure on the foam insulating panels is at a maximum. To stabilize the foam insulating panels 12, 16, a plurality of horizontal whalers 200, 202, 204, 206, 208, 210 are attached to the plurality of panel anchor members arranged in horizontal rows, such as the panel anchor members 24, 24". The design of the whalers 200-210 is disclosed in U.S. Pat. No. 8,756,890 (the disclosure of which is incorporated herein by reference in its entirety). The whalers 200-210 each comprise an elongate U-shaped channel made from a material having high flexural strength, such as steel, aluminum or composite plastic materials (FIGS. 1-4). The whalers 200-210 each include two parallel spaced side members 212, 214 and a connecting bottom member 216 (FIG. 4). The side members 212, 214 provide extra strength and resistance to flex of the bottom member 216. Formed in the bottom member 216 is a key-shaped opening or key slot 218 (FIG. 2); i.e., the lateral dimension at the narrow portion is narrower than the lateral dimension at the wider portion. The key slot 218 can be formed in the whalers 200-210 by stamping, routing or any other suitable technique. The whaler 200-210 can be formed by extrusion, pultrusion, by roll forming or by any other suitable technique.

The lateral dimension of the wider portion of the key slot 218 is chosen so that it is larger than the effective diameter or dimension of the end 50 of the panel anchor member 24; i.e., the width of the leg members 44, 48. The lateral dimension of the narrower portion of the key slot 218 is chosen so that it is narrower than the effective diameter of the end 50 of the panel anchor member 24; i.e., narrower than the width of the leg members 44, 48 and equal to or wider then the width of the leg members 44, 48 at the notch 52.

Therefore, the whaler 200 can be placed over the end 50 of the panel anchor member 24 such that the end of the panel anchor member fits through the wider portion of the key slot 218. Then, the whaler 200 can be slid horizontally so that the end 50 of the panel anchor member 24 is positioned in the narrower portion of the key slot 218 and the sides of the key slot fit in the notch 52 in the panel anchor member. When the end 50 of the panel anchor member 24 is in the narrower portion of the key slot 218 (FIG. 2), the whaler 200 is locked in place and cannot be removed from the end of the panel anchor member (longitudinally with respect to the panel anchor member). A hole (not shown) is provided in the side wall 214 of the whaler 200 aligned with the approximate mid-point of the narrower portion of key slot 218. A screw or pin (not shown) can then be screwed or inserted into the hole so that the shaft of the screw or pin extends transversely across the width of the whaler 200 and across the narrow portion of the key slot 218, thereby capturing the end 50 of the panel anchor member 24 in the narrow portion of the key slot. When the screw or pin (not shown) is positioned in the hole, as described above, the whaler 200 cannot be slid horizontally, thereby locking the whaler in position.

The length of the whalers 200-210 will depend on the width of the foam insulating panels 12, 14 that are used. However, it is contemplated that the length of the whalers 200-210 can be at least as long as the width of one of the foam insulating panels 12, 16 and, preferable, the whaler has a length equal to the width of multiple foam insulating panels. Also, the distance from the key slot 218 to the next horizontally adjacent key slot (FIG. 2) is the same as the center-to-center distance from the end 50 of one panel anchor member 24 to the end of the next horizontally adjacent panel anchor member 24" (FIG. 2). Thus, each whaler 200-210 has a plurality of key slots spaced along the length thereof and the number and spacing of the key slots corresponds to the number and spacing of the ends 50 of the panel anchor members 24, 24" used in the foam insulating panels 12, 16. To add flexibility, the whalers 200-210 have key slots spaced one-half the distance between horizontally adjacent panel anchor members 24, 24". This allows the whalers 200-210 to accommodate a different spacing of panel anchor members 24, 24". For example, as can be seen in FIG. 2, the ends 50 of the panel anchor members 24, 24" fit in every other key slot in the whaler 200. Also, the panel anchor members 24, 24" in the presently disclosed embodiment are spaced on 16 inch centers in four foot wide foam insulating panels 12, 16. However, the whalers 200-210 can also be used with panel anchor members 24, 24" spaced every 8 inches or combinations of 8 inches and 16 inches. For example, at a corner it might be desirable to space the panel anchor members 24, 24" 8 inches apart, but the rest of the wall would only require a spacing of 16 inches. Thus, the whalers 200-210 can accommodate these types of spacings.

FIGS. 1-4 show the use of the U-shaped whalers 200-210. However, other shapes are also useful for the whalers used in the present invention. For example, FIG. 6 shows the use of two I-beam whalers 220, 222. The design of the I-beam whalers 220, 222 is disclosed in applicant's co-pending patent application Ser. No. 13/247,133 filed Sep. 28, 2011 (the disclosure of which is incorporated herein by reference in its entirety). The I-beam whalers 220, 222 each interlock with the ends of the panel anchor members, such as the end 50 of the panel anchor member 24, using a plurality of key slots (not shown) formed in the edge of the I-beam whalers.

It is desirable to use strongbacks to plumb the foam insulating panels 12, 16 to vertical, to further reinforce the foam insulating panels and to withstand the hydrostatic pressure of the plastic concrete. FIGS. 1, 2 and 3 show the use of the strongbacks 224, 226 with the foam insulating panels 12, 16 reinforced with the U-shaped whalers 200-210. Strongbacks are well known in the art and are typically U-shaped or I-beam shaped heavy gauge metal beams that are erected vertically adjacent conventional metal concrete forms to help true and align the forms to vertical. Each strongback 224, 226 is an elongate metal reinforcing member. The strongbacks 224, 226 can be any typical design but are usually an extruded U-shaped or I-beam shaped cross-sectional shape made of heavy gauge steel or aluminum. The strongbacks 224, 226 are attached to the whalers 200-210 with clips (not shown) in a manner well known in the art.

Figure 10:
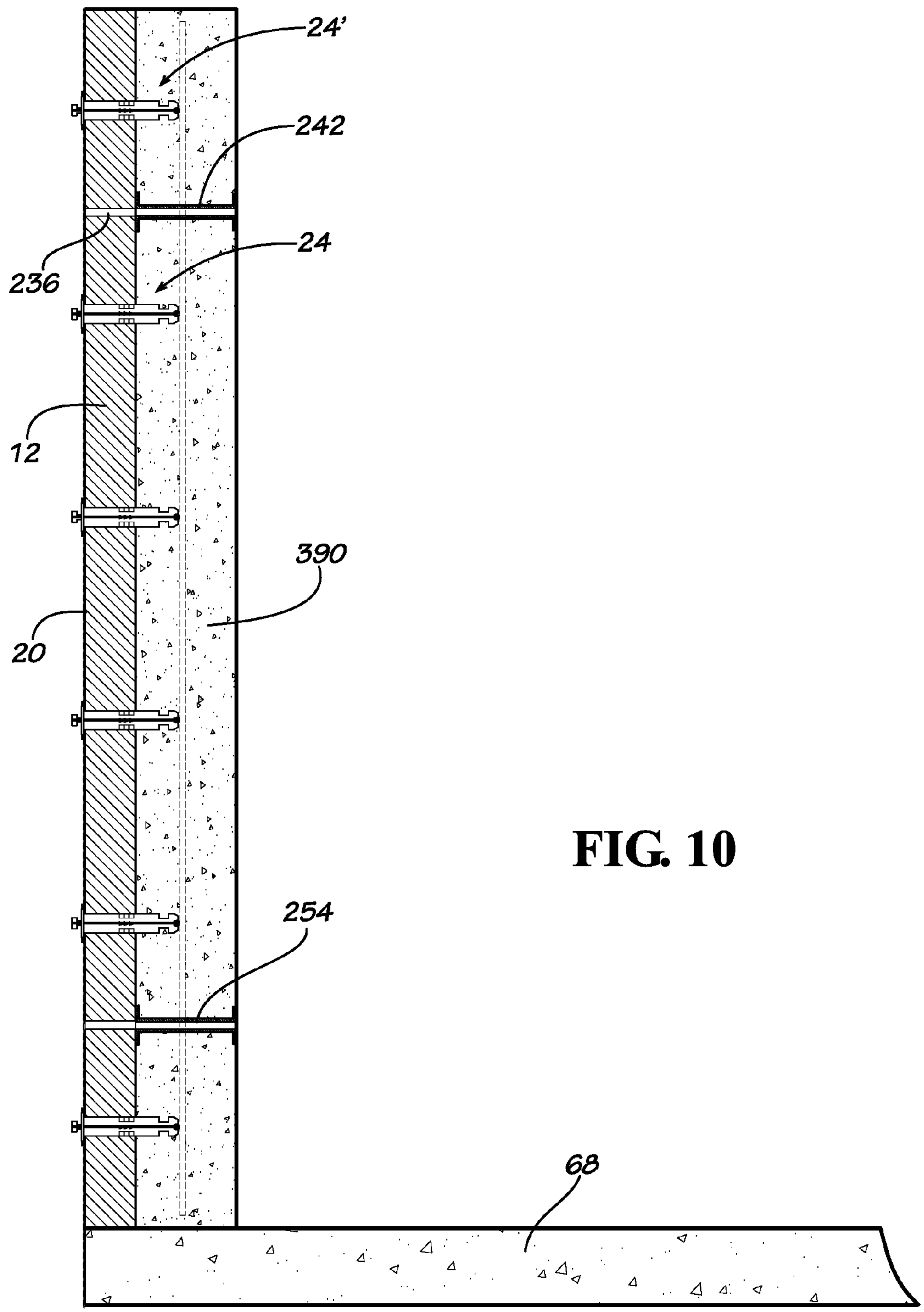
FIG. 10 is a cross-sectional view taken along the line 3-3 of the hybrid insulated concrete form shown in FIG. 2 shown with the conventional removable concrete form, the strongbacks and the whalers removed.

Four connecting rod/clamping devices are formed adjacent each of the corners of the hybrid insulated concrete form 10, as shown in FIGS. 1-4. A first hole 230 is formed in the upper left corner of the composite foam insulating panel 12, such as by drilling (FIGS. 4 and 10). A second hole 232 in axial alignment with the first hole 230 is formed in the face panel 100 and the longitudinal frame member 110 of the conventional removable concrete form 14. A hole 234 is formed in the strongback 224, such as by drilling. Alternately, two parallel strongbacks (not shown) can be used instead of the single strongback 224 in the manner shown in U.S. Pat. No. 8,756,890 (the disclosure of which is incorporated herein by reference in its entirety). A first elongate rod 236 having male threads formed thereon, an eccentric hand crank 238 on one end thereof and a flange 240 adjacent the hand crank is insert through the holes 234, 230. An elongate sleeve 242 of exactly the same length as the distance between the inner surface 42 of the composite foam insulating panel 12 and the inner surface 102 of the face panel 100 of the conventional removable concrete form 14 (which is also equal to the thickness of the concrete receiving space 17) is disposed between the foam insulating panel 12 and the conventional removable concrete form 14 and in axial alignment with the holes 234, 230, 232. The sleeve 242 has female threads formed inside the sleeve such that the rod 236 can be screwed into the sleeve by turning the hand crack 238. A second elongate rod 244 having male threads formed thereon, an eccentric hand crank 246 on one end thereof and a flange 248 adjacent the hand crank is insert through the hole 232. The female threads in the sleeve 242 are such that the rod 244 can be screwed into the sleeve by turning the hand crank 246. Both rods 236, 244 are screwed into the sleeve 242 until the flanges 240, 248 are tight against the strongback 224 and the longitudinal frame member 110 of the conventional removable concrete form 14 and until flanges 250, 252 provided on opposite ends of the sleeve 242 are tight against the inner surface 42 of the foam insulating panel 12 and the inner surface 102 of the face panel 100. An identical sleeve 254, threaded rods 256, 258 and hand crank 260, 262 form a rod/clamping device in the lower left portion of the insulated concrete form 10, as shown in FIGS. 1, 2 and 3. Identical sleeves (not shown), threaded rods (not shown) and hand cranks 264, 266 (FIGS. 1 and 2) are provided in the upper portion and lower portion of the foam insulating panel 16 and conventional removable concrete form 18 in the same manner as described above. By clamping the strongbacks 224, 226 to the frame 106 of the conventional removable concrete forms 14, 18, as described above, the strongbacks 224, 226 will automatically be held parallel to the conventional removable concrete forms 14, 18. The strongbacks also provide extra reinforcement to the foam insulating panels 12, 16 so that they can withstand higher pressure loads.

Alternatively to the threaded sleeves, such as the threaded sleeve 254, a hollow PVC sleeve (not shown) can be substituted. A single threaded rod (not shown) can be substituted for the two threaded rods 236, 244. Nuts (not shown) can be substituted for the eccentric hand cranks 238, 246. The nuts can be placed on the opposite ends of the single treaded rod and tightened against the flanges 240, 248. After the concrete has hardened, the nuts and single threaded rod can be removed leaving only the hollow PVC sleeve in the concrete. Thus, the precise design of the linkage system between the strongbacks 224, 226 and the conventional removable concrete forms 14, 18 is not critical to the present invention. What is essential is that the strongbacks 224, 226 are mechanically linked to the conventional removable concrete forms 14, 18 so that the hydrostatic pressure applied to the foam insulating panels can be transferred to the conventional removable concrete forms through the mechanical linkage.

Alternatively, although not shown here, the conventional removable concrete form can be any type of concrete forming system made of plywood and whalers held in place by strongbacks connected to the foam insulating panel side of the hybrid concrete form by the connecting rod, as described above.

One end 380 of a knee brace/turnbuckle 382 is pivotable attached to the brace member 130 of the frame 106 adjacent the top of the conventional removable concrete form 14 (FIG. 3). The other end 384 of the knee brace/turnbuckle 382 is pivotably attached to a bracket 386 that is anchored to the concrete slab 68, such as by screws or by shooting a nail through the bracket into the concrete slab. Rotation of the knee brace/turnbuckle 382 lengthens or shortens the knee brace/turnbuckle, thereby enabling fine adjustment of the conventional removable concrete form 14 to plumb or true vertical. Additional knee brace/turnbuckles (not shown) are placed at intervals along the horizontal width of adjacent conventional removable concrete forms. By attaching the horizontal whalers, such as the whalers 200-210, to the vertical strongbacks, such as the strongbacks 224, 226, which are in turn attached to the frame of the conventional removable concrete forms, such as the frame 106 of the conventional removable concrete form 14, the whalers will all be aligned vertically as well. Since the whalers, such as the whalers 200-210, are attached to the panel anchor members, such as the panel anchor member 24, the panel anchor members will be aligned vertically, also. Since the elongate sleeves, such as the sleeves 242, 254, are all of the exact same dimensions; i.e., the distance between the flanges 250, 252 are identical for all elongate sleeves, and since the elongate sleeves are attached to the foam insulating panels, such as the panels 12, 16, and to the conventional removable concrete forms 14, 18, the foam insulating panels will be vertically aligned as well, thus making a perfectly uniform, straight, vertical concrete wall forming system. The sleeves 242, 254 also provide identical spacing of the foam insulating panel 12 and the conventional removable concrete form 14 and the foam insulating panel 16 and the conventional removable concrete form 18, thereby providing a concrete receiving space 17 of uniform thickness.

The hybrid concrete form 10 is used by erecting the foam insulating panels 12, 16 and conventional removable concrete forms 14, 18 on the surface 66 of the concrete slab 68 in the manner described above. Plastic concrete is then placed in the concrete receiving space 17. After concrete 390 in the concrete receiving space 17 cures or hardens sufficiently, the rods 236, 244 are unscrewed from the sleeve 242 and removed from the holes 234, 230, 232. Similarly, the rods 256, 258 are removed from the sleeve 254. Other rods (not shown) are removed from the other sleeves (not shown) in the other foam insulating panels and conventional removable concrete forms, such as the foam insulating panel 16 and the conventional removable concrete form 18. The sleeves, such as the sleeves 242, 254, remain embedded in the solidified concrete. The sleeves 242, 254 can then be used as anchors for attaching wall cladding or for attaching construction elevators or scaffolding thereto for high-rise construction. The strongbacks 224, 226 are then removed from the whalers 200-210. The whalers 200-210 are removed from the panel anchor members, such as the panel anchor member 24, 24". The knee brace/turn buckle 382 is removed from the conventional removable concrete form 14 and from the bracket 386. And, the conventional removable concrete forms 14, 18 are removed from the hardened concrete 390. This leaves a vertical layer or wall of hardened concrete 390 and attached foam insulating panels 12, 16, as shown in FIGS. 5 and 10. The hardened concrete 390 is attached to the foam insulating panels 12, 16 mechanically by the plurality of the panel anchor members, such as the panel anchor member 24, but is also adhesively attached by the cement from the concrete.

Figure 11:
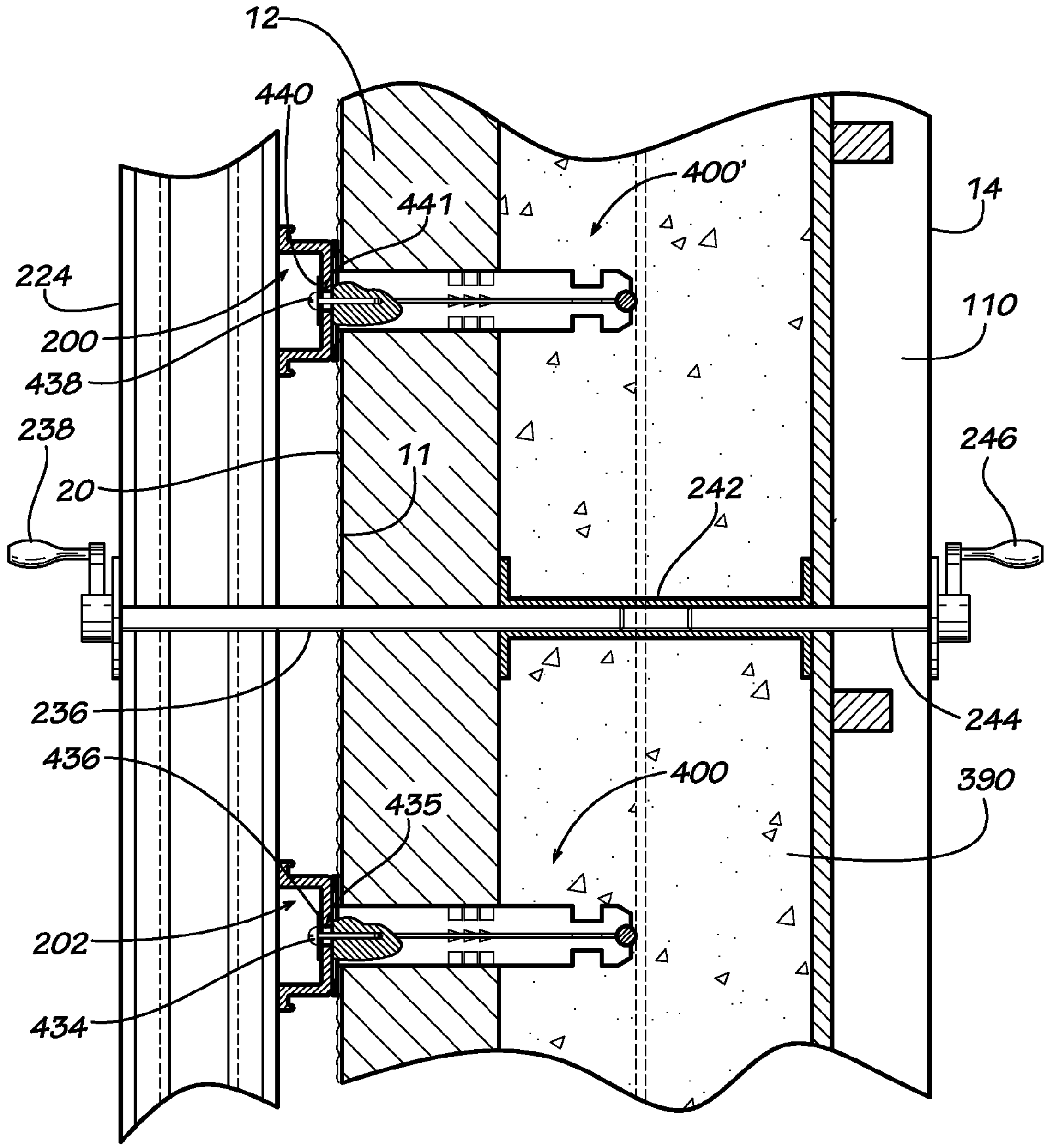
FIG. 11 is a partial detailed cross-sectional side view an alternate disclosed embodiment of a hybrid insulated concrete form in accordance with the present invention.
Figure 12:
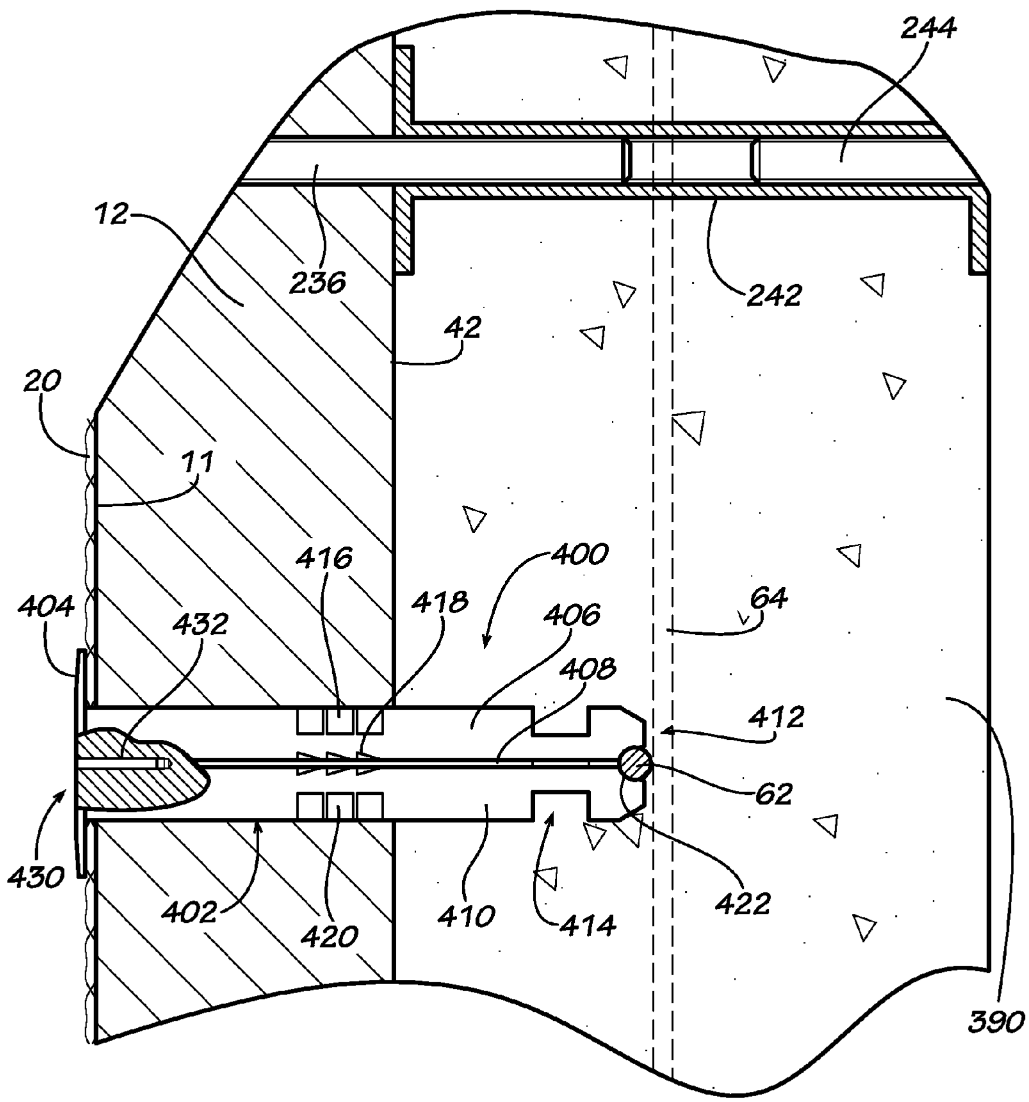
FIG. 12 is a partial detailed cross-sectional side view of the alternate disclosed embodiment of the hybrid insulated concrete form shown in FIG. 11.

FIGS. 11 and 12 show an alternate disclosed embodiment of the panel anchor member 24. FIGS. 11 and 12 show two identical panel anchor members 400, 400'. The panel anchor members 400, 400' (FIG. 11) are preferably formed from a polymeric thermosetting or thermoplastic material, such as polyethylene, polypropylene, nylon, acrylonitrile-butadiene-styrene (ABS), glass filled thermoplastics or thermosetting plastics, such as vinyl ester fiberglass, or the like. For particularly large or heavy structures, the panel anchor members 400, 400' are preferably formed from glass filled or mineral fiber filled thermoplastics, such as nylon. The panel anchor members 400, 400' can be formed by any suitable process, such as by molding, injection molding, extrusion or pultrusion. Also, where structural loads are placed upon the panel anchor members, they can be made of metal, such as aluminum or steel, and by casting, molding or stamping.

Each of the panel anchor members 400, 400' include an elongate panel-penetrating portion 402 and a flange 404 adjacent an end of the panel-penetrating portion (FIG. 12). The flange 404 can be any suitable shape, such as square, oval or the like, but in this disclosed embodiment is shown as circular. The flange 404 prevents the panel anchor member 400 from pulling out of the foam insulating panel 12. The flange 404 also captures a portion of the layer of reinforcing material 20 between the flange and the outer surface 11 of the foam insulating panel 12, thereby mechanically attaching the layer of reinforcing material to the foam insulating panel. The panel-penetrating portion 402 can be any suitable cross-sectional shape, such as square, round, oval or the like, but in this embodiment is shown as having a generally plus sign ("+") cross-sectional shape. The panel-penetrating portion 402 comprises four leg members 406, 408, 410 (only three of which are shown in FIG. 12) extending radially outwardly from a central core member. The plus sign ("+") cross-sectional shape of the panel-penetrating portion 402 prevents the panel anchor member 400 from rotating around its longitudinal axis during concrete placement. Formed adjacent an end 412 of the panel anchor member 400 opposite the flange 404 is a notch 414. The notch 414 is formed in each of the four legs 406-410 adjacent the end 412 of the panel anchor member 400 to receive concrete for proper anchorage. The notch 414 can be any shape, such as triangular, round, oval or the like, but in this embodiment is shown as having a generally rectangular shape (FIG. 11). The notch 414 provides a portion of the panel-penetrating portion 402 with an effectively reduced diameter or dimension. As can be seen in FIGS. 11-12, when the flange 404 contacts the layer of reinforcing material 20 (or the outer surface 11 of the foam insulating panel 12 if the layer of reinforcing material is not used), the end 412 of the panel-penetrating portion 402 extend beyond the inner surface 42 of the foam insulating panel 12 into the concrete receiving space 17, preferably approximately halfway between the foam insulating panel 12 and the conventional removable concrete form 14.

The diameter of the flange 404 should be as large as practical to securely hold the foam insulating panel 12 to the hardened concrete 390 in the concrete receiving space 17. Furthermore, the diameter of the flange 404 should be as large as practical to securely hold the layer of reinforcing material 20, if used, against the outer surface 11 of the foam insulating panel 12. It is found as a part of the present invention that a flange 404 having a diameter of approximately 2 to approximately 4 inches, especially approximately 3 inches, is useful in the present invention. Furthermore, the spacing between adjacent panel anchor members 400, 400' will vary depending on factors including the concrete to be formed between the foam insulating panel 12 and the conventional removable concrete form 14 and the type of exterior cladding to be used on the exterior of the foam insulating panel. However, it is found as a part of the present invention that a spacing of adjacent panel anchor members 400, 400' of approximately 6 inch to approximately 24 inch centers, especially 16 inch centers, is useful in the present invention.

On each of the four legs members 406-410 intermediate the end 412 and the flange 404 of the panel anchor member 400 is formed a plurality of fins 416, 418, 420 (only three of which are visible in FIG. 11). The fins 416-420 are formed on the panel-penetrating portion 402 such that when the flange 404 contacts the layer of reinforcing material 20 (or the outer surface 11 of the foam insulating panel 12 if the layer of reinforcing material is not used), the fins are located between the outer surface 11 and the inner surface 42 of the foam insulating panel 12. The fins 416-420 can be any suitable shape, such as round, but in this embodiment are shown as generally rectangular and flaring outwardly from the leg members 406-410 toward the flange 404. Thus, as the end 412 of the panel anchor member 400 is inserted into and through the foam insulating panel 12, the fins 416-420 on the leg members 406-410 slightly compress the foam material allowing them to slide into the foam insulating panel. However, once the flange 404 contacts the layer of reinforcing material 20 (or the outer surface 11 of the foam insulating panel 12 if the layer of reinforcing material is not used), the fins 416-420 resist removal of the panel anchor member 400 from the foam insulating panel. The fins 416-420 therefore provide a one-way locking mechanism; i.e., the panel anchor member 400 can be relatively easily inserted onto the foam insulating panel 12, but once fully inserted, the panel anchor member is locked in place and cannot easily be removed from the foam insulating panel. Therefore, the fins 416-420 prevent the panel anchor member 400 from falling out of the foam insulating panel 12 during transportation, setup and concrete placement.

The leg members 406, 410 include a U-shaped cutout 422 adjacent the end 412 of the panel anchor member 400. The U-shaped cutout 422 is designed and adapted to receive and hold a rebar or wire mesh for reinforcing the concrete in the concrete receiving space 17. Aligned rows of panel anchor members, such as the panel anchor member 400, provide aligned rows of U-shaped cutouts 422 such that adjacent parallel rows of rebar, such as the rebar 62, of desired length can be attached to the rows of panel anchor members. Crossing columns of rebar, such as the rebar 64, can be laid on top of the rows of rebar, such as the rebar 62, to form a conventional rebar grid. Where the rebar 62 intersects the rebar 64, the two rebar can be tied together with wire ties in a conventional manner known in the art.

Formed in the end 430 of the panel anchor member 400 is a longitudinally extending hole 432 axially aligned with the longitudinal axis of the panel anchor member. The hole 432 can be formed by drilling or by molding. The hole 432 is sized and shaped to receive a self-tapping screw 434. If it is desired to attach horizontal whalers, such as the whaler 202, or vertical wall studs to the panel anchor member 400, it can easily be done by inserting the self-tapping screw 434 through, for example, a hole 435 in the whaler 202 and into the hole 432 in the end 430 of the panel anchor member 400. The screw 434 can then be tightened so that the whaler 200 is held firmly in place. It may be desirable to place a washer 436 between the screw head and the whaler 200 so as to spread the load over a larger surface area. Similarly, a whaler 200 can be attached to panel anchor member 400' using a screw 438 and a washer 440 and inserting the screw through a hole 441 in the whaler 200 and into the hole in the end of the panel anchor member. A vertical wall stud (not shown) can be attached to the panel anchor members 400, 400' in the same manner. The whalers 200, 202 can be removed from the panel anchor members 400, 400' by merely removing the screws 434, 438 and pulling the whalers away from the foam insulating panel 12. Thus, the panel anchor members 400, 400' provide a relatively easy way to temporarily attach and remove a whaler, such as the whalers 200, 202, or to permanently attach vertical wall studs.

Figure 13:
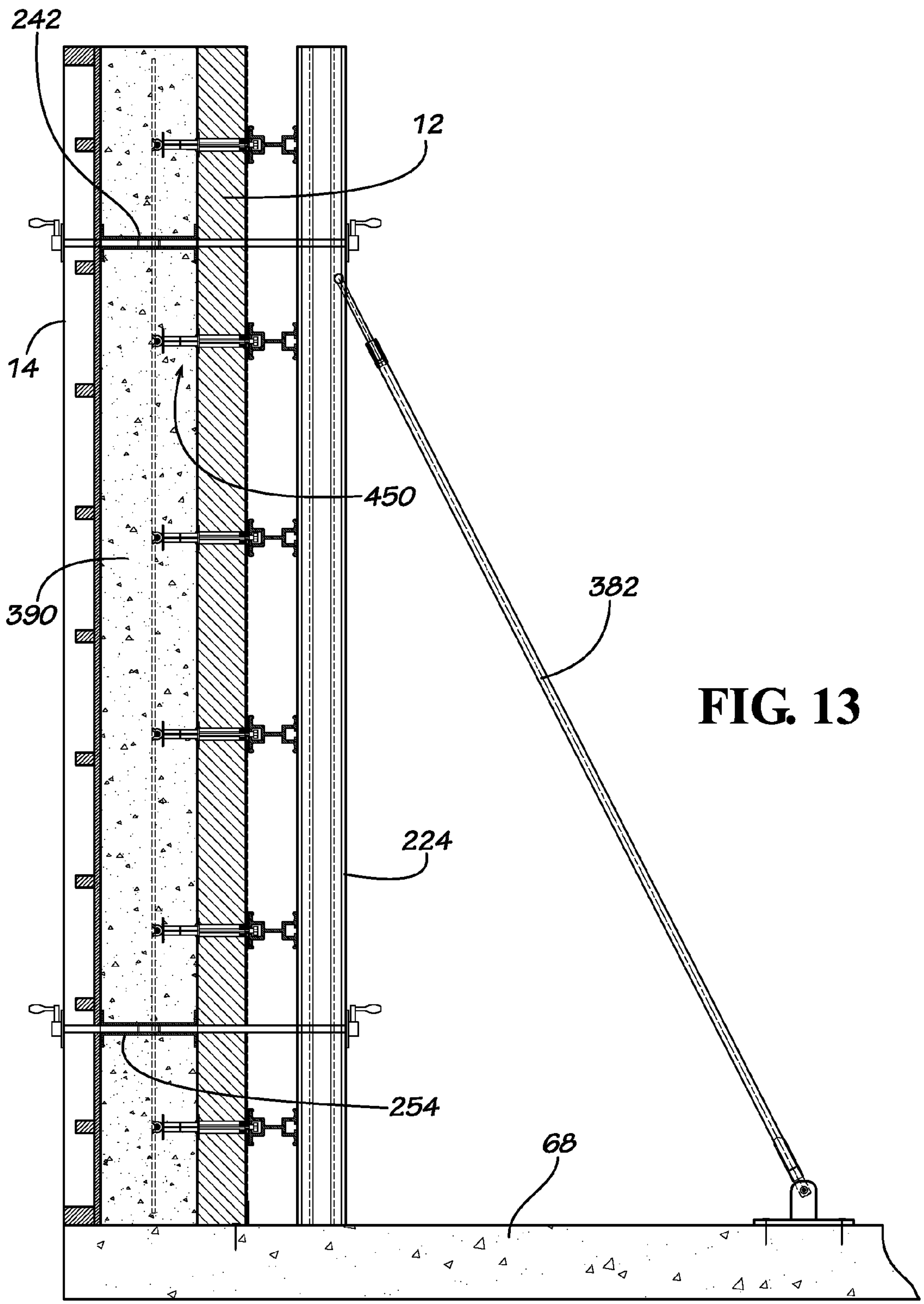
FIG. 13 is a cross-sectional side view of an alternate disclosed embodiment of a hybrid insulated concrete form in accordance with the present invention.
Figure 14:
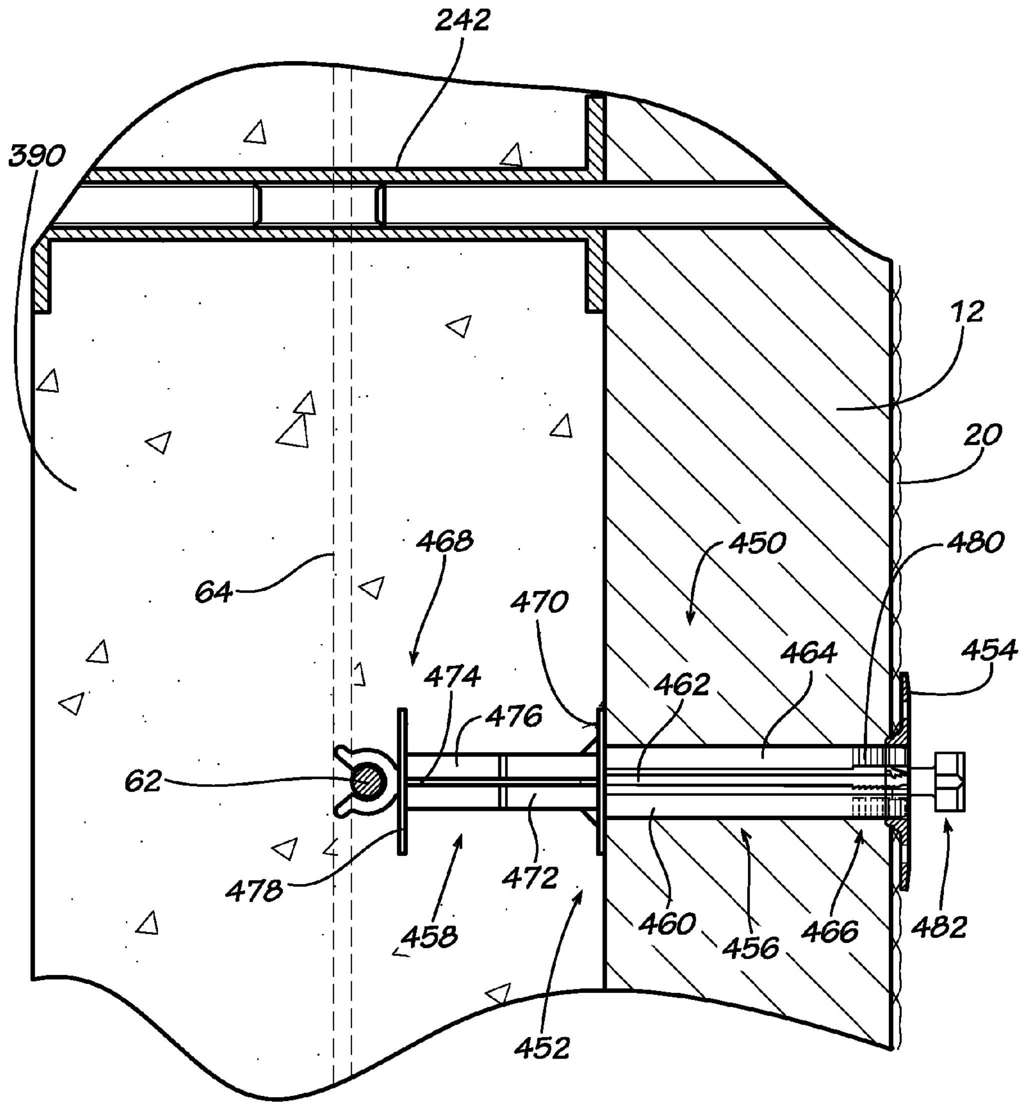
FIG. 14 is a partial detailed cross-sectional side view of the hybrid insulated concrete form of FIG. 13 shown with the conventional removable concrete for, strongbacks and whalers removed.

FIGS. 13 and 14 show an alternate disclosed embodiment of the hybrid insulated concrete form 10. In FIG. 3, the foam insulating panel 12 is shown as the exterior component and the conventional removable concrete form 14 is the interior component. Thus, in FIG. 3 when the conventional removable concrete form 14 is removed, the concrete 390 forms the interior wall surface and the foam insulating panel 12 forms the exterior wall surface. In FIG. 13, these components are reversed. In FIG. 13, the conventional removable concrete form 14 is shown as the exterior component and the foam insulating panel 12 is the interior component. Thus, in FIG. 13 when the conventional removable concrete form 14 is removed, the foam insulating panel 12 forms the interior wall surface and the concrete 390 forms the exterior wall surface.

FIGS. 13 and 14 also disclose an alternate disclosed embodiment of the panel anchor member 24. FIGS. 13 and 14 disclose a panel anchor member/locking cap assembly 450. The design of the panel anchor member/locking cap assembly 450 is disclosed in U.S. Pat. No. 8,555,584 (the disclosure of which is incorporated herein by reference). The panel anchor member/locking cap assembly 450 is preferably formed from a polymeric material, such as polyethylene, polypropylene, nylon, glass filled thermoplastics or the like. For particularly large or heavy structures, the panel anchor member/locking cap assembly 450 is preferably formed from glass filled nylon. The panel anchor member/locking cap assembly 450 can be formed by any suitable process, such as by injection molding. Also, where structural loads are placed upon the panel anchor member/locking cap assembly, it can be made of metal, such as aluminum or steel, and by casting, molding or stamping.

Each panel anchor member/locking cap assembly 450 includes two separate pieces: a panel anchor member 452 and a locking cap 454. The panel anchor member 452 (FIG. 14) includes an elongate panel-penetrating portion 456 and an elongate concrete anchor portion 458. The panel-penetrating portion 456 can be any suitable cross-sectional shape, such as square, round, oval or the like, but in this embodiment is shown as having a generally plus sign ("+") cross-sectional shape. The panel-penetrating portion 456 comprises four leg members 460, 462, 464 (only three of which are shown in FIG. 14) extending outwardly from a central core member. The plus sign ("+") cross-sectional shape of the panel-penetrating portion 456 prevents the panel anchor member 452 from rotating around its longitudinal axis during concrete placement. Formed intermediate each end 466, 468 of the panel anchor member 452 is a central flange 470 that extends radially outwardly from the leg members 460-464. The central flange 470 can be any shape, such as square, oval or the like, but in this embodiment is shown as having a round shape. The central flange 470 includes a generally flat foam insulating panel contacting portion.

The concrete anchor portion 458 of the panel anchor member 452 comprises four outwardly extending leg members 472, 474, 476 (only three of which are shown in FIG. 14). Formed at the end 468 of the concrete anchor portion 458 opposite the flange 470 is another flange 478 that extends radially outwardly from the leg members 472-476. The flange 478 can be any suitable shape, such as square, oval or the like, but in this embodiment is shown as circular. The flange 478 prevents the panel anchor member 452 from pulling out of the concrete after it is cured.

On each of the legs 460-464 adjacent the end 466 of the panel anchor member 452 is formed a plurality of teeth 480 (FIG. 14). The locking cap 454 includes a panel-penetrating receiving portion and a circumferential foam insulating panel contacting portion. The locking cap 454 includes a generally flat foam insulating panel contacting portion adjacent its circumferential edge and a flat exterior surface. The central panel anchor member receiving portion defines an opening for receiving the end 466 of the panel anchor member 452. The opening is sized and shaped such that the four legs 460-464 of the panel penetrating portion 456 will fit through the opening. Formed within the opening are four latch fingers (not shown). Each latch finder includes a plurality of teeth that are sized and shaped to mate with the teeth 480 on the four leg members 472-476 of the panel anchor member 452. The latch fingers are designed so that they can move outwardly; i.e., toward the circumferential portion, when the end 466 of the panel anchor member 452 is inserted in the opening of the locking cap 454, but will tend to return to their original position due to the resiliency of the plastic material from which they are made. Thus, as the end 466 of the panel anchor member 452 is inserted into and through the opening in the locking cap 454, the latch finger teeth will ride over the teeth 480. However, once the latch finger teeth mate with the teeth 480, they prevent removal of the panel anchor member 452 from the locking cap 454. The latch finger teeth and the teeth 480 therefore provide a one-way locking mechanism; i.e., the locking cap 454 can be relatively easily inserted onto the panel anchor member 452, but once fully inserted, the locking cap is locked in place and cannot be removed from the panel anchor member under normally expected forces.

The end 466 of the panel anchor member 452 also includes an optional third anchor portion 482. The third anchor portion 482 is constructed in the same way as the end 50 of the panel anchor member 24 (FIG. 5). Alternatively, the end 466 of the panel anchor member 452 can include a hole (not shown) identical to the hole 432 in the panel anchor member 400 (FIGS. 11 and 12). The third anchor portion 482 of the panel anchor member 450 latches with the key slots formed in the whalers 200-210 and with vertical wall studs (not shown) in the same manner as the panel anchor member 24 as described herein.

FIGS. 15-19 show an alternate disclosed embodiment of the panel anchor member 24. FIGS. 15-19 show a panel anchor member 500. The panel anchor member 500 (FIG. 15) is preferably formed from a polymeric thermosetting or thermoplastic material, such as polyethylene, polypropylene, nylon, acrylonitrile-butadiene-styrene (ABS), glass filled thermoplastics or thermosetting plastics, such as vinyl ester fiberglass, or the like. For particularly large or heavy structures, the panel anchor member 500 is preferably formed from glass filled or mineral fiber filled thermoplastics, such as nylon or metal. The panel anchor member 500 can be formed by any suitable process, such as by casting, molding, injection molding, extrusion or pultrusion. Also, where structural loads are placed upon the panel anchor members, they can be made of metal, such as aluminum or steel, and by casting, molding or stamping.

Figure 15:
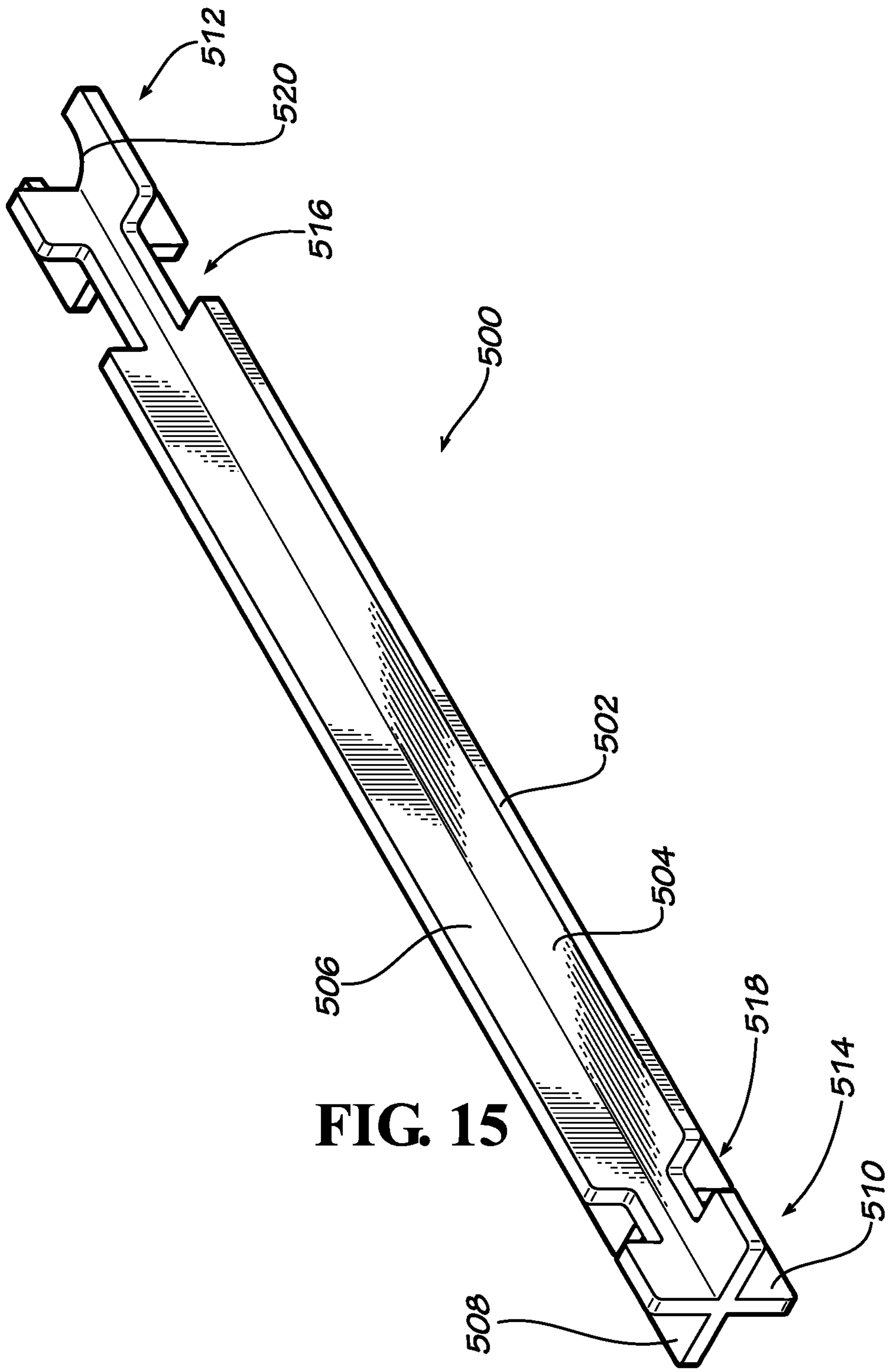
FIG. 15 is a perspective view of an alternate disclosed embodiment of a panel anchor member for use with a disclosed embodiment of a hybrid insulated concrete form of the present invention.
Figure 16:
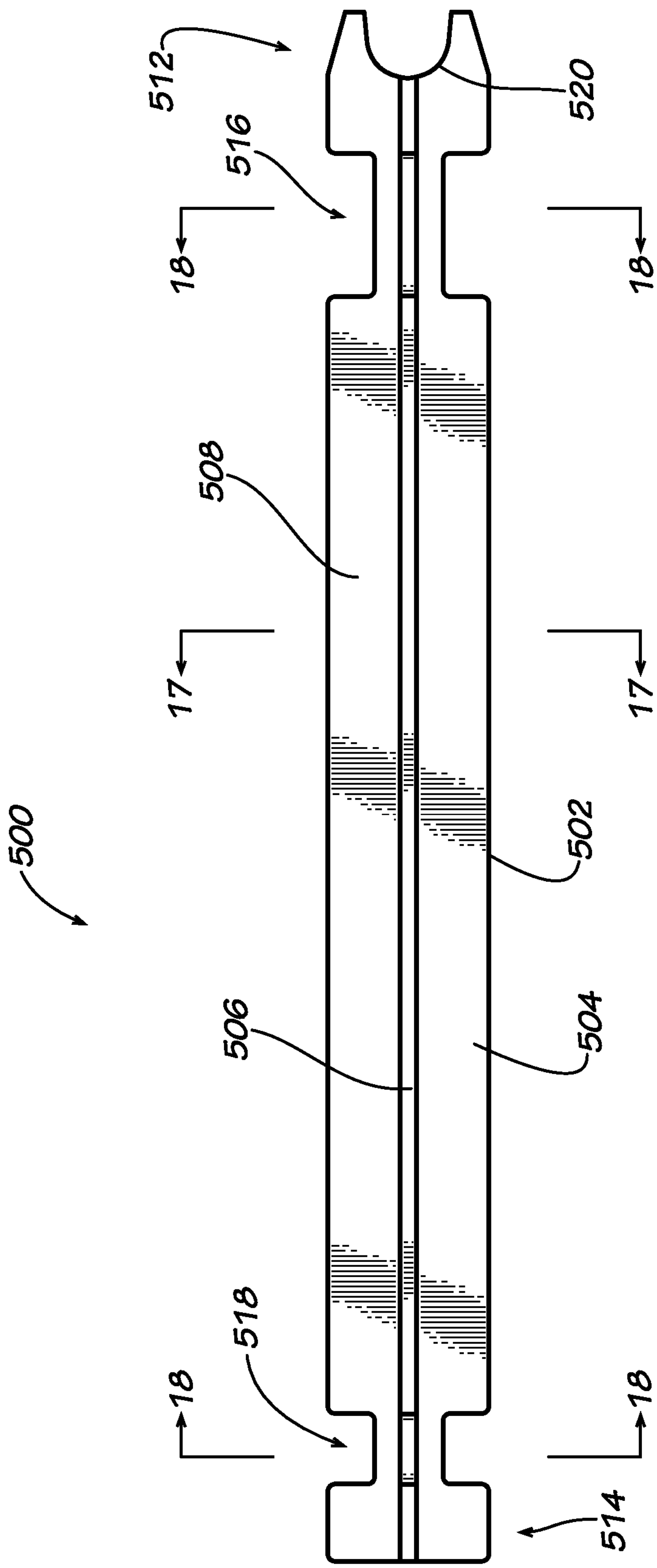
FIG. 16 is a top plan view of the panel anchor member shown in FIG. 14.
Figure 17:
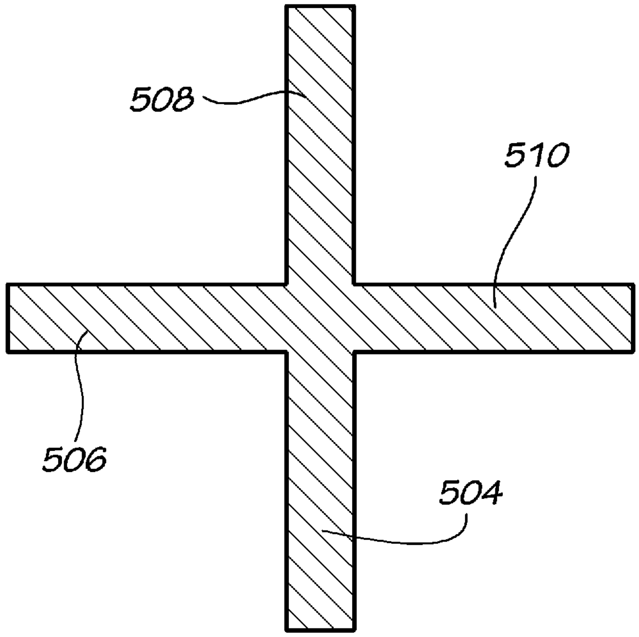
FIG. 17 is a cross-sectional view taken along the line 17-17 of the panel anchor member shown in FIG. 16.

The panel anchor member 500 comprises an elongate body member 502. The elongate body member 502 can be any suitable cross-sectional shape, such as square, round, oval or the like, but in this embodiment is shown as having a generally plus sign ("+") cross-sectional shape. The elongate body member 502 comprises four leg members 504, 506, 508, 510 that extend radially outwardly. The plus sign ("+") cross-sectional shape of the elongate body member 502 prevents the panel anchor member 500 from rotating around its longitudinal axis during concrete placement. The elongate body member 502 has a first end 512 and an opposite second end 514. Formed adjacent the first end 512 of the elongate body member 502 is a first notch 516. The first notch 516 is formed in each of the four leg members 504-510 adjacent the end 512 of the elongate body member 502. The first notch 516 can be any shape, such as triangular, round, oval or the like, but in this embodiment is shown as having a generally rectangular shape (FIGS. 15-16). The first notch 516 provides a portion of the elongate body member 502 that has an effectively reduced diameter or dimension for the concrete to key around it. Similarly, formed adjacent the second end 514 of the elongate body member 502 is a second notch 518. The second notch 518 is formed in each of the four leg members 504-510 adjacent the end 514 of the elongate body member 502. The second notch 518 can be any shape, such as triangular, round, oval or the like, but in this embodiment is shown as having a generally rectangular shape (FIGS. 15-16). The second notch 518 provides a portion of the elongate body member 502 that has an effectively reduced diameter or dimension. The leg members 504, 508 include a U-shaped cutout 520 adjacent the end 512 of the elongate body member 502. The U-shaped cutout 520 is designed and adapted to receive and hold a rebar or wire mesh for reinforcing the concrete in the concrete receiving space 17. Aligned rows of panel anchor members, such as the panel anchor members 500, provide aligned rows of U-shaped cutouts 520 such that adjacent parallel rows of rebar, such as the rebar 62 of desired length can be attached to the rows of panel anchor members. Crossing columns of rebar, such as the rebar 64, can be laid on top of the rows of rebar, such as the rebar 62, to form a conventional rebar grid. Where the rebar 62 intersects the rebar 64, the two rebar can be tied together with wire ties in a conventional manner known in the art.

Figure 18:
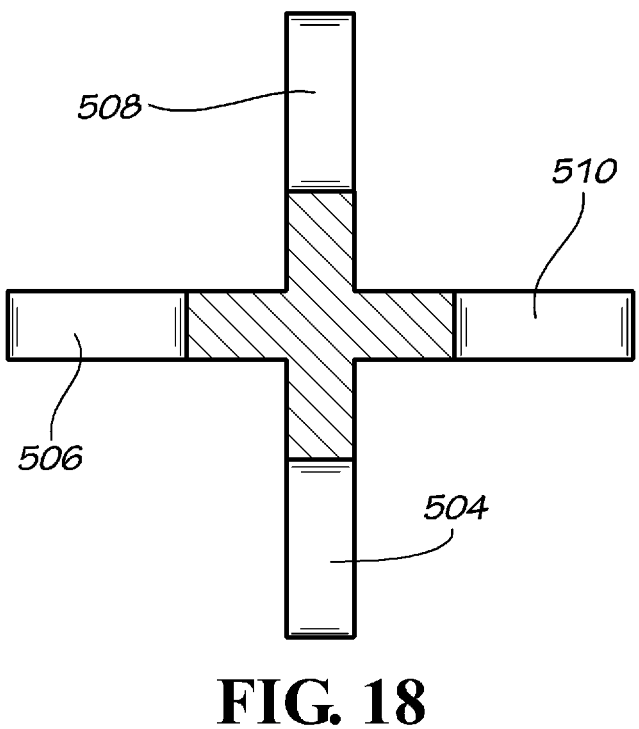
FIG. 18 is a cross-sectional view taken along the line 18-18 of the panel anchor member shown in FIG. 16.
Figure 19:
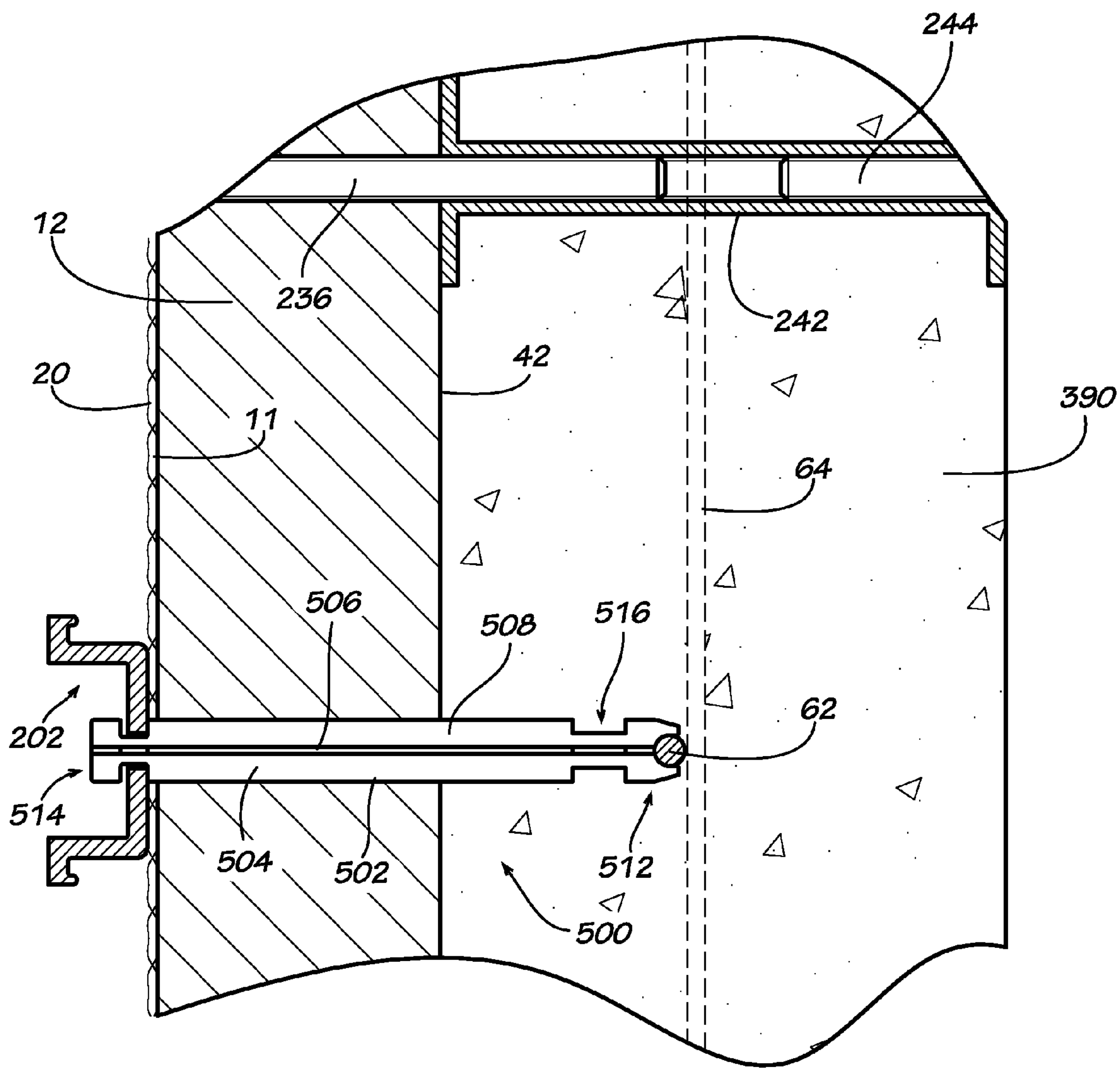
FIG. 19 is a partial detailed cross-sectional side view of a disclosed embodiment of the hybrid insulated concrete form of the present invention shown using the panel anchor member shown in FIG. 15.

The panel anchor member 500 is used in the same manner as the panel anchor members 24, 400. The panel anchor member 500 is inserted through the foam insulating panel 12 until the second notch 518 is flush with the layer of reinforcing material 20 as shown in FIG. 18 (or the second notch 518 is flush with the outer surface 11 of the foam insulating panel 12 if the layer of reinforcing material 20 is not used). The panel anchor member 500 is then held in place by the whaler 202 which engages the second notch 518 with a key slot (not shown) in the same manner as described above for the whaler 200 and the panel anchor member 24. Once the concrete 390 hardens, the end 512 of the panel anchor member 500 is embedded in the hardened concrete. The whaler 202 can then be removed. The second notch 518 can then be used for attaching a stud member (not shown) using a key slot (not shown) as described further below.

Figure 20:
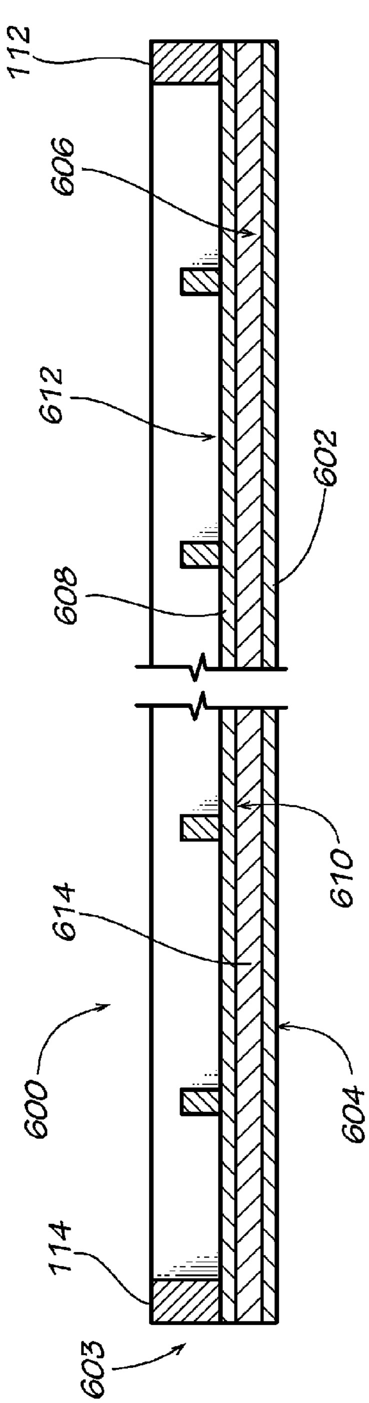
FIG. 20 is a cross-sectional view taken along the line 8-8 of the conventional removable concrete form shown in FIG. 7 showing an alternate disclosed embodiment of the face panel.
Figure 21:
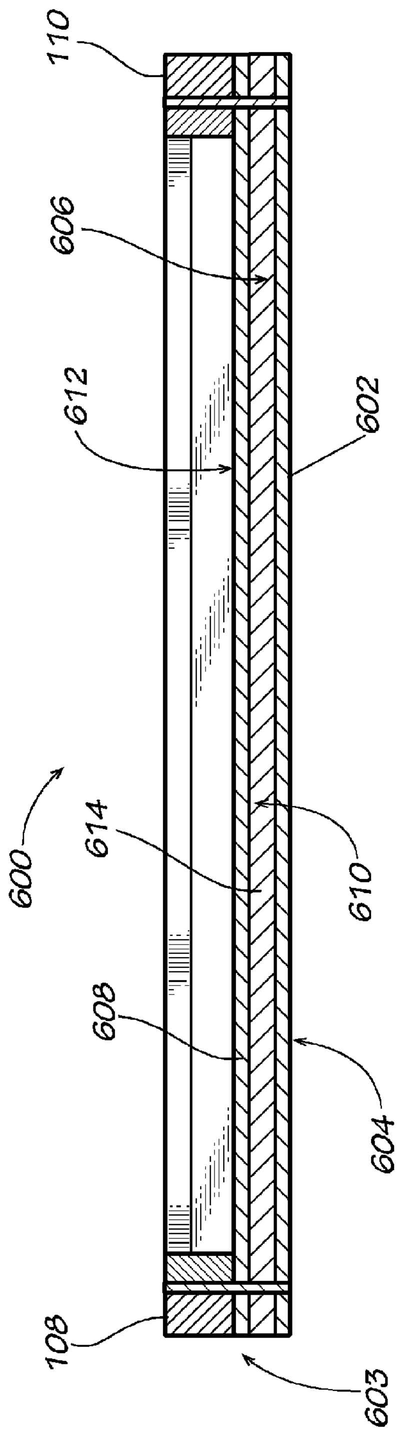
FIG. 21 is a cross-sectional view taken along the line 9-9 of the conventional removable concrete form shown in FIG. 7 showing an alternate disclosed embodiment of the face panel.

FIGS. 20 and 21 show an alternate disclosed embodiment of the conventional removable concrete form, such as the conventional removable concrete form 14 shown in FIGS. 7-9. The alternate disclosed embodiment is an insulated removable concrete form 600 as disclosed in U.S. Published Patent Application Publication No. 2014/0084132 (the disclosure of which is incorporated herein by reference in its entirety). The insulated removable concrete form 600 is identical to the conventional removable concrete form 14 shown in FIGS. 7-9, except for the construction of the face panel 100. The alternate construction of the face panel 100 is shown in FIGS. 20 and 21. FIGS. 20 and 21 disclose an insulated concrete form 600 comprising a face or first panel 602 and a frame 603. The first panel 602 and frame 603 can be identical to the prior art face panel 100 and frame 106, as described above, and therefore will not be described in any more detail here. The first panel 602 has a first primary surface 604 for contacting plastic concrete and an opposite second primary surface 606. The insulated concrete form 600 also comprises a second panel 608 identical, or substantially identical, to the first panel 602. The second panel 608 has a first primary surface 610 and an opposite second primary surface 612. The first primary surface 610 of the second panel 608 is adjacent the second primary surface 606 of the first panel 602. Disposed between the first and second panels 602, 608 is a layer of insulating material 614. The layer of insulating material 614 covers, or substantially covers, the second primary surface 606 of the first panel 602 and/or the first primary surface 610 of the second panel 608. As used herein the term "substantially covers" means covering at least 80% of the surface area.

The layer of insulating material 614 is preferably made from closed cell polymeric foam including, but not limited to, polyvinyl chloride, urethane, polyurethane, polyisocyanurate, phenol, polyethylene, polyimide or polystyrene foam. Such foam preferably has a density of 1 to 3 pounds per cubic foot, or more. The layer of insulating material 614 preferably has insulating properties equivalent to at least 0.25 inches of expanded polystyrene foam, equivalent to at least 0.5 inches of expanded polystyrene foam, preferably equivalent to at least 1 inch of expanded polystyrene foam, more preferably equivalent to at least 2 inches of expanded polystyrene foam, more preferably equivalent to at least 3 inches of expanded polystyrene foam, most preferably equivalent to at least 4 inches of expanded polystyrene foam. There is no maximum thickness for the equivalent expanded polystyrene foam useful in the present invention. The maximum thickness is usually dictated by economics, ease of handling and building or structure design. However, for most applications a maximum insulating equivalence of 8 inches of expanded polystyrene foam can be used. In another embodiment of the present invention, the layer of insulating material 614 has insulating properties equivalent to approximately 0.25 to approximately 8 inches of expanded polystyrene foam, preferably approximately 0.5 to approximately 8 inches of expanded polystyrene foam, preferably approximately 1 to approximately 8 inches of expanded polystyrene foam, preferably approximately 2 to approximately 8 inches of expanded polystyrene foam, more preferably approximately 3 to approximately 8 inches of expanded polystyrene foam, most preferably approximately 4 to approximately 8 inches of expanded polystyrene foam. These ranges for the equivalent insulating properties include all of the intermediate values. Thus, the layer of insulating material 614 used in another disclosed embodiment of the present invention has insulating properties equivalent to approximately 0.25 inches of expanded polystyrene foam, approximately 0.5 inches of expanded polystyrene foam, approximately 1 inch of expanded polystyrene foam, approximately 2 inches of expanded polystyrene foam, approximately 3 inches of expanded polystyrene foam, approximately 4 inches of expanded polystyrene foam, approximately 5 inches of expanded polystyrene foam, approximately 6 inches of expanded polystyrene foam, approximately 7 inches of expanded polystyrene foam, or approximately 8 inches of expanded polystyrene foam. Expanded polystyrene foam has an R-value of approximately 4 to 6 per inch thickness. Therefore, the layer of insulating material 614 should have an R-value of greater than 1.5, preferably greater than 4, more preferably greater than 8, especially greater than 12, most especially greater than 20. The layer of insulating material 614 preferably has an R-value of approximately 1.5 to approximately 40; more preferably between approximately 4 to approximately 40; especially approximately 8 to approximately 40; more especially approximately 12 to approximately 40. The layer of insulating material 614 preferably has an R-value of approximately 1.5, more preferably approximately 4, most preferably approximately 8, especially approximately 20, more especially approximately 30, most especially approximately 40.

For the insulated concrete form 600, the layer of insulating material 614 can also be made from a refractory insulating material, such as a refractory blanket, a refractory board or a refractory felt or paper. Refractory insulation is typically used to line high temperature furnaces or to insulate high temperature pipes. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, Wollastonite and fireclay. Refractory insulating material is commercially available in various forms including, but not limited to, bulk fiber, foam, blanket, board, felt and paper form. Refractory insulation is commercially available in blanket form as Fiberfrax Durablanket® insulation blanket from Unifrax I LLC, Niagara Falls, N.Y., USA and RSI4-Blank and RSI8-Blank from Refractory Specialties Incorporated, Sebring, Ohio, USA. Refractory insulation is commercially available in board form as Duraboard® from Unifrax I LLC, Niagara Falls, N.Y., USA and CS85, Marinite and Transite boards from BNZ Materials Inc., Littleton, Colo., USA. Refractory insulation in felt form is commercially available as Fibrax Felts and Fibrax Papers from Unifrax I LLC, Niagara Falls. The refractory insulating material can be any thickness that provides the desired insulating properties, as set forth above. There is no upper limit on the thickness of the refractory insulating material; this is usually dictated by economics. However, refractory insulating material useful in the present invention can range from 1/32 inch to approximately 2 inches. Similarly, ceramic fiber materials including, but not limited to, silica, silicon carbide, alumina, aluminum silicate, aluminum oxide, zirconia, calcium silicate; glass fibers, mineral wool fibers, Wollastonite and fireclay, can be suspended in a polymer, such as polyurethane, latex, cement or epoxy, and used as a coating to create a refractory insulating material layer, for example covering, or substantially covering, one of the primary surfaces 606, 610 of the first or second panels 602, 608, or both. Such a refractory insulating material layer can be used as the layer of insulating material 614 to block excessive ambient heat loads and retain the heat of hydration of plastic concrete within the insulated concrete forms of the present invention. Ceramic fibers in a polymer or epoxy binder are commercially available as Super Therm®, Epoxotherm and HPC Coating from Superior Products, II, Inc., Weston, Fla., USA. Especially ceramic fibers can be suspended in polyurethane foam to create a coating, such as the Super Therm®. It is also contemplated that the layer of insulating material 614 can be a combination of at least one layer of closed cell polymeric foam, such as polystyrene foam, and at least one layer of refractory insulating material, such as a layer of ceramic fibers in a polymer binder. As used herein, the term "refractor material" and "ceramic fibers" is specifically intended to exclude asbestos.

The removable insulated concrete form 600 is used in the same manner as the conventional removable concrete form 14 described above. The removable insulated concrete form 600 is left in place for a time sufficient for the plastic concrete within the hybrid concrete form 10 to at least partially cure. While the removable insulated concrete form 600 is in place, the layer of insulating material 614 and the foam insulating panel 12 reduce the amount of the heat of hydration lost from the curing concrete to the surrounding environment. By retaining at least a portion of the heat of hydration, the plastic concrete in the hybrid insulated concrete form 10 with the removable insulated concrete form 600 cures more quickly and achieves better physical properties than it would have had it been cured in two conventional removable concrete forms. This is true for conventional portland cement concrete, but is even more so for concrete including portland cement and slag cement and/or fly ash, as described below. Furthermore, it is desirable to leave the removable insulated concrete form 600 in place for a period of 1 to 28 days, preferably 1 to 14 days, more preferably 2 to 14 days, especially 5 to 14 days, more especially 1 to 7 days, most especially 1 to 3 days. After the concrete 390 has cured to a desired degree, the removable insulated concrete form 600 can be stripped from the concrete in the manner described herein.

Figure 22:
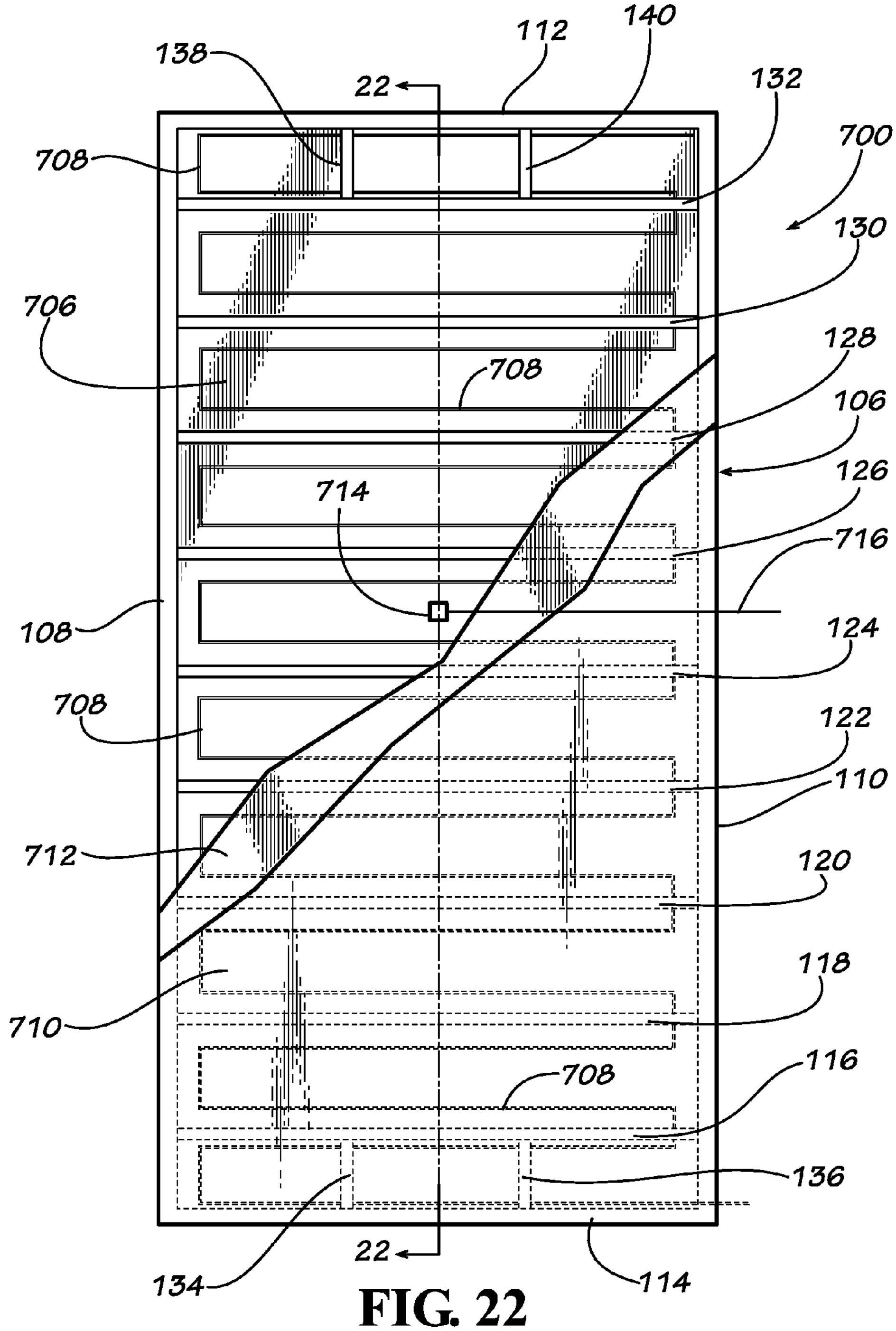
FIG. 22 is a side plan view of a disclosed embodiment of an electrically heated removable concrete form for use in a disclosed embodiment of a hybrid insulated concrete form in accordance with the present invention.
Figure 23:
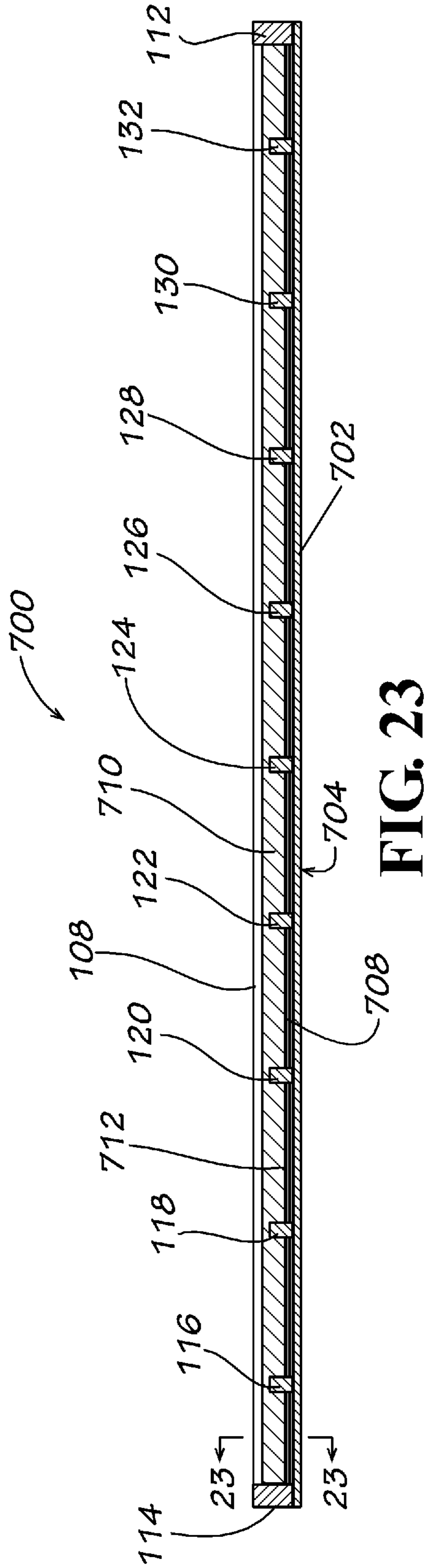
FIG. 23 is a cross-sectional view taken along the line 23-23 of the electrically heated removable concrete form shown in FIG. 22.
Figure 24:
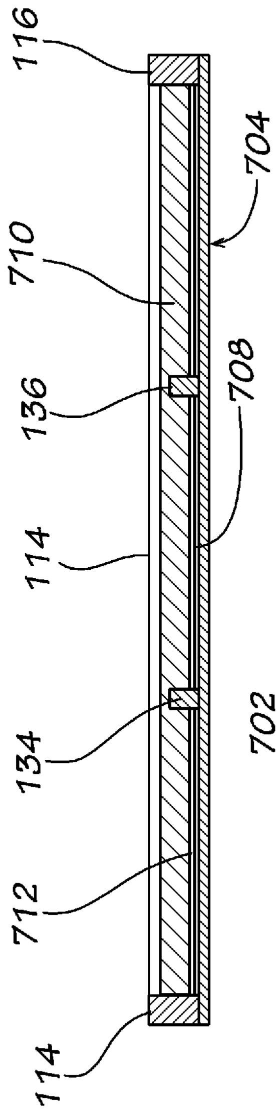
FIG. 24 is a cross-sectional view taken along the line 24-24 of the electrically heated removable concrete form shown in FIG. 23.

FIGS. 22-24 show an alternate disclosed embodiment of the conventional removable concrete form, such as the conventional removable concrete form 14 shown in FIGS. 7-9. The alternate disclosed embodiment is an electrically heated removable concrete form as disclosed in U.S. Pat. No. 8,532,815 (the disclosure of which is incorporated herein by reference in its entirety). FIGS. 22-24 disclose an electrically heated removable concrete form 700. The electrically heated removable concrete form 700 comprises a rectangular concrete forming panel 702 identical to the face panel 100; however the concrete forming panel 702 is made from a heat conducting material, such as aluminum or steel. Most prior art concrete forms use wood, plywood, wood composite materials, or wood or composite materials with polymer coatings for the concrete forming panel of their concrete forms. Although wood, plywood, wood composite materials, or wood or composite materials with polymer coatings are not very good conductors of heat, they do conduct some heat. Therefore, wood, plywood, wood composite materials, and wood or composite materials with polymer coatings are considered useful materials from which to make the concrete forming panel 702, although they are not preferred. The concrete forming panel 702 has a first surface 704 for contacting plastic concrete and an opposite second surface 706. The first surface 704 is usually smooth and flat. However, the first surface 704 can also be contoured so as to form a desired design in the concrete, such as a brick or stone pattern.

On the second surface 706 of the panel 702 is an electric resistance heating ribbon, tape or wire 708. The electric resistance heating wire 708 produces heat when an electric current is passed through the wire. Electric resistance heating ribbons, tapes or wires are known in the art and are the same type as used in electric blankets and other electric heating devices. The electric resistance heating wire 708 is electrically insulated so that it will not make electrical contact with the panel 702. However, the electric resistance heating wire 708 is in thermal contact with the panel 702 so that when an electric current is passed through the electric resistance heating wire 708, it heats the panel. The electric resistance heating wire 708 is placed in a serpentine path on the second surface 706 of the panel 702 so that the panel is heated uniformly. Holes (not shown) are provided in the bracing members 116-132 so that the electric resistance heating wire 708 can pass there through. The electric resistance heating wire 708 is of a type and the amount of wire in contact with the panel 702 is selected so that the electric resistance heating wire will heat the panel to a temperature at least as high as the desired temperature of the concrete. The electrically heated removable concrete form 700 can also be used to accelerate the curing of concrete, as described herein. Therefore, it is desirable that the panel 702 be able to be heated by the electric resistance heating wire 708 to temperatures sufficient to accelerate the curing of the concrete, such as at least as high as 70° C.

Also, optionally disposed on the second surface 706 of the panel 702 is a layer of insulating material 710. The layer of insulating material 710 is preferably a closed cell polymeric foam, such as expanded polystyrene, polyisocyanurate, polyurethane, and the like. The layer of insulating material 710 has insulating properties equivalent to at least 0.25 inches of expanded polystyrene foam; preferably equivalent to at least 0.5 inch of expanded polystyrene foam, more preferably equivalent to at least 1 inch of expanded polystyrene foam, most preferably equivalent to at least 2 inches of expanded polystyrene foam, especially equivalent to at least 3 inches of expanded polystyrene foam, more especially equivalent to at least 4 inches of expanded polystyrene foam. The layer of insulating material 710 can have insulating properties equivalent to approximately 0.25 inches to approximately 8 inches of expanded polystyrene foam. The layer of insulating material 710 can have insulating properties equivalent to approximately 0.25 inches, approximately 0.5 inches, approximately 1 inch, approximately 2 inches, approximately 3 inches or approximately 4 inches of expanded polystyrene foam. The layer of insulating material 710 can have an R-value of greater than 1.5, preferably greater than 2.5, more preferably greater than 5, most preferably greater than 10, especially greater than 15, more especially greater than 20. The layer of insulating material 710 preferably has an R-value of approximately 2.5 to approximately 40; more preferably between approximately 10 to approximately 40; especially approximately 15 to approximately 40; more especially approximately 20 to approximately 40. The layer of insulating material 710 preferably has an R-value of approximately 2.5, preferably approximately 5, more preferably approximately 10, most preferably approximately 15, especially approximately 20.

The layer of insulating material 710 is positioned between the bracing members 108-140 and such that the electric resistance heating wire 708 is positioned between the layer of insulating material and the second surface 706 of the panel 702. Optionally, the surface of the layer of insulating material 710 adjacent the second surface 706 of the panel 702 includes a layer of radiant heat reflective material 712, such as a metal foil, especially aluminum foil. The layer of radiant heat reflective material 712 helps direct the heat from the electric resistance heating wire 708 toward the panel 702. A preferred radiant heat reflective material is a metalized polymeric film, more preferably, metalized biaxially-oriented polyethylene terephthalate film, especially aluminized biaxially-oriented polyethylene terephthalate film. Alternately, the layer of heat reflective material 712 can be positioned on the side of the layer of insulating material 710 opposite the electric resistance heating wire 708 or within the layer of insulating material. The layer of insulating material 710 can be preformed and affixed in place on the second surface 706 of the panel 702, or the layer of insulating material can be formed in situ, such as by spraying a foamed or self-foaming polymeric material into the cavity formed by the second surface of the panel and adjacent the frame bracing members 108-140. Another preferred material for the layer of insulating material 710 is metalized plastic bubble pack type insulating material or metalized closed cell polymeric foam. Such material is commercially available as Space Age® reflective insulation from Insulation Solutions, Inc., East Peoria, Ill. 61611. The Space Age® product is available as two layers of polyethylene air bubble pack sandwiched between one layer of white polyethylene and one layer of reflective foil; two layers air bubble pack sandwiched between two layers of reflective foil; or a layer of closed cell polymeric foam (such as high density polyethylene foam) disposed between one layer of polyethylene film and one layer of reflective foil. All three of these Space Age® product configurations are useful in the present invention for the radiant heat reflective material 712.

A preferred construction is to apply a first layer of insulating material 710 over the electric resistance heating wire 708 and second surface 706 of the panel 702 followed by a 1 mil sheet of aluminized Mylar® film, followed by another layer of foam insulating material. The aluminized Mylar® film is thus sandwiched between two layers of foam insulating material, such as expanded polystyrene foam, and the sandwiched insulation is then placed on top of the electric resistance heating wire 708 and second surface 706 of the panel 702. More preferably, the first layer of the sandwich described above covers the electric resistance heating wire 708 and the second surface 706 of the panel 702 between the bracing members 108-140 and the aluminized Mylar® film and the second layer of insulating material covers the first layer of insulating material and the bracing members. This construction provides a layer of insulation on the bracing members 108-140 and prevents them from thermally bridging the panel 702.

For the electrically heated removable concrete form 700, the layer of insulating material 710 can also be made from a refractory insulating material, such as a refractory blanket, a refractory board or a refractory felt or paper. Refractory insulation is typically used to line high temperature furnaces or to insulate high temperature pipes. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, Wollastonite and fireclay. Refractory insulating material is commercially available in various forms including, but not limited to, bulk fiber, foam, blanket, board, felt and paper form. Refractory insulation is commercially available in blanket form as Fiberfrax Durablanket® insulation blanket from Unifrax I LLC, Niagara Falls, N.Y., USA and RSI4-Blank and RSI8-Blank from Refractory Specialties Incorporated, Sebring, Ohio, USA. Refractory insulation is commercially available in board form as Duraboard® from Unifrax I LLC, Niagara Falls, N.Y., USA and CS85, Marinite and Transite boards from BNZ Materials Inc., Littleton, Colo., USA. Refractory insulation in felt form is commercially available as Fibrax Felts and Fibrax Papers from Unifrax I LLC, Niagara Falls. The refractory insulating material can be any thickness that provides the desired insulating properties, as set forth above. There is no upper limit on the thickness of the refractory insulating material; this is usually dictated by economics. However, refractory insulating material useful in the present invention can range from 1/32 inch to approximately 2 inches. Similarly, ceramic fiber materials including, but not limited to, silica, silicon carbide, alumina, aluminum silicate, aluminum oxide, zirconia, calcium silicate; glass fibers, mineral wool fibers, Wollastonite and fireclay, can be suspended in a polymer, such as polyurethane, latex, cement or epoxy, and used as a coating to create a refractory insulating material layer as the layer of insulating material 710 to block excessive ambient heat loads and retain the heat of hydration within the hybrid insulated concrete form of the present invention. Ceramic fibers in a polymer or epoxy binder are commercially available as Super Therm®, Epoxotherm and HPC Coating from Superior Products, II, Inc., Weston, Fla., USA. Especially ceramic fibers can be suspended in polyurethane foam to create a coating such as the Super Therm. It is also contemplated that the layer of insulating material 710 can be a combination of at least one layer of closed cell polymeric foam, such as polystyrene foam, and at least one layer of refractory insulating material, such as a layer of ceramic fibers in a polymer binder. As used herein, the term "refractor material" and "ceramic fibers" is specifically intended to exclude asbestos.

The electrically heated removable concrete form 700 is used in combination with the foam insulating panel 12 in the same manner as the conventional removable concrete form 14, as described above. However, after plastic concrete is placed in the hybrid insulated concrete form 10, the electric resistance heating wire 708 is energized so as to heat the panel 702 to a desired temperature. When greater control of the temperature of the electrically heated removable concrete form 700 is desired, a temperature sensor 714 is optionally placed in thermal contact with the second surface 706 of the panel 702. The temperature sensor 714 is connected to a computing device (not shown) by an electric circuit, such as by the wires 716. The temperature sensor 714 is in thermal contact with the second surface 706 of the panel 702 (FIG. 22). The temperature sensor 714 allows the computing device to continuously, or periodically, read and store the temperature of the panel 702.

The electrically heated removable concrete form 700 can be operated in several different modes. These modes of operation are disclosed in U.S. Pat. No. 8,532,815 (the disclosure of which is incorporated herein by reference in its entirety). In a first mode of operation, the electric resistance heating wire 708 is operated in an on/off mode. In this mode, a constant amount of electricity is provided to the electric resistance heating wire 708 so that a constant amount of heat is provided to the panel 702. Thus, an operator can turn the heat on and turn the heat off or this can be done automatically by a suitable controller. For this mode of operation, no computing device and no temperature sensors are required; a simple controller with an on/off switch will suffice.

In the next mode of operation, various fixed amounts of electricity are provided to the electric resistance heating wire 708, such as a low amount, a medium amount and a high amount. This can be done by providing a different voltage to the electric resistance heating wire 708 or by changing the amount of time that the electric resistance heating wire is energized in the electrically heated removable concrete form 700. Thus, an operator can select one of several predetermined amounts of heat provided to the panel 702. For this mode of operation, no computing device and no temperature sensors are required; a simple controller with a selector switch will suffice.

The next mode of operation is for the panel 702 to be held at a constant desired temperature. For this mode of operation, a computing device (not shown) is programmed to perform the process disclosed in U.S. Pat. No. 8,532,815 (the disclosure of which is incorporated herein by reference in its entirety).

The next mode of operation is for the computing device to control the amount of heat provided by the electric resistance heating wire 708 so that the temperature of the curing concrete within the form matches a desired temperature profile over time. For this mode of operation, a computing device (not shown) is programmed to perform the process disclosed in U.S. Pat. No. 8,532,815 (the disclosure of which is incorporated herein by reference in its entirety).

As used herein the term "temperature profile" includes increasing the concrete temperature above ambient temperature over a period of time followed by decreasing the concrete temperature over a period of time, preferably to ambient temperature, wherein the slope of a line plotting temperature versus time during the temperature increase phase is greater than the absolute value of the slope of a line plotting temperature versus time during the temperature decrease phase. Furthermore, the absolute value of the slope of a line plotting temperature versus time during the temperature decrease phase of the temperature profile in a concrete form in accordance with the present invention is less than the absolute value of the slope of a line plotting temperature versus time if all added heat were stopped and the concrete were simply allowed to cool in a conventional concrete form; i.e., an uninsulated concrete form, under the same conditions.

The term "temperature profile" includes the specific ranges of temperature increase and ranges of temperature decrease over ranges of time as follows. The temperature of the concrete initially increases quite rapidly over a relatively short time, such as 1 to 3 days. After a period of time, the concrete temperature reaches a maximum and then slowly drops to ambient temperature over an extended period, such as 1 to 7 days, preferably 1 to 14 days, more preferably 1 to 28 days, especially 3 to 5 days or more especially 5 to 7 days. The maximum temperature will vary depending on the composition of the concrete mix. However, it is desirable that the maximum temperature is at least 35° C., preferably, at least 40° C., at least 45° C., at least 50° C., at least 55° C., at least 60° C. or at least 65° C. The maximum concrete temperature should not exceed about 70° C. The maximum concrete temperature is preferably about 70° C., about 69° C., about 68° C., about 67° C., about 66° C., about 65° C., about 64° C., about 63° C., about 62° C., about 61° C. about 60° C. or about 60 to about 70° C. Furthermore, it is desirable that the temperature of the concrete is maintained above approximately 30° C., approximately 35° C., approximately 40° C., approximately 45° C., approximately 50° C., approximately 55° C. or approximately 60° C. for 1 to approximately 4 days from the time of concrete placement, preferably 1 to approximately 3 days from the time of concrete placement, more preferably about 24 to about 48 hours from the time of concrete placement. It is also desirable that the temperature of the concrete is maintained above approximately 30° C. for 1 to approximately 7 days from the time of concrete placement, preferably above approximately 35° C. for 1 to approximately 7 days from the time of concrete placement, more preferably above approximately 40° C. for 1 to approximately 7 days from the time of concrete placement, most preferably above approximately 45° C. for 1 to approximately 7 days from the time of concrete placement. It is also desirable that the temperature of the concrete be maintained above ambient temperature for 1 to approximately 3 days from the time of concrete placement; 1 to approximately 5 days from the time of concrete placement, for 1 to approximately 7 days from the time of concrete placement, for 1 to approximately 14 days from the time of concrete placement, preferably approximately 3 to approximately 14 days from the time of concrete placement, especially approximately 7 to approximately 14 days from the time of concrete placement. It is also desirable that the temperature of the concrete be maintained above ambient temperature for approximately 3 days, approximately 5 days, approximately 7 days or approximately 14 days from the time of concrete placement. It is further desirable that the temperature of the concrete be reduced from the maximum temperature to ambient temperature gradually, such as in increments of approximately 0.5 to approximately 5° C. per day, preferably approximately 1 to approximately 2° C. per day, especially approximately 1° C. per day.

The term "temperature profile" includes increasing the temperature of curing concrete in the concrete form of the present invention to a maximum temperature at least 10% greater than the maximum temperature the same concrete mix would have reached in a conventional (i.e., non-insulated) concrete form or mold of the same configuration. The term "temperature profile" also includes reducing the temperature of curing concrete in a concrete form or mold from its maximum temperature at a rate slower than the rate the same concrete mix would reduce from its maximum temperature in a conventional (i.e., non-insulated) concrete form or mold of the same configuration. The principle behind concrete maturity is the relationship between strength, time, and temperature in young concrete. Maturity is a powerful and accurate means to predict early strength gain. Concrete maturity is measured as "equivalent age" and is given in temperature degrees x hours (either ° C.-Hrs or ° F.-Hrs). The term "temperature profile" includes controlling the temperature of curing concrete by first retaining the heat of hydration and selectively adding heat so that at 3 days it has a concrete maturity or equivalent age at least 25% greater than the same concrete mix would have in a conventional (i.e., non-insulated) concrete form or mold of the same configuration under the same conditions; preferably at least 30% greater, more preferably at least 35% greater, most preferably at least 40% greater, especially at least 45% greater, more especially at least 50% greater. The term "temperature profile" includes controlling the temperature of curing concrete by first retaining the heat of hydration and selectively adding heat so that at 3 days it has a concrete maturity or equivalent age about 70% greater than the same concrete mix would have when cured in accordance with ASTM C-39; preferably at least 75% greater, more preferably at least 80% greater, most preferably at least 85% greater, especially at least 90% greater, more especially at least 95% greater, most especially at least 100% greater. The term "temperature profile" includes controlling the temperature of curing concrete by first retaining the heat of hydration and selectively adding heat so that at 7 days it has a concrete maturity or equivalent age about 70% greater than the same concrete mix would have when cured in accordance with ASTM C-39; preferably at least 75% greater, more preferably at least 80% greater, most preferably at least 85% greater, especially at least 90% greater, more especially at least 95% greater, most especially at least 100% greater. The term "temperature profile" specifically does not include adding a constant amount of heat to the concrete followed by stopping adding heat to the concrete, such as would be involved when turning an electrically heated blanket or heated concrete form on and then turning the heated blanket or heated concrete form off.

Figure 25:
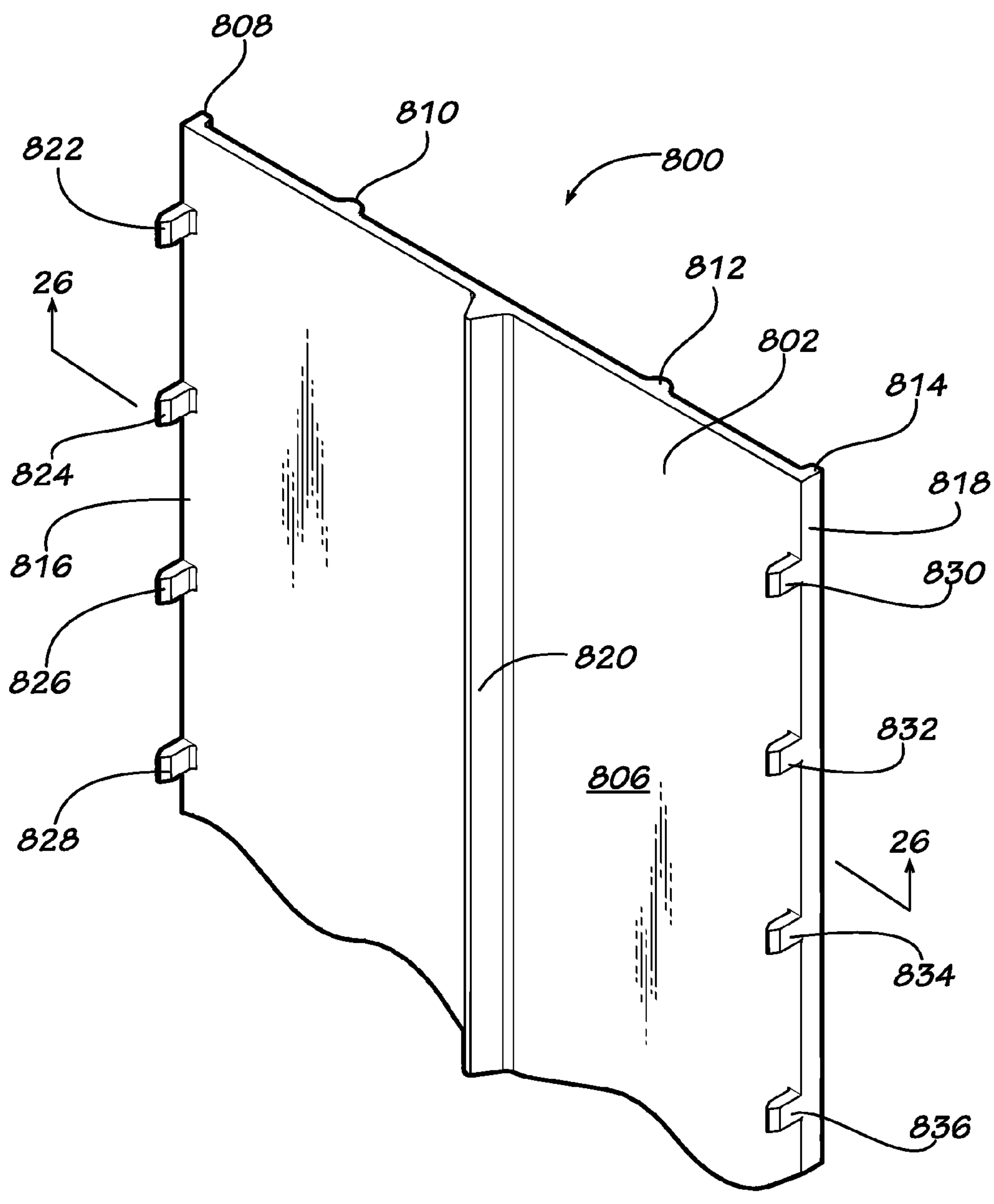
FIG. 25 is a perspective view of a disclosed embodiment of a joint reinforcing panel in accordance with the present invention.
Figure 26:
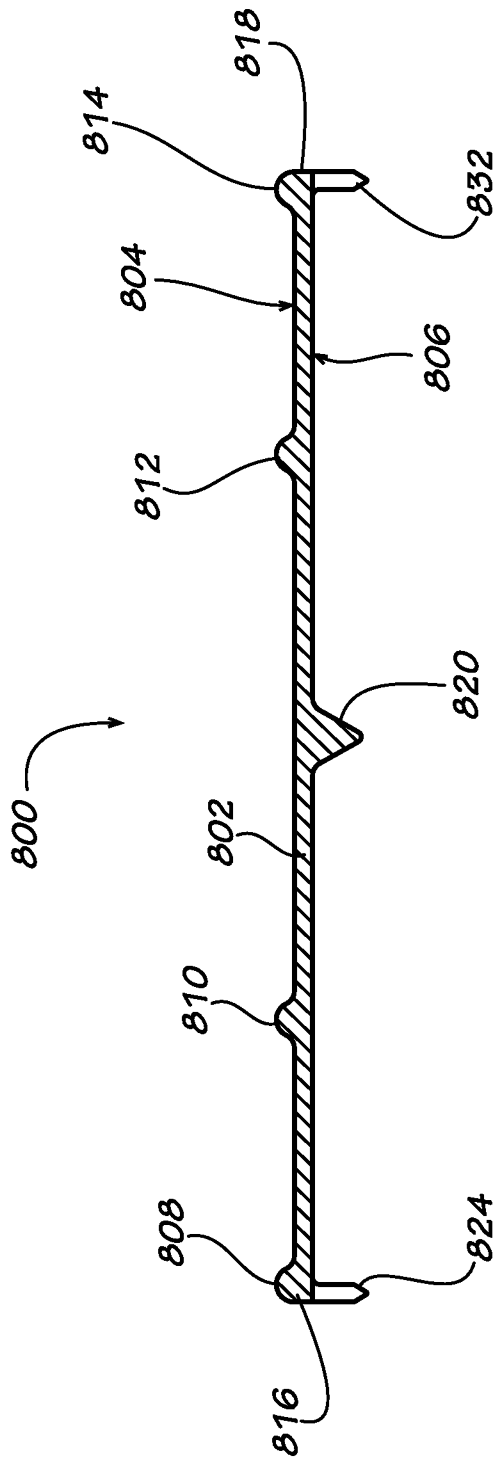
FIG. 26 is a cross-section view taken along the line 26-26 of the joint reinforcing panel shown in FIG. 25.
Figure 27:
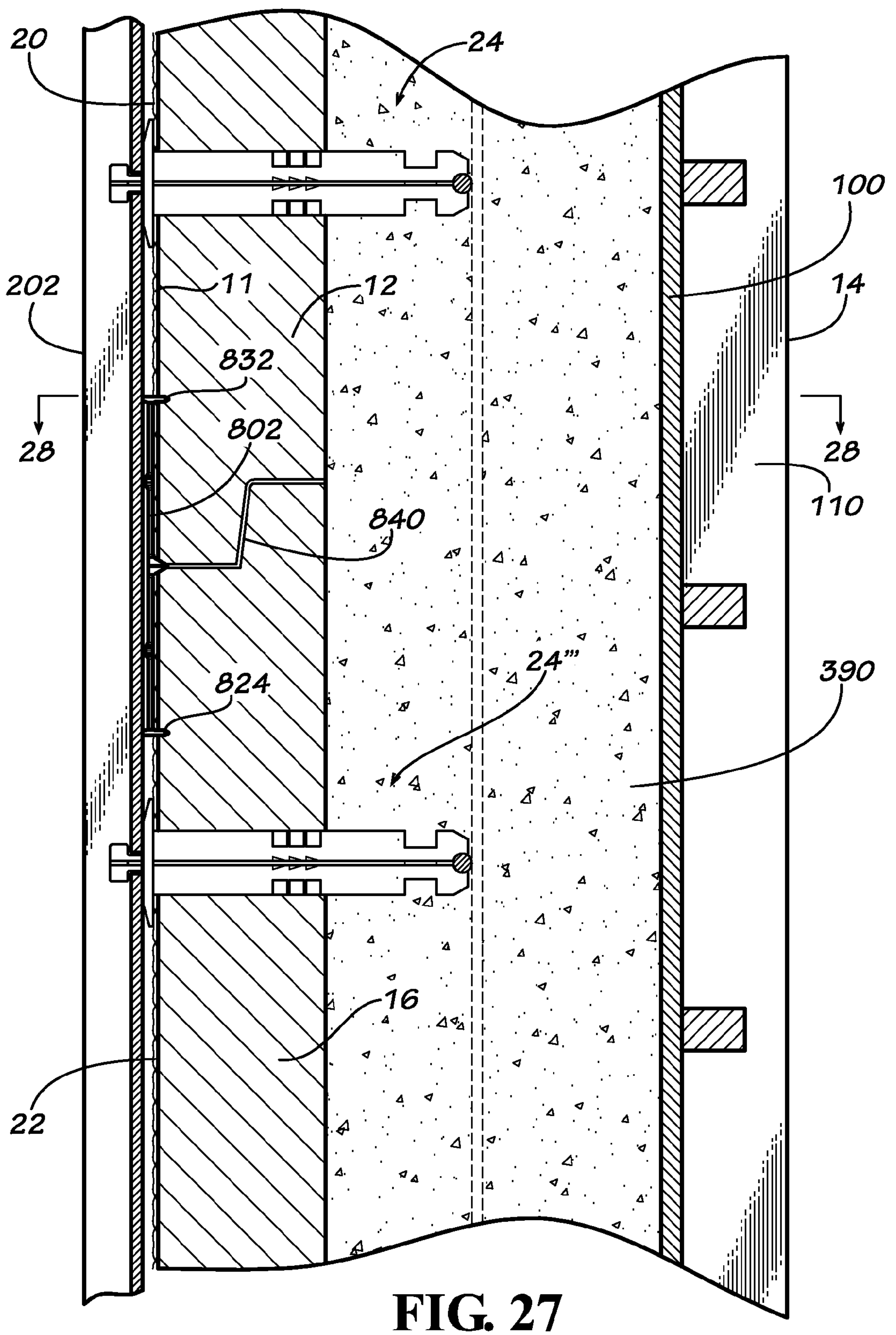
FIG. 27 is a cross-sectional top view of the joint reinforcing panel shown in FIG. 25 shown in use in a disclosed embodiment of a hybrid insulated concrete form in accordance with the present invention.
Figure 28:
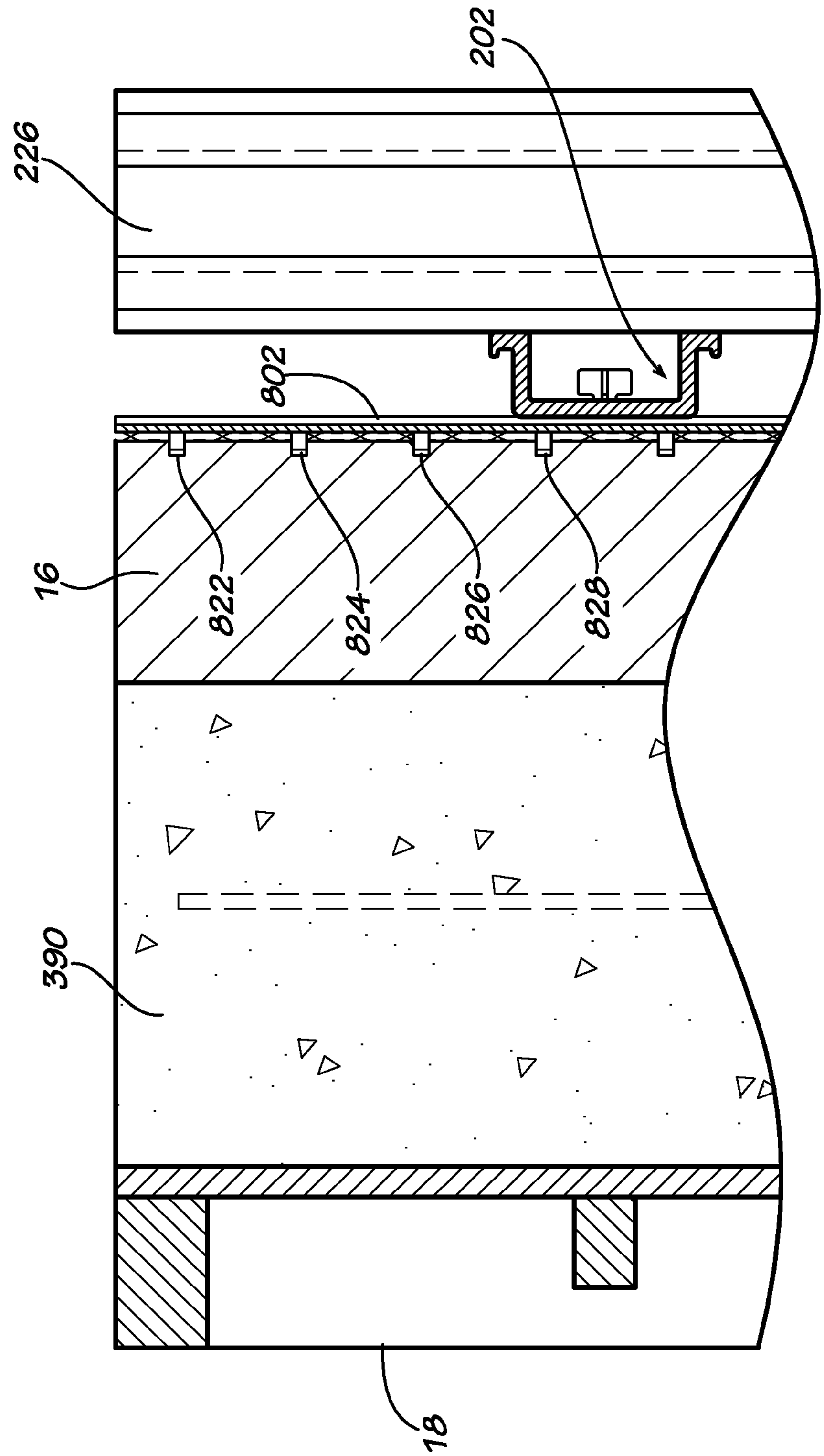
FIG. 28 is a cross-sectional view taken along the line 28-28 of the hybrid insulated concrete form shown in FIG. 27.
Figure 29:
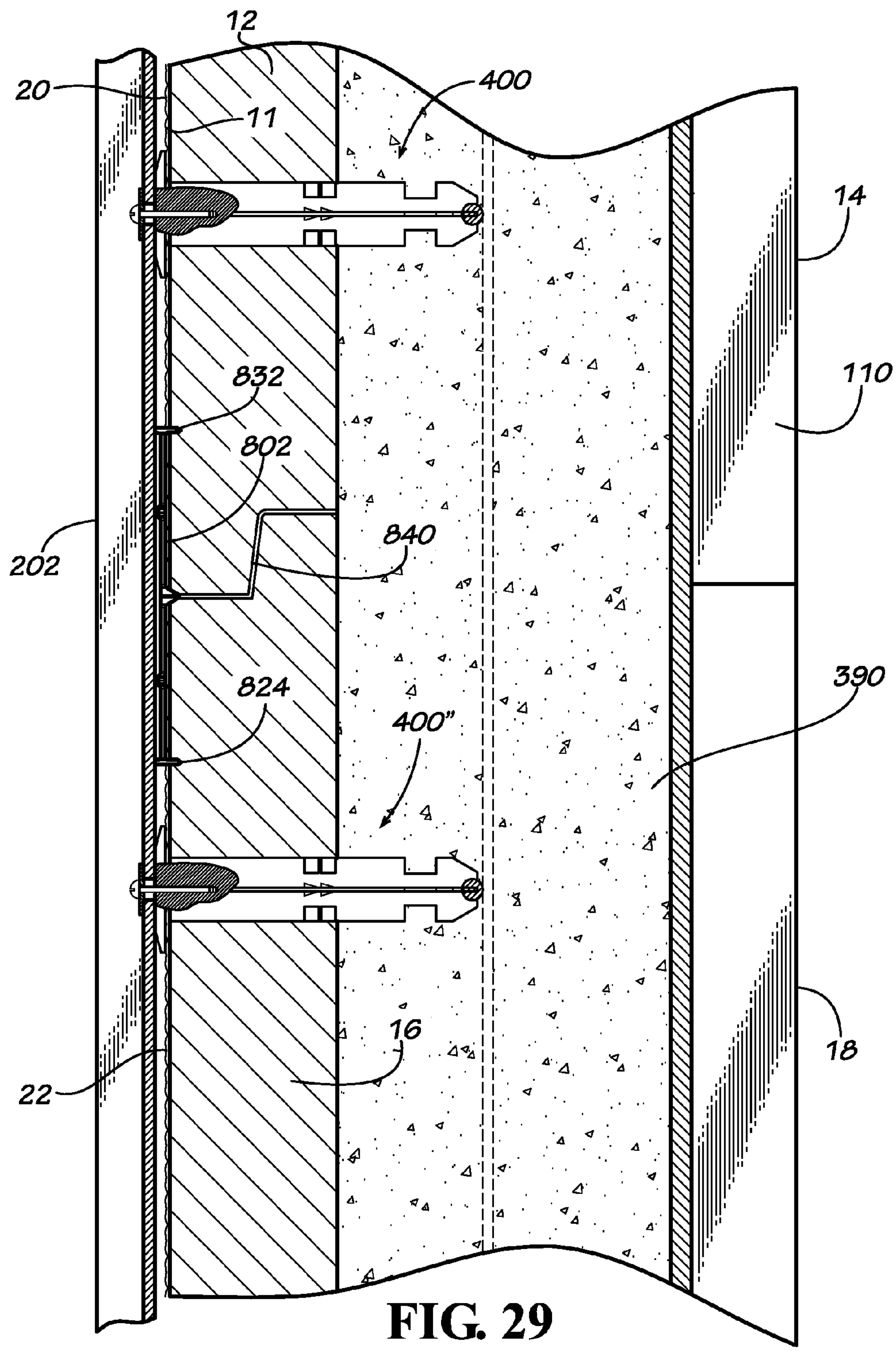
FIG. 29 is a cross-sectional side view of the joint reinforcing panel shown in FIG. 25 shown in use in an alternate disclosed embodiment of a hybrid insulated concrete form in accordance with the present invention.

FIGS. 25-28 show a foam insulating panel joint reinforcement 800. FIGS. 25 and 26 show the joint reinforcement 800 comprises an elongate rectangular joint plate 802. The joint plate 802 is made from a rigid material, such as aluminum, steel, a rigid polymer or a composite material, such as carbon fibers in a polymer. The joint plate 802 can be made by rolling, stamping or extrusion and then cut to a desired length. The joint plate 802 has a first primary surface 804 and an opposite second primary surface 806. Formed on the first primary surface 804 are four longitudinal reinforcing ribs 808, 810, 812, 814. The rib 808 is formed on a first longitudinal edge 816 of the joint plate 802; the rib 814 is formed on a second longitudinal edge 818 of the joint plate. The ribs 808-814 increase the flexural strength of the joint plate 802. Formed on the second primary surface 806 of the joint plate 802 intermediate the longitudinal edges 816, 818 is a central longitudinal ridge 820. On the first longitudinal edge 816 are a plurality of teeth, such as the teeth 822, 824, 826, 828, extending outwardly from the second surface 806 and longitudinally spaced from each other at intervals along the length of the first longitudinal edge. On the second longitudinal edge 818 are a plurality of teeth, such as the teeth 830, 832, 834, 836, extending outwardly from the second surface 806 and longitudinally spaced from each other at intervals along the length of the second longitudinal edge.

FIGS. 1, 2, 27 and 28 show the use of the joint reinforcement 800. When erecting the hybrid insulated concrete form 10, the joint plate 802 is positioned between adjoining foam insulating panels 12, 16. Between the foam insulating panels 12, 16 is a vertical joint, such as the shiplap joint 840. The joint plate 802 is positioned so that the second primary surface 806 faces and contacts the outer surface 11 of the foam insulating panels 12, 16 and the ridge 820 is positioned over the shiplap joint 840. The joint plate 802 is pushed toward the foam insulating panels 12, 16 so that the teeth 830-836 penetrate the layer of reinforcing material 20, if present, and into the foam insulating panel 12 and the teeth 822-828 penetrate the layer of reinforcing material 22, if present, and into the foam insulating panel 16. The whalers 200-210 are then positioned over the joint plate 802; i.e., the joint plate 802 is disposed between the whaler 202 and the surface 11 of the foam insulating panels 12, 16, as shown in FIGS. 1, 2, 27 and 28. When the whalers 200-210 are attached to the panel anchor members, such as the panel anchor members 24, 24''', the whalers contact the ribs 808-814 of the joint plate 802 and press it toward the foam insulating panels 12, 16. When plastic concrete is placed in the hybrid insulated concrete form 10, the hydrostatic pressure will push outwardly on the foam insulating panels 12, 16. Thus, the joint plate 802 resists the outward movement of the foam insulating panels 12, 16 due to the hydrostatic pressure of the plastic concrete in the concrete receiving space 17. The joint 840 formed by the shiplap connection between the foam insulating panels 12, 16 is weaker than the foam panels themselves, especially when the layers of reinforcing material 20, 22 are used. The hydrostatic pressure of the plastic concrete can be so great that it could open up the shiplap joint 840 between the whalers and cause form failure. The joint plate 802 provides reinforcement between the whalers 200-210 by transferring the fluid pressure load or stresses from the foam insulating panels 12, 16 in the area between the whalers to the horizontal whalers. The teeth 830-836 and 822-828 lock into the layers of reinforcing material 20, 22 disposed on the face 11 of the foam insulating panels 12, 16, if used, or into the foam insulating panels themselves if the layers of reinforcing material are not used, thereby bridging the two foam insulating panels into one assembly. The joint plate 802 significantly increases the pressure rating of the foam insulating panels 12, 16 to be equivalent in strength to that of conventional removable concrete forms.

Figure 30:
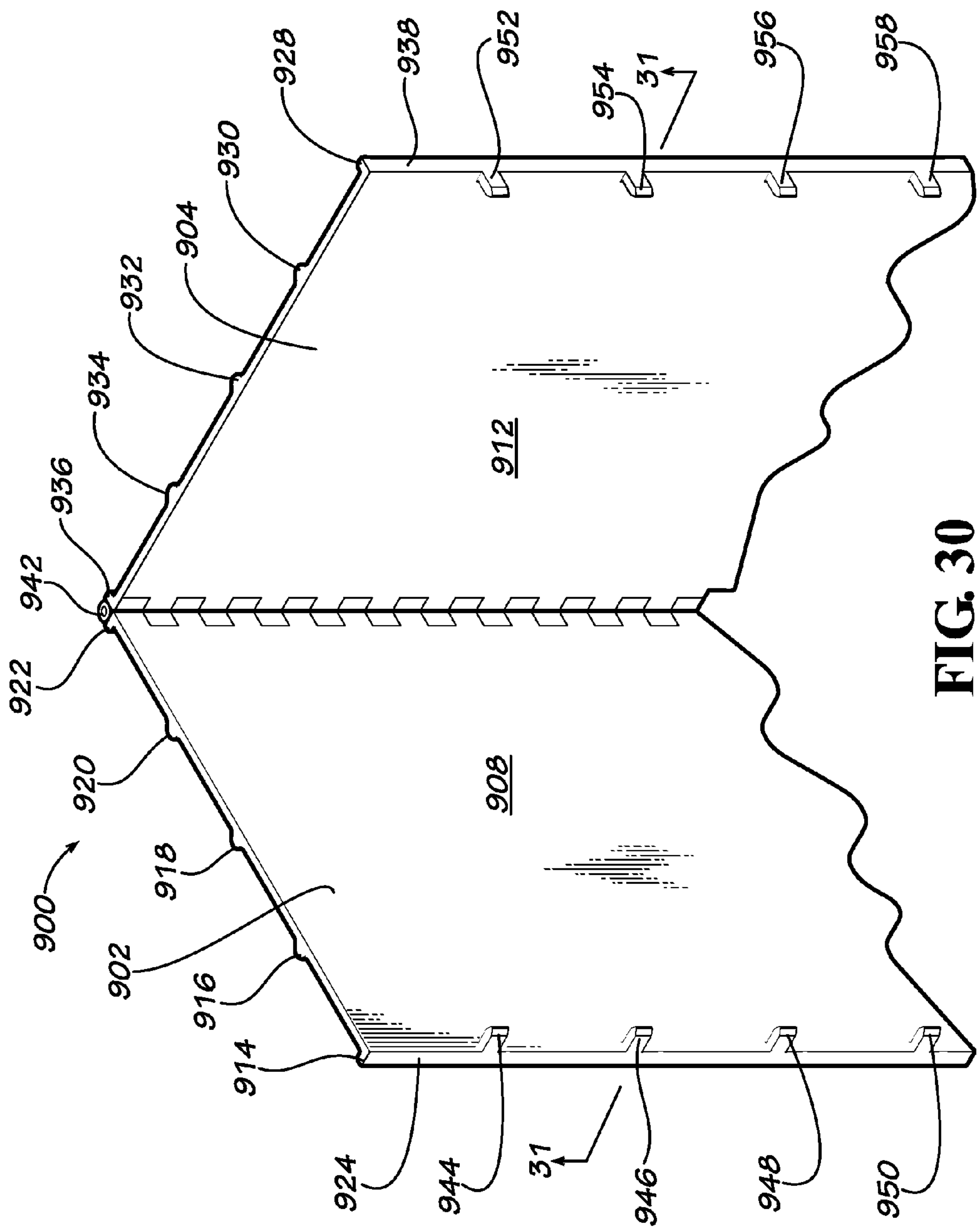
FIG. 30 is a perspective view of a disclosed embodiment of a corner joint reinforcing panel in accordance with the present invention.
Figure 31:
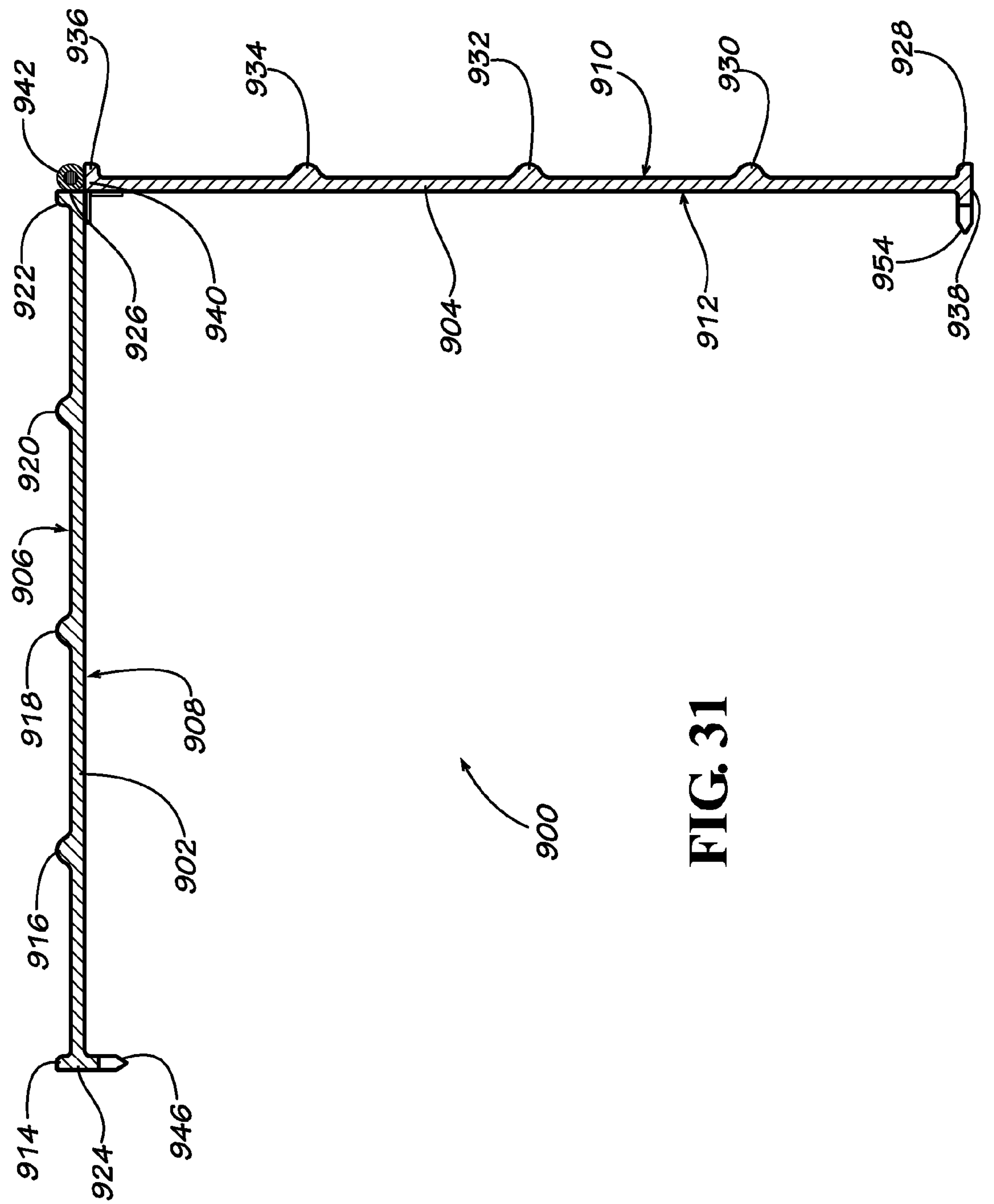
FIG. 31 is a cross-section view taken along the line 31-31 of the corner joint reinforcing panel shown in FIG. 30.

Corners are a particularly weak area in concrete forms. Insulted concrete form corners are particularly weak and prone to blowouts. Therefore, corners require reinforcement especially in the foam insulating panels of the present invention. FIGS. 30-35 show a foam insulating panel corner joint reinforcement 900. FIGS. 30 and 31 show the corner joint reinforcement 900 comprises a first elongate rectangular joint plate 902 and a second elongate rectangular joint plate 904. The joint plates 902, 904 are each made from a rigid material, such as aluminum, steel, a rigid polymer or a composite material, such as carbon fibers in a polymer. The joint plates 902, 904 each can be made by extrusion and then cut to a desired length. The first joint plate 902 has a first primary surface 906 and an opposite second primary surface 908; the second joint plate 904 has a first primary surface 910 and an opposite second primary surface 912. Formed on the first primary surface 906 of the first joint plate 902 are five longitudinal reinforcing ribs 914, 916, 918, 920, 922. The rib 914 is formed on a first longitudinal edge 924 of the first joint plate 902; the rib 922 is formed on a second longitudinal edge 926 of the first joint plate 902. Formed on the first primary surface 906 of the second joint plate 904 are five longitudinal reinforcing ribs 928, 930, 932, 934, 936. The rib 928 is formed on a first longitudinal edge 938 of the second joint plate 904; the rib 936 is formed on a second longitudinal edge 940 of the second joint plate 904. The first joint plate 902 is pivotably joined to the second joint plate 904 at the longitudinal edges 926, 940, respectively, by a hinge, such as an elongate piano hinge 942. On the first longitudinal edge 924 of the first joint plate 902 are a plurality of teeth 944, 946, 948, 950 extending outwardly from the second primary surface 908 and longitudinally spaced from each other at intervals along the length of the first longitudinal edge. On the first longitudinal edge 938 of the second plate 904 are a plurality of teeth 952, 954, 956, 958 extending outwardly from the second surface 912 and longitudinally spaced from each other at intervals along the length of the first longitudinal edge.

Figure 32:
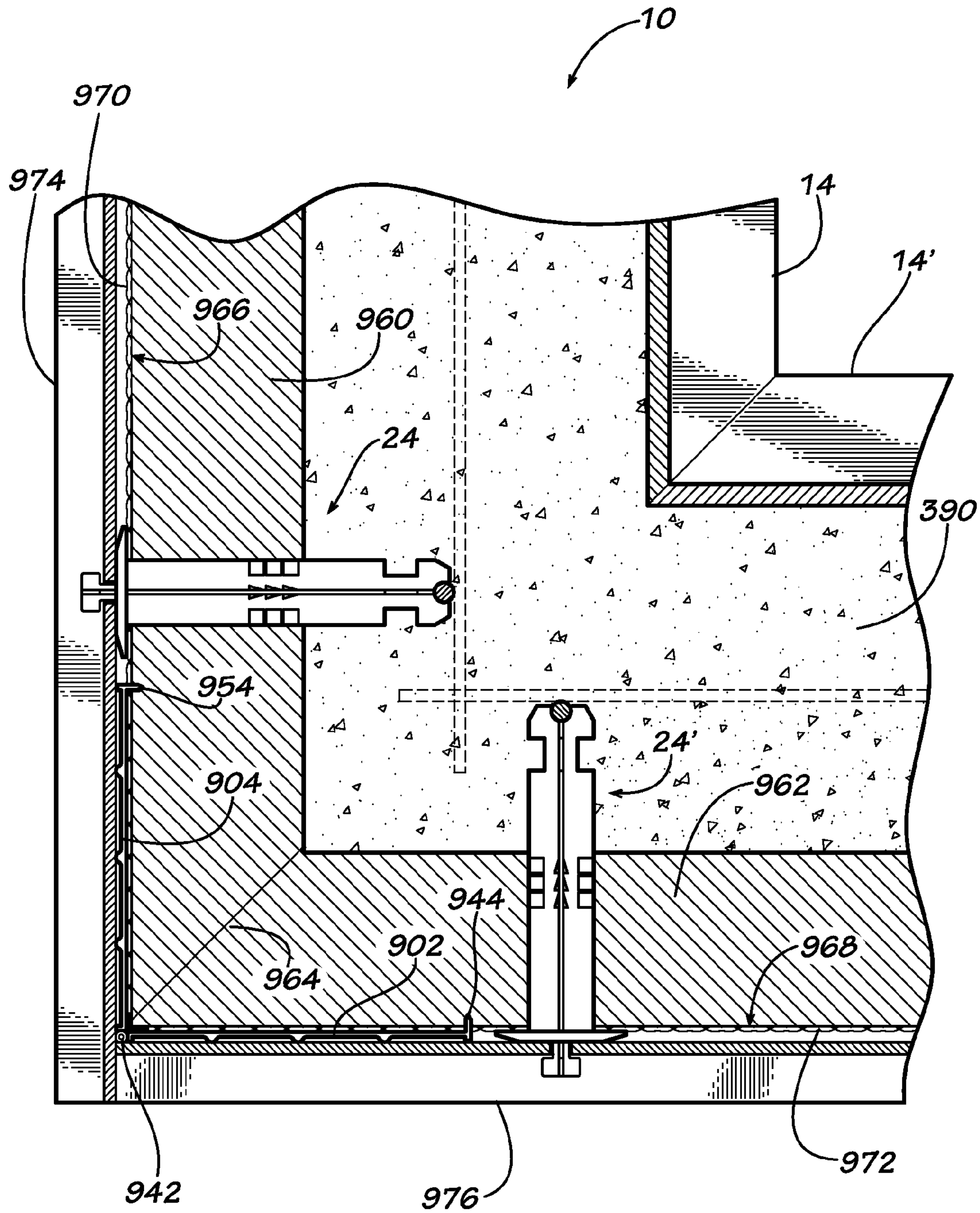
FIG. 32 is a cross-sectional top view of the corner joint reinforcing panel shown in FIG. 30 shown in use with an outside corner in a disclosed embodiment of a hybrid insulated concrete form in accordance with the present invention.

FIG. 32 shows the use of the corner joint reinforcement 900 on an outside corner. When erecting the hybrid insulated concrete form 10, the joint plate 902 is positioned between adjoining outside corner-forming foam insulating panels 960, 962. The foam insulating panels 960, 962 form a miter joint 964 or a butt joint (not shown). The corner joint plates 902, 904 are positioned so that the second primary surfaces 908, 912 face the outer surfaces 966, 968 of the foam insulating panels 960, 962, respectively, and the piano hinge 942 is positioned on the miter joint 964. The corner joint plates 902, 904 are pushed toward the foam insulating panels 960, 962 so that the teeth 952-958 penetrate the layer of reinforcing material 966, if present, into the foam insulating panel 960 and the teeth 944-950 penetrate the layer of reinforcing material 968, if present, into the foam insulating panel 962. U-shaped whalers identical to the whalers 200-210, such as the whalers 974, 976, are then positioned over the corner joint plates 902, 904; i.e., the joint plate 904 is disposed between the whaler 974 and the surface 966 of the foam insulating panel 960 and the joint plate 902 is disposed between the whaler 976 and the surface 968 of the foam insulating panel 962, as shown in FIG. 32. I-beam shaped whalers identical to the whalers 220, 222 can be used instead of the U-shaped whalers, such as the whalers 974, 976. When the whalers 974, 976 are attached to panel anchor members, such as the panel anchor members 24, 24', the whalers contact the ribs 914-922 of the first joint plate 902 and the ribs 928-936 of the second joint plate 904 and press them toward the foam insulating panels 960, 962, respectively. When plastic concrete is placed in the concrete receiving space 17 of the hybrid insulated concrete form 10, the hydrostatic pressure pushes outwardly on the foam insulating panels 960, 962. The corner joint plates 902, 904 resist the outward movement of the foam insulating panels 960, 962 due to this hydrostatic pressure of the plastic concrete in the concrete receiving space 17.

Figure 33:
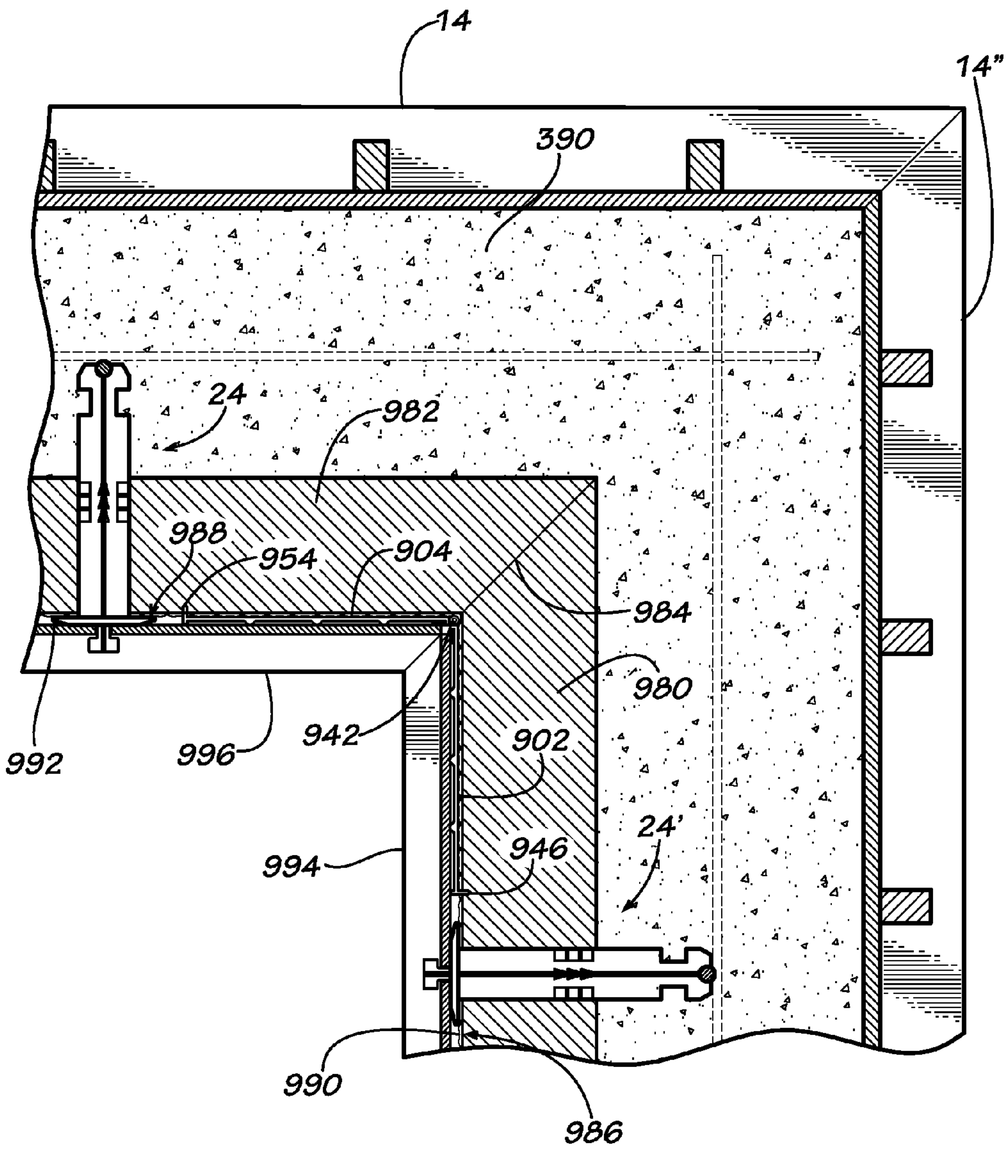
FIG. 33 is a cross-sectional top view of the corner joint reinforcing panel shown in FIG. 30 shown in use with an inside corner in a disclosed embodiment of a hybrid insulated concrete form in accordance with the present invention.

FIG. 33 shows the use of the corner joint reinforcement 900 on an inside corner. When erecting the hybrid insulated concrete form 10, the corner joint reinforcement 900 is positioned between adjoining inside corner-forming foam insulating panels 980, 982. The foam insulating panels 980, 982 form a miter joint 984 or a butt joint (not shown). The corner joint plates 902, 904 are positioned so that the second primary surfaces 908, 912 face the outer surfaces 986, 988 of the foam insulating panels 980, 982, respectively, and the piano hinge 942 is positioned on the miter joint 984. The corner joint plates 902, 904 are pushed toward the foam insulating panels 980, 982 so that the teeth 944-950 penetrate the layer of reinforcing material 990, if present, into the foam insulating panel 980 and the teeth 952-958 penetrate the layer of reinforcing material 992, if present, into the foam insulating panel 982. U-shaped whalers identical to the whalers 200-210, such as the whalers 994, 996, are then positioned over the corner joint plates 902, 904; i.e., the joint plate 902 is disposed between the whaler 994 and the surface 986 of the foam insulating panel 980 and the joint plate 904 is disposed between the whaler 996 and the surface 988 of the foam insulating panel 982, as shown in FIG. 33. When the whalers 994, 996 are attached to the panel anchor members, such as the panel anchor members 24, 24', the whalers contact the ribs 914-922 of the first joint plate 902 and the ribs 928-936 of the second joint plate 904 and press them toward the foam insulating panels 980, 982, respectively. When plastic concrete is placed in the hybrid insulated concrete form 10, the hydrostatic pressure pushes outwardly on the foam insulating panels 980, 982. The corner joint plates 902, 904 resists the outward movement of the foam insulating panels 980, 982 due to this hydrostatic pressure of the plastic concrete in the concrete receiving space 17. The corner joint reinforcement 900 provides reinforcement between the whalers by transferring the fluid pressure from the corner foam panels 980, 982 in the area between the whalers to the horizontal whalers 994, 996. The teeth 944-958 lock into the layer of reinforcing material 990, 992 disposed on the face of the foam insulating panels, if present, and into the foam insulating panels 980, 982 thereby bridging the two foam insulating panels from one plane into the other by creating one assembly. The corner joint reinforcement 900 significantly increases the pressure rating of the foam insulating panels 980, 982 to be equivalent to conventional removable concrete forms.

Figure 34:
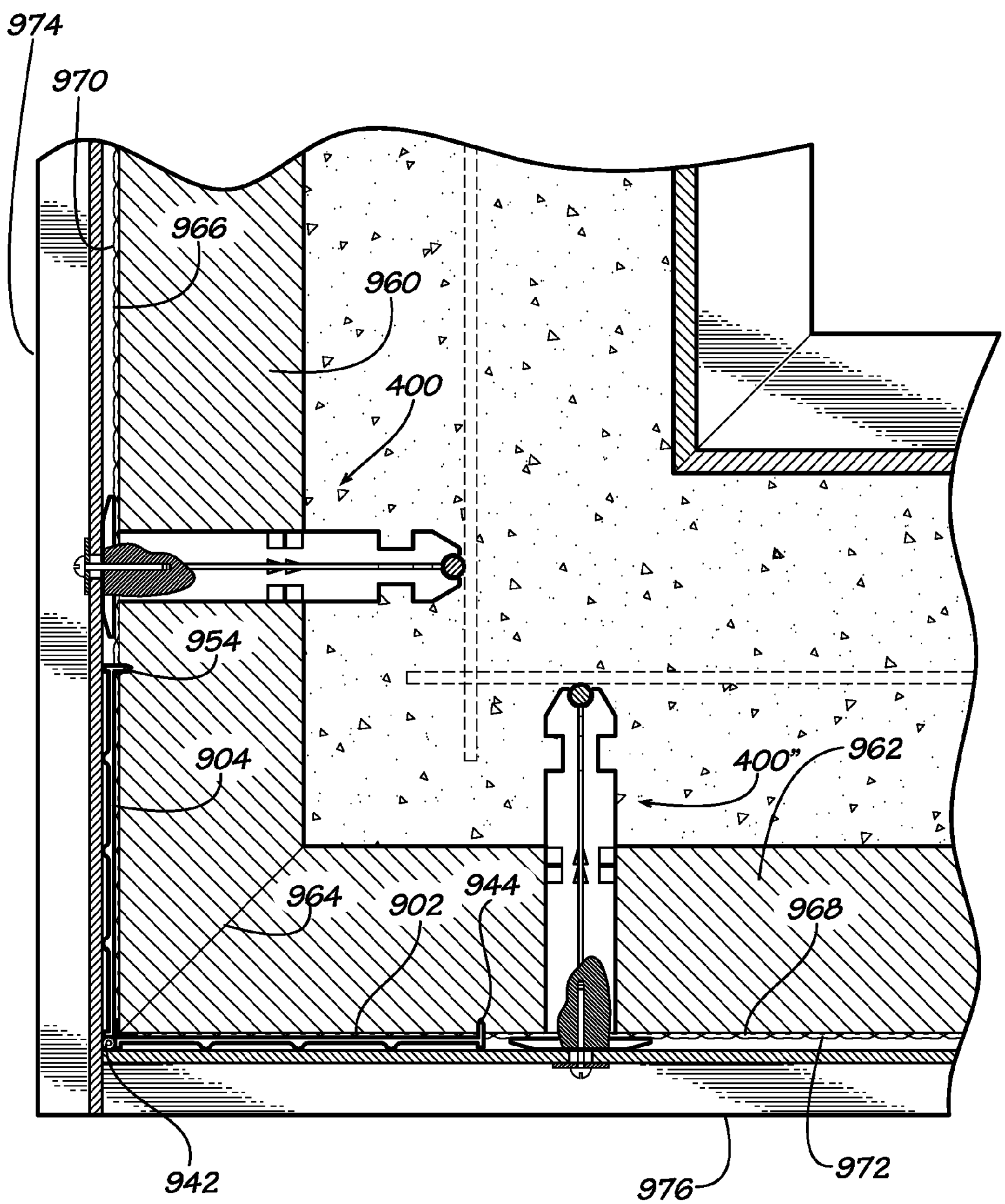
FIG. 34 is a cross-sectional top view of the corner joint reinforcing panel shown in FIG. 30 shown in use with an outside corner in an alternate disclosed embodiment of a hybrid insulated concrete form in accordance with the present invention.

FIG. 34 shows the use of the corner joint reinforcement 900 on an outside corner of an alternate disclosed embodiment of the hybrid insulated concrete form 10. When erecting the hybrid insulated concrete form 10, the corner joint reinforcement 900 is positioned between adjoining outside corner-forming foam insulating panels 960, 962. The foam insulating panels 960, 962 form a miter joint 964 or a butt joint (not shown). The corner joint plates 902, 904 are positioned so that the second primary surfaces 908, 912 face the outer surfaces 966, 968 of the foam insulating panels 960, 962 and the piano hinge 942 is positioned on the miter joint 964. The corner joint plates 902, 904 are pushed toward the foam insulating panels 960, 962 so that the teeth 952-958 penetrate the layer of reinforcing material 966, if present, into the foam insulating panel 960 and the teeth 944-950 penetrate the layer of reinforcing material 968, if present, into the foam insulating panel 962. U-shaped whalers identical to the whalers 200-210, such as the whalers 974, 976, are then positioned over the corner joint plates 902, 904; i.e., the joint plate 904 is disposed between the whaler 974 and the surface 966 of the foam insulating panel 960 and the joint plate 902 is disposed between the whaler 976 and the surface 968 of the foam insulating panel 962, as shown in FIG. 34. When the whalers 974, 976 are attached to the panel anchor members, such as the panel anchor members 400, 400", the whalers contact the ribs 914-922 of the first joint plate 902 and the ribs 928-936 of the second joint plate 904 and press them toward the foam insulating panels 960, 962, respectively. When plastic concrete is placed in the hybrid insulated concrete form 10, the hydrostatic pressure pushes outwardly on the foam insulating panels 960, 962. The corner joint plates 902, 904 resist the outward movement of the foam insulating panels 960, 962 due to this hydrostatic pressure of the plastic concrete in the concrete receiving space 17.

Figure 35:
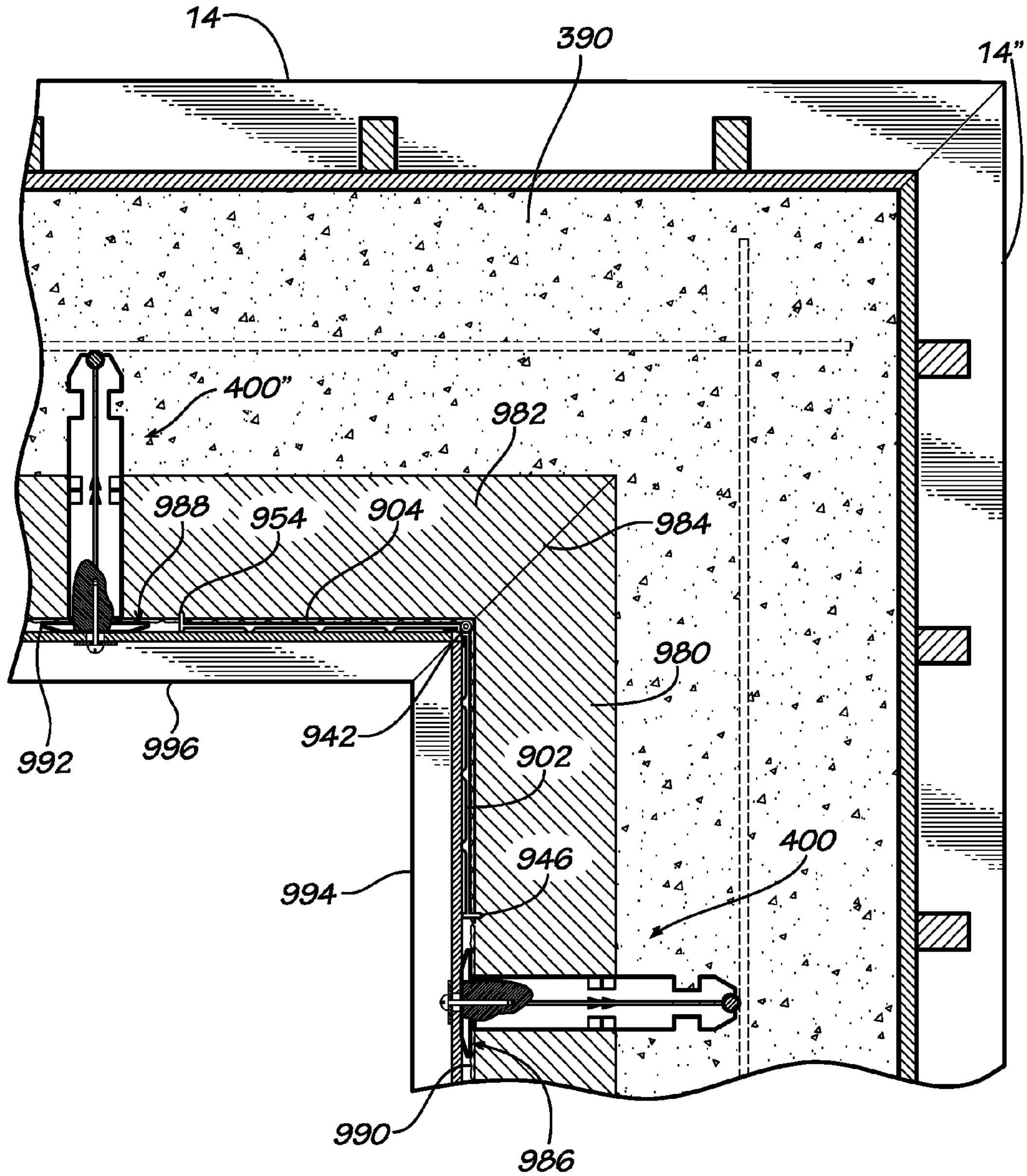
FIG. 35 is a cross-sectional top view of the corner joint reinforcing panel shown in FIG. 30 shown in use with an inside corner in an alternate disclosed embodiment of a hybrid insulated concrete form in accordance with the present invention.

FIG. 35 shows the use of the corner joint reinforcement 900 on an inside corner. When erecting the hybrid insulated concrete form 10, the corner joint reinforcement 900 is positioned between adjoining inside corner-forming foam insulating panels 980, 982. The foam insulating panels 980, 982 form a miter joint 984 or a butt joint (not shown). The corner joint plates 902, 904 are positioned so that the second primary surfaces 908, 912 face the outer surfaces 986, 988 of the foam insulating panels 980, 982, respectively, and the piano hinge 942 is positioned on the miter joint 984. The corner joint plates 902, 904 are pushed toward the foam insulating panels 980, 982 so that the teeth 944-950 penetrate the layer of reinforcing material 990, if present, into the foam insulating panel 980 and the teeth 952-958 penetrate the layer of reinforcing material 992, if present, into the foam insulating panel 982. U-shaped whalers identical to the whalers 200-210, such as the whalers 994, 996, are then positioned over the corner joint plates 902, 904; i.e., the joint plate 902 is disposed between the whaler 994 and the surface 986 of the foam insulating panel 980 and the joint plate 904 is disposed between the whaler 996 and the surface 988 of the foam insulating panel 982, as shown in FIG. 35. When the whalers 994, 996 are attached to the panel anchor members, such as the panel anchor members 400, 400", the whalers contact the ribs 914-922 of the first joint plate 902 and the ribs 928-936 of the second joint plate 904 and press them toward the foam insulating panels 980, 982, respectively. When plastic concrete is placed in the hybrid insulated concrete form 10, the hydrostatic pressure pushes outwardly on the foam insulating panels 980, 982. The corner joint plates 902, 904 resists the outward movement of the foam insulating panels 980, 982 due to this hydrostatic pressure of the plastic concrete in the concrete receiving space 17.

Figure 36:
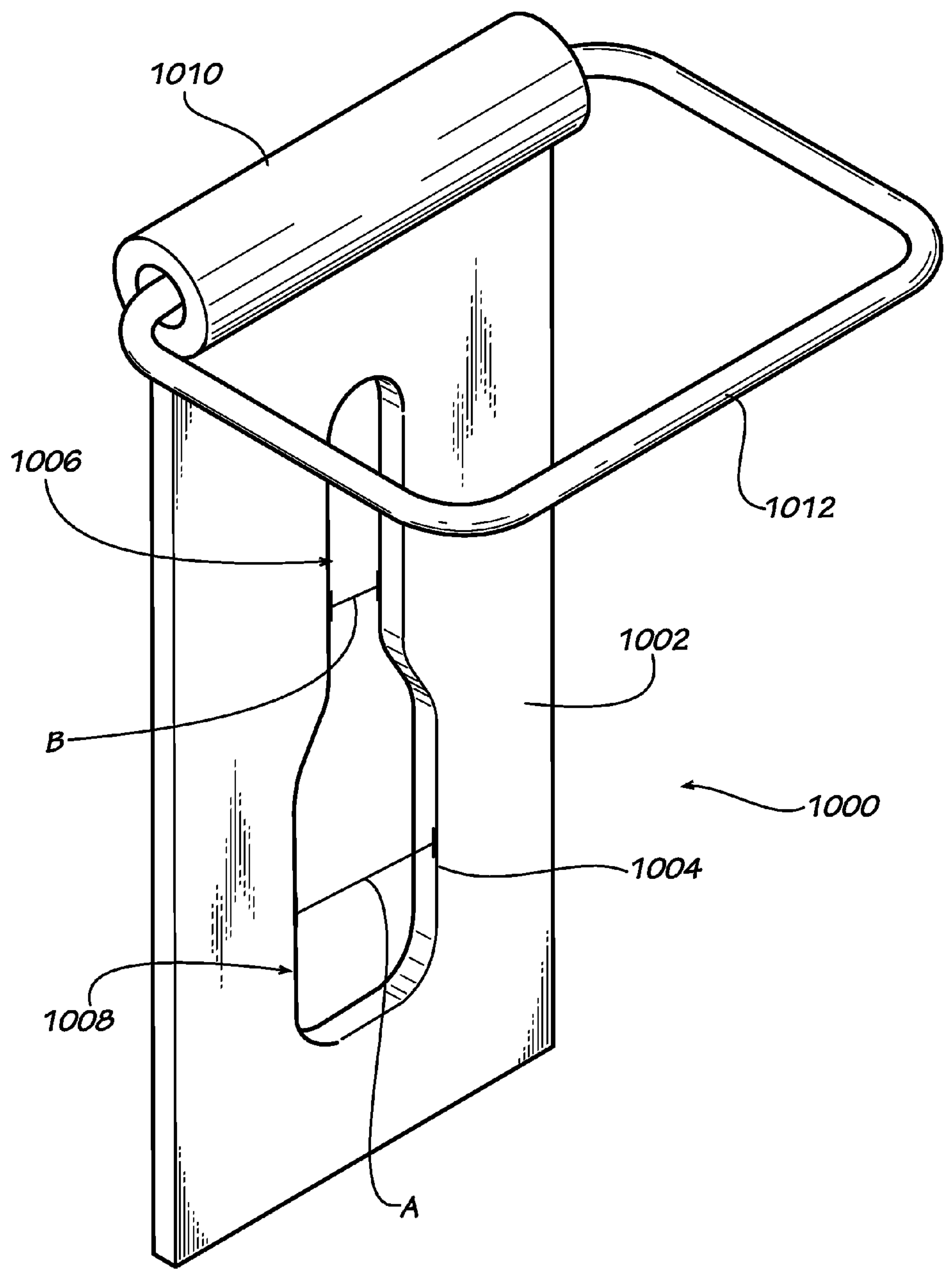
FIG. 36 is a perspective view of a disclosed embodiment of a brick tie in accordance with the present invention.
Figure 37:
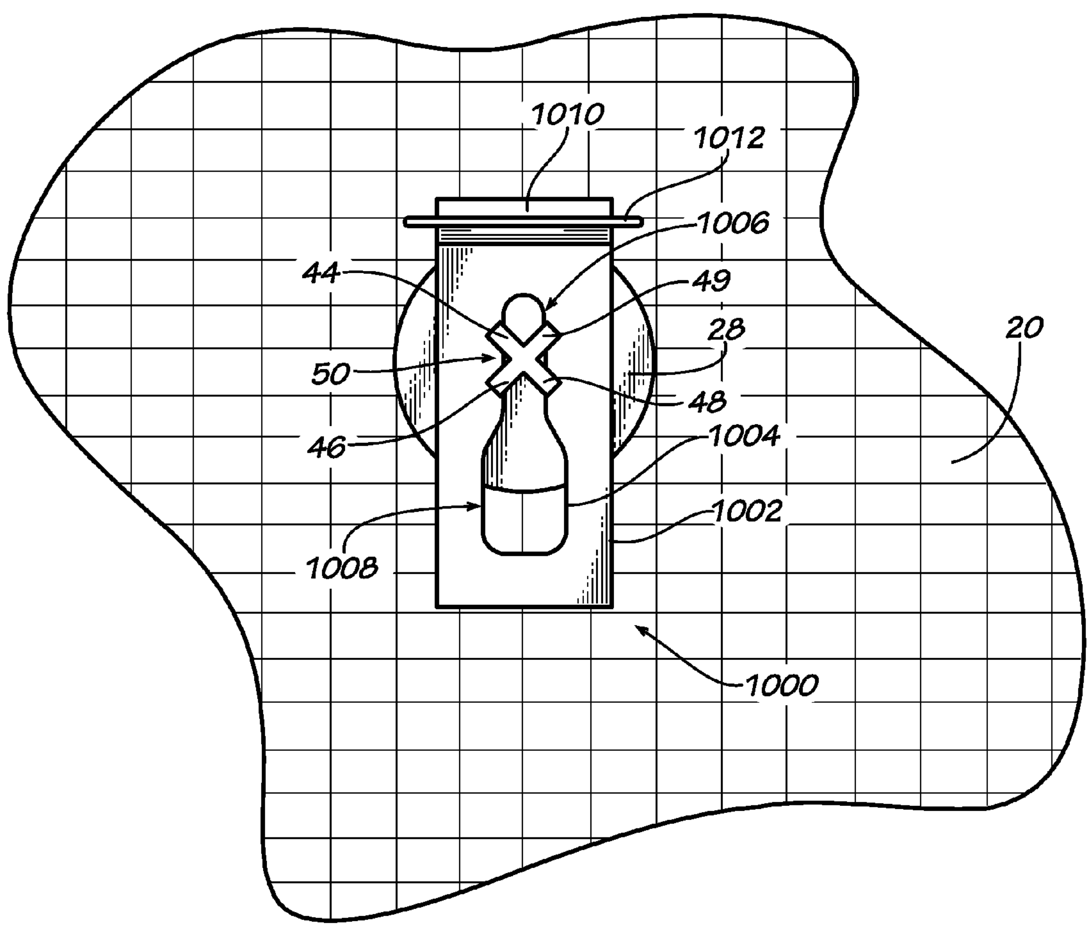
FIG. 37 is a side plan view of the brick tie shown in FIG. 32 shown attached to a panel anchor member in accordance with the present invention.
Figure 38:
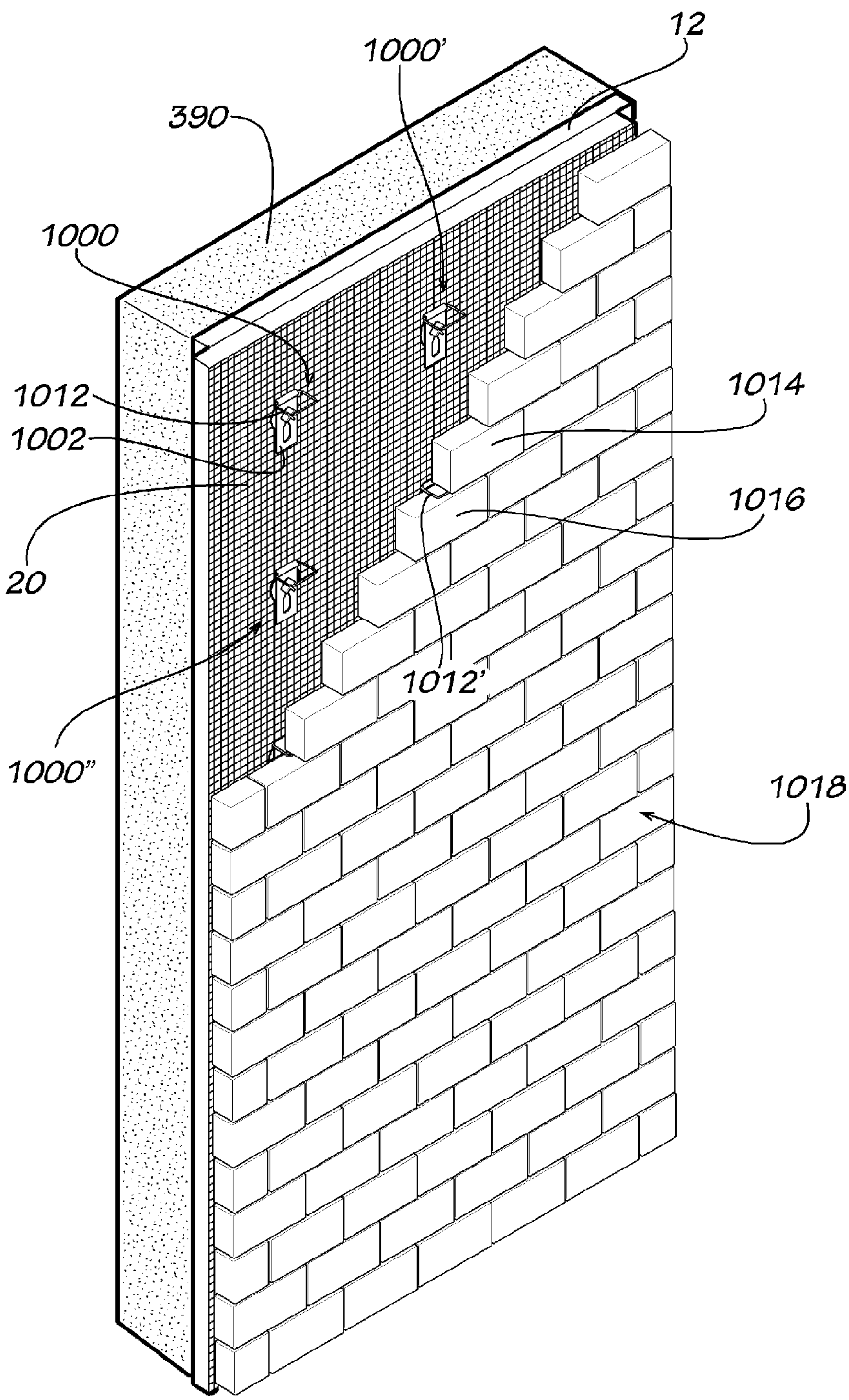
FIG. 38 is a perspective view of a disclosed embodiment of an insulated concrete wall in accordance with the present invention showing use of the brick tie shown in FIG. 36.

FIG. 36-38 show a brick tie 1000 for use with the present invention. The brick tie 1000 comprises a rigid rectangular plate 1002. The plate 1002 can be made from are suitably rigid material, such as steel, aluminum or composite materials. Formed in the plate 1002 is a key-shaped opening or key slot 1004; i.e., the lateral dimension at 1006 is narrower than the lateral dimension at 1008. The key slot 1004 can be formed in the plate 1002 by stamping, cutting or any other suitable technique. The plate 1002 can be formed by extrusion, pultrusion, by roll forming, stamping or by any other suitable technique.

The lateral dimension "A" of the key slot 1004 at 1008 (the wider portion) is chosen so that it is larger than the effective diameter or dimension of the end 50 of the panel anchor member 24; i.e., the dimension "A" at 1008 is greater than the width of the leg members 44, 48 (FIG. 5). The lateral dimension "B" of the key slot 1004 at 1006 (the narrower portion) is chosen so that it is equal to or wider than the width of the leg members 44, 45 at the notch 52 (FIG. 5) but narrower than the width of the leg members 44, 48.

Therefore, as shown in FIG. 37, the brick tie 1000 can be placed over the end 50 of the panel anchor member 24 such that the end of the panel anchor member fits through the wider portion 1008 of the key slot 1004. Then, the brick tie 1000 can be slid downwardly (FIG. 37) so that the end 50 of the panel anchor member 24 is positioned in the narrower portion 1006 of the key slot 1004 and the sides of the key slot fit in the notch 52 in the panel anchor member. When the end 50 of the panel anchor member 24 is in the narrower portion 1006 of the key slot 1004 (FIG. 37), the brick tie 1000 is locked in place and cannot be removed from the end of the panel anchor member (longitudinally with respect to the panel anchor member). The brick tie 1000 further includes a hollow sleeve 1010 attached to the plate 1002 at the upper lateral edge of the plate adjacent the narrower portion 1006 of the key slot 1004. The opposite ends (not shown) of a wire loop 1012 are disposed in the hollow sleeve 1010 so that the wire loop is pivotably attached to the plate 1002.

FIG. 38 shows a plurality of brick ties 1000, 1000', 1000" attached to a plurality of panel anchor members, as described above, such that the wire loop 1012' can be embedded in mortar between adjacent rows of brick, such as the bricks 1014, 1016. Thus, the brick wall 1018 is attached to the wire loop 1012', which is attached to the plate 1002, which is attached to the panel anchor member 24, which is embedded in the concrete 390 thereby providing a secure and stable attachment of the brick wall to the concrete.

Figure 39:
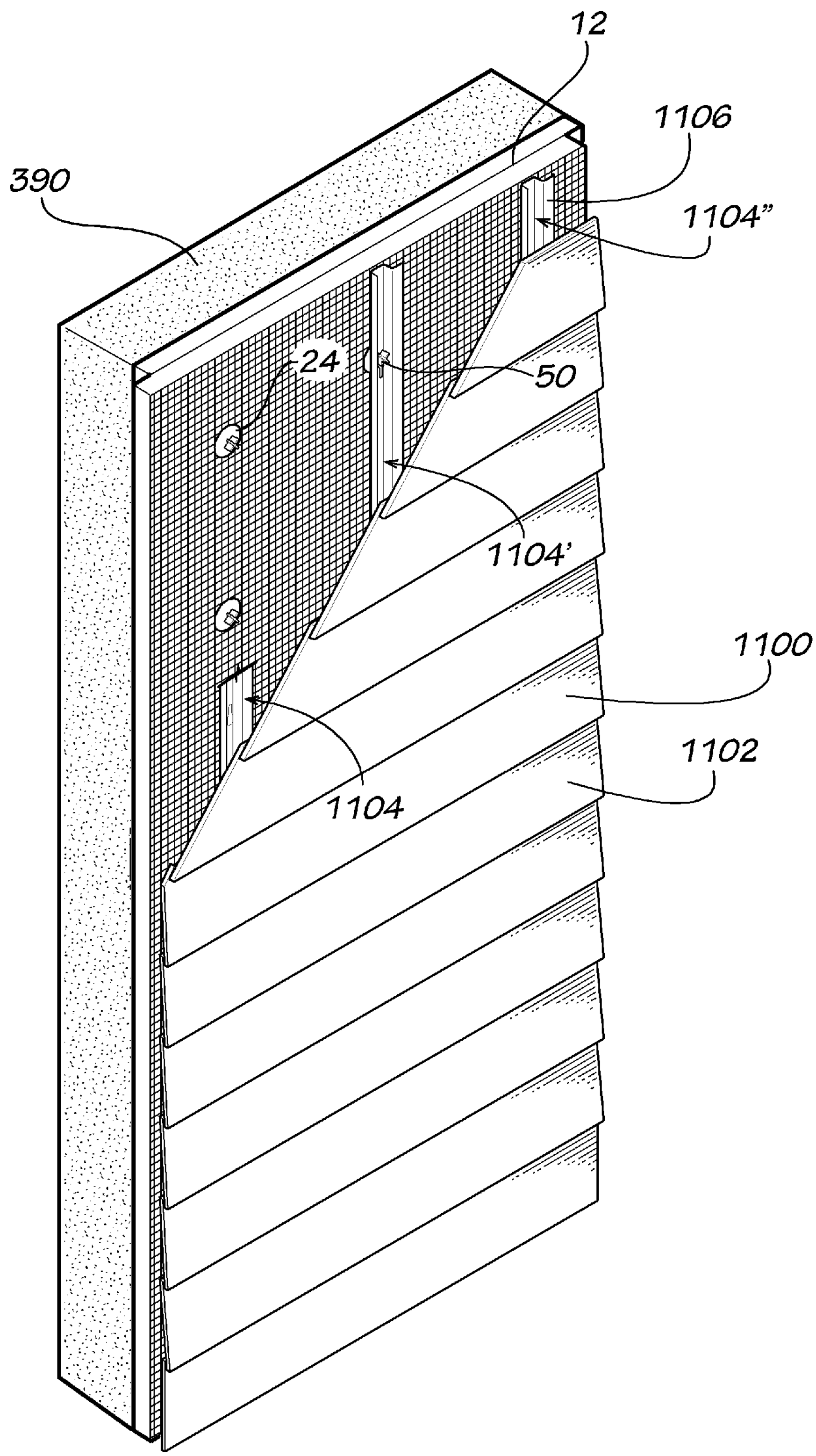
FIG. 39 is a perspective view of a disclosed embodiment of an insulated concrete wall in accordance with the present invention showing use of a disclosed embodiment of a wall cladding system.

FIG. 39 shows a plurality of siding members 1100, 1102 attached to a plurality of identical key slot furring stud members 1104, 1104', 1104". The design of the key slot furring stud members 1104, 1104', 1104" is disclosed in U.S. Pat. No. 8,756,890 (the disclosure of which is incorporated herein by reference in its entirety). The key slot furring stud members 1104, 1104', 1104" are identical to the whalers 200-210, except that a flange 1106 extends outwardly from one of the side walls, such as the side wall 214, and parallel to the bottom member, such as the bottom member 216, of the key slot furring stud members, but made of lighter gauge material. The key slot furring stud members 1104, 1104', 1104" also include key slots (not shown) on the bottom member of the stud members (identical to the key slot, such as the key slot 218, formed in the bottom 216 of the U-shaped whalers 200-210 as shown in FIG. 2). The key slots in the U-shaped stud members 1104, 1104', 1104" allow the studs to attach to the plurality of panel anchor members, such as the panel anchor member 24, in the same manner as the whalers 200-210. That is, the end 50 of the panel anchor member 24 is inserted into the wider portion of the key slot in the U-shaped stud member 1104. The U-shaped stud member 1104 is then slid vertically downward so that the end 50 of the panel anchor member 24 is disposed in the narrower portion of the key slot thereby locking the U-shaped stud member to the panel anchor member. Then siding members, such as the siding members 1100, 1102, are attached to the flange 1106 of the U-shaped stud members 1104, 1104', 1104" by a suitable fastener, such as a screw (not shown). The siding members 1100, 1102 are attached to the U-shaped stud members 1104, 1104', 1104", which are attached to the panel anchor members, such as the panel anchor member 24, which is embedded in the concrete 390 thereby provides a secure and stable attachment of the siding members to the concrete.

Instead of attaching the siding members 1100, 1102 to the U-shaped stud members 1104, 1104', 1104", other types of wall cladding or decorative finishes can be substituted for the siding members. For example, plywood, gypsum board, prefinished paneling or the like can be attached to the U-shaped stud members 1104, 1104', 1104" instead of the siding members 1100, 1102. Alternatively, if the U-shaped stud members 1104, 1104', 1104" are not used, various decorative finishes can be applied to the layer of reinforcing material 20, if used, or to the outer surface 11 of the foam insulating panels, such as the foam insulating panel 12. For example, ceramic tile, stone, thin brick, stucco, limestone, granite, marble or the like can be applied to the exterior face of the foam insulating panel 12.

After the concrete 390 has achieved a desired amount or degree of cure, an exterior non-structural (i.e., decorative) architectural layer (not shown) can be applied to the outer surface 11 of the foam insulating panel 12 and the layer of reinforcing material 20, if present. The exterior architectural layer can be applied by any suitable means, such as by spraying, hand troweling, dry casting, wet casting or by extrusion to the necessary thickness, depending on the material and the thickness of the exterior decorative layer. The exterior architectural layer can be made of conventional concrete, mortar, stucco, synthetic stucco, plaster or any other cementitious material, cementitious polymer modified material or polymer coatings. A particularly preferred exterior architectural layer is a layer of polymer modified cementitious material, such as polymer modified concrete, polymer modified plaster or polymer modified mortar, with decorative aggregate only partially embedded into the layer of polymer modified plaster. The decorative aggregate particles can be any decorative and/or colorful stone, semi-precious stone, quartz, granite, basalt, marble, stone pebbles, glass or shells. The decorative aggregate particles can be made from stone including, but not limited to, amethyst, azul bahia, azul macaubas, foxite, glimmer, honey onyx, green onyx, sodalite, green jade, pink quartz, white quartz, and orange calcite. The decorative aggregate particles can be made from crushed glass including, but not limited to, recycled clear glass, recycled mirror glass, recycled clear plate glass, recycled cobalt blue glass, recycled mixed plate glass, and recycled black glass. The decorative aggregate particles can be made from recycled aggregate including, but not limited to, recycled amber, recycled concrete and recycled porcelain. The decorative aggregate particles can be made from non-recycled glass including, but not limited to, artificially colored glass, reflective glass, transparent glass, opaque glass, frosted glass and coated glass. The decorative aggregate particles can be made from tumbled glass including, but not limited to, jelly bean and glass beads. Decorative aggregate can be obtained from Arim Inc., Teaneck, N.J., USA. The decorative aggregate particles can be any suitable size, but preferably are size #000 (passes mesh 16, retained on mesh 25) to size #3 (½ inch to ⅜ inch), more preferably size #00 (passes mesh 10, retained mesh 16) to size #2 (% inch to ¼ inch) and most preferably size #00 (passes mesh 10, retained mesh 16) to size #1 (¼ inch to ⅛ inch). The decorative aggregate particles preferably have irregular, random shapes. However, for certain applications it may be desirable for the aggregate particles to have uniform shapes, such as are obtained by tumbling the aggregate, for example jelly bean shaped or bead shaped. The decorative aggregate can be parially embeded in the layer of polymer modified cementitious material by any suitable method, such as by boadcasting into the layer of polymer modified cementitious material followed by pushing the decorative aggregate particles partially into the layer of polymer modified cementitious material by using a roller. However, the layer of decorative aggregate is preferably formed in the layer of polymer modified cementitious material by blowing decorative aggregate particles into the layer of polymer modified cementitious material using compressed air. After blowing the decorative aggregate particles into the layer of polymer modified cementitious material if additional embedment of the decorative aggregate particles in the layer of polymer modified cementitious material is necessary, the decorative aggregate particles can be pushed partially into the layer of polymer modified cementitious material by using a roller.

The exterior architectural layer can be sprayed or have an integrated color pigment and/or it can have any type of architectural texture or color finish. To provide greater flexural strength and impact resistance, a particularly preferred material for the exterior architectural layer is polymer modified concrete, polymer modified cement plaster, polymer modified geopolymer or polymer modified mortar. Polymer modified concrete, cement plaster, geopolymer or mortar is known in the art and comprises a conventional concrete, plaster, geopolymer or mortar mix to which a polymer is added in a polymer-to-cement ratio of 0.1% to 50% by weight, preferably 0.1% to 25% by weight, more preferably approximately 1% to 25% by weight, most preferably approximately 5% to approximately 20% by weight. Polymer modified concrete can be made using the polymer amounts shown above in any of the concrete formulations shown below. Polymers suitable for addition to concrete, plaster or mortar mixes come in many different types: thermoplastic polymers, thermosetting polymers, elastomeric polymers, latex polymers and redispersible polymer powders. A preferred thermoplastic polymer is an acrylic polymer. Latex polymers can be classified as thermoplastic polymers or elastomeric polymers. Latex thermoplastic polymers include, but are not limited to, poly(styrene-butyl acrylate); vinyl acetate-type copolymers; e.g., poly(ethyl-vinyl acetate) (EVA); polyacrylic ester (PAE); polyvinyl acetate (PVAC); and polyvinylidene chloride (PVDC). Latex elastomeric polymers include, but are not limited to, styrene-butadiene rubber (SBR); nitrile butadiene rubber (NBR); natural rubber (NR); polychloroprene rubber (CR) or Neoprene; polyvinyl alcohol; and methyl cellulose. Redispersible polymer powders can also be classified as thermoplastic polymers or elastomeric polymers. Redispersible thermoplastic polymer powders include, but are not limited to, polyacrylic ester (PAE); e.g., poly(methyl methacrylate-butyl acrylate); poly(styrene-acrylic ester) (SAE); poly(vinyl acetate-vinyl versatate) (VA/VeoVa); and poly(ethylene-vinyl acetate) (EVA). Redispersible elastomeric polymer powders include, but are not limited to, styrene-butadiene rubber (SBR). Preferred polymers for modifying the concrete, plaster or mortar mixes of the present invention are polycarboxylates. Geopolymers are generally formed by reaction of an aluminosilicate powder with an alkaline silicate solution at roughly ambient conditions. Metakaolin is a commonly used starting material for synthesis of geopolymers, and is generated by thermal activation of kaolinite clay. Geopolymers can also be made from sources of pozzolanic materials, such as lava, fly ash from coal, slag, rice husk ash and combinations thereof.

It is specifically contemplated that the cementitious-based material from which the exterior architectural layer is made can include reinforcing fibers made from material including, but not limited to, steel, plastic polymers, glass, basalt, Wollastonite, carbon, and the like. The use of reinforcing fiber in the exterior architectural layer made from polymer modified concrete, polymer modified mortar or polymer modified plaster provide the layer of cementitous material with improved flexural strength, as well as improved impact resistance and blast resistance.

Wollastonite can be used in the exterior architectural layer to increase compressive and flexural strength as well as impact resistance. Also, Wollastonite can improve resistance to heat transmission and add fire resistance to the exterior plaster. Therefore, the exterior architectural layer can obtain fire resistance properties as well as improved energy efficiency properties. A fire resistant material over the exterior face of the foam can increase the fire rating of the wall assembly by delaying the melting of the foam. Increased resistance to heat transmission will also increase the building energy efficiency and therefore lower energy cost, such as heating and cooling expenses.

Before the hybrid insulated concrete form 10 is set in place on the concrete slab 68, an elongate L-shaped angle (not shown) is anchored to the concrete slab, such as by shooting a nail through the L-shaped bracket into the concrete slab. The L-shaped angle extends the full width of the exterior foam insulating panels 12, 16; e.g., 4 feet wide or more to span multiple foam insulated panels. The L-shaped angle is positioned on the concrete slab 68 so that when the outer surface 11 (or the layer of reinforcing material 20, 22, if present) of the exterior foam insulating panels 12, 16 are placed against the L-shaped angle, the outer surfaces (or the layer of reinforcing material 20, 22, if present) of the exterior foam insulating panels are flush with the concrete slab 68.

After the hybrid insulated concrete form 10 has been installed on the concrete slab 68, as shown in FIG. 1, the joint plate 802 is placed over the joint 840 between the foam insulating panels 12, 16; the whalers 200-210 are attached to the panel anchor members, such as the panel anchor member 24; and the strongbacks 224, 226 are attached to the whalers with clips (not shown) in a manner well known in the art. A particular advantage of the present invention over prior art insulated concrete forms is that vertical and horizontal rebar can now be installed on the ends 38, such in the U-shaped cutout 60 of the panel anchor members, such as the panel anchor member 24. Since the hybrid insulated concrete form 10 is open at this point, unfettered access is provided to the interior of the form to construct any needed vertical and horizontal rebar reinforcement. After the rebar reinforcement is built, the conventional removable concrete forms 14, 18 are erected spaced from the foam insulating panel 12, 16. The second elongate connecting rods, such as the second elongate rod 244, is inserted through the strongbacks, such as the strongback 224, and through the foam insulating panel, such as the foam insulating panel 12. This is done at all four corners, such as shown in FIG. 1. Then, the threaded sleeves, such as the threaded sleeves 242, 254, are placed on the second elongate rods, such as the second elongate rods 244, 258. The hybrid insulated concrete form 10 is then closed by erecting the conventional removable concrete forms, such as the concrete forms 14, 18, horizontally spaced from the foam insulating panels 12, 16. The first elongate connecting rods, such as the first elongate rods 236, 256 are inserted through the conventional removable concrete forms, such as the conventional removable concrete forms 14, 18, and screwed into the corresponding threaded sleeves, such as the threaded sleeves 242, 254. The knee brace/turnbuckle 382 is attached to the frame 106 of the conventional removable concrete form 14, such as by attachment to the bracing member 130, and the bracket 386 is anchored to the concrete slab 68 by nails or screws. The knee brace/turnbuckle 382 is adjusted appropriately to true the conventional removable concrete form 14 to vertical. Then, the first and second rods, such as the first and second rods 236, 256 and 244, 258 are tightened into the elongate sleeves, such as the sleeves 242, 254, thereby bringing the strongbacks 224, 226 to true vertical as well as the whalers 200-210. With the conventional removable concrete forms 14, 18 and the foam insulating panels 12, 16 in true vertical alignment, plastic concrete is placed in the concrete receiving space 17. The concrete 390 is left in the hybrid insulated concrete form 10 for a sufficient time to at least partially cure. When the concrete 390 has achieved the desired degree of cure, the conventional removable concrete forms 14, 18 are removed and the strongbacks 224, 226 and the whalers 200-210 are removed from the foam insulating panels 12, 16. This leaves an insulated concrete wall, as shown in FIG. 10.

While the present invention can be used with conventional concrete mixes; i.e., concrete in which portland cement is the only cementitious material used in the concrete, it is preferred as a part of the present invention to use the concrete, plaster or mortar mixes disclosed in U.S. Pat. No. 8,545,749 (the disclosure of which is incorporated herein by reference in its entirety). Concrete is a composite material consisting of a mineral-based hydraulic binder which acts to adhere mineral particulates together in a solid mass; those particulates may consist of coarse aggregate (rock or gravel), fine aggregate (natural sand or crushed fines), and/or unhydrated or unreacted cement. Specifically, the concrete mix in accordance with the present invention comprises cementitious material, aggregate and water sufficient to at least partially hydrate the cementitious material. The amount of cementitious material used relative to the total weight of the concrete varies depending on the application and/or the strength of the concrete desired. Generally speaking, however, the cementitious material comprises approximately 25% to approximately 40% by weight of the total weight of the concrete, exclusive of the water, or 300 lbs/yd$^3$ of concrete (177 kg/m$^3$) to 1,100 lbs/yd$^3$ of concrete (650 kg/m$^3$) of concrete. The water-to-cementitious material ratio by weight is usually approximately 0.25 to approximately 0.7. Relatively low water-to-cementitious material ratios lead to higher strength but lower workability, while relatively high water-to-cementitious material ratios lead to lower strength, but better workability. Aggregate usually comprises 60% to 80% by volume of the concrete. However, the relative amount of cementitious material to aggregate to water is not a critical feature of the present invention; conventional amounts can be used. Nevertheless, sufficient cementitious material should be used to produce concrete with an ultimate compressive strength of at least 1,000 psi, preferably at least 2,000 psi, more preferably at least 3,000 psi, most preferably at least 4,000 psi, especially up to about 10,000 psi or more.

The aggregate used in the concrete used with the present invention is not critical and can be any aggregate typically used in concrete including, but not limited to, aggregate meeting the requirements of ASTM C33. The aggregate that is used in the concrete depends on the application and/or the strength of the concrete desired. Such aggregate includes, but is not limited to, fine aggregate, medium aggregate, coarse aggregate, sand, gravel, crushed stone, lightweight aggregate, recycled aggregate, such as from construction, demolition and excavation waste, and mixtures and combinations thereof.

The preferred cementitious material for use with the present invention comprises Portland cement; preferably Portland cement and one of slag cement or fly ash; and more preferably Portland cement, slag cement and fly ash. Slag cement is also known as ground granulated blast-furnace slag (GGBFS). The cementitious material preferably comprises a reduced amount of Portland cement and increased amounts of recycled supplementary cementitious materials; i.e., slag cement and/or fly ash. This results in cementitious material and concrete that is more environmentally friendly. One or more cementitious materials other than slag cement or fly ash can also replace the Portland cement, in whole or in part. Such other cementitious or pozzolanic materials include, but are not limited to, silica fume; metakaolin; rice hull (or rice husk) ash; ground burnt clay bricks; brick dust; bone ash; animal blood; clay; other siliceous, aluminous or aluminosiliceous materials that react with calcium hydroxide in the presence of water; hydroxide-containing compounds, such as sodium hydroxide, magnesium hydroxide, or any other compound having reactive hydrogen groups, other hydraulic cements and other pozzolanic materials. The portland cement can also be replaced, in whole or in part, by one or more inert or filler materials other than Portland cement, slag cement or fly ash. Such other inert or filler materials include, but are not limited to limestone powder; calcium carbonate; titanium dioxide; quartz; or other finely divided minerals that densify the hydrated cement paste.

The preferred cementitious material for use with a disclosed embodiment of the present invention comprises 0% to approximately 100% by weight portland cement; preferably, 0% to approximately 80% by weight portland cement. The ranges of 0% to approximately 100% by weight portland cement and 0% to approximately 80% by weight portland cement include all of the intermediate percentages; such as, 5%, 10%, 15%, 20%, 25%, 30%, 35%, 40%, 45%, 50%, 55%, 60%, 65%, 70%, 75%, 80%, 85%, 90% and 95%. The cementitious material of the present invention can also comprise 0% to approximately 90% by weight portland cement, preferably 0% to approximately 80% by weight portland cement, preferably 0% to approximately 70% by weight portland cement, more preferably 0% to approximately 60% by weight portland cement, most preferably 0% to approximately 50% by weight portland cement, especially 0% to approximately 40% by weight portland cement, more especially 0% to approximately 30% by weight portland cement, most especially 0% to approximately 20% by weight portland cement, or 0% to approximately 10% by weight portland cement. In one disclosed embodiment, the cementitious material comprises approximately 10% to approximately 45% by weight portland cement, more preferably approximately 10% to approximately 40% by weight portland cement, most preferably approximately 10% to approximately 35% by weight portland cement, especially approximately 33⅓% by weight portland cement, most especially approximately 10% to approximately 30% by weight portland cement. In another disclosed embodiment of the present invention, the cementitious material comprises approximately 5% by weight portland cement, approximately 10% by weight portland cement, approximately 15% by weight portland cement, approximately 20% by weight portland cement, approximately 25% by weight portland cement, approximately 30% by weight portland cement, approximately 35% by weight portland cement, approximately 40% by weight portland cement, approximately 45% by weight portland cement or approximately 50% by weight portland cement or any sub-combination thereof.

The preferred cementitious material for use in one disclosed embodiment of the present invention also comprises 0% to approximately 90% by weight slag cement, preferably approximately 20% to approximately 90% by weight slag cement, more preferably approximately 30% to approximately 80% by weight slag cement, most preferably approximately 30% to approximately 70% by weight slag cement, especially approximately 30% to approximately 60% by weight slag cement, more especially approximately 30% to approximately 50% by weight slag cement, most especially approximately 30% to approximately 40% by weight slag cement. In another disclosed embodiment the cementitious material comprises approximately 33⅓% by weight slag cement. In another disclosed embodiment of the present invention, the cementitious material can comprise approximately 5% by weight slag cement, approximately 10% by weight slag cement, approximately 15% by weight slag cement, approximately 20% by weight slag cement, approximately 25% by weight slag cement, approximately 30% by weight slag cement, approximately 35% by weight slag cement, approximately 40% by weight slag cement, approximately 45% by weight slag cement, approximately 50% by weight slag cement, approximately 55% by weight slag cement, approximately 60% by weight slag cement, approximately 65%, approximately 70% by weight slag cement, approximately 75% by weight slag cement, approximately 80% by weight slag cement, approximately 85% by weight slag cement or approximately 90% by weight slag cement or any sub-combination thereof.

The preferred cementitious material for use in one disclosed embodiment of the present invention comprises 0% to approximately 50% by weight fly ash; preferably approximately 10% to approximately 45% by weight fly ash, more preferably approximately 10% to approximately 40% by weight fly ash, most preferably approximately 10% to approximately 35% by weight fly ash, especially approximately 33⅓% by weight fly ash. In another disclosed embodiment of the present invention, the preferred cementitious material comprises 0% by weight fly ash, approximately 5% by weight fly ash, approximately 10% by weight fly ash, approximately 15% by weight fly ash, approximately 20% by weight fly ash, approximately 25% by weight fly ash, approximately 30% by weight fly ash, approximately 35% by weight fly ash, approximately 40% by weight fly ash, approximately 45% by weight fly ash or approximately 50% by weight fly ash or any sub-combination thereof. Preferably the fly ash has an average particle size of <10 μm; more preferably 90% or more of the particles have a particles size of <10 μm.

The preferred cementitious material for use in one disclosed embodiment of the present invention comprises 0% to approximately 80% by weight fly ash, preferably approximately 10% to approximately 75% by weight fly ash, preferably approximately 10% to approximately 70% by weight fly ash, preferably approximately 10% to approximately 65% by weight fly ash, preferably approximately 10% to approximately 60% by weight fly ash, preferably approximately 10% to approximately 55% by weight fly ash, preferably approximately 10% to approximately 50% by weight fly ash, preferably approximately 10% to approximately 45% by weight fly ash, more preferably approximately 10% to approximately 40% by weight fly ash, most preferably approximately 10% to approximately 35% by weight fly ash, especially approximately 33⅓% by weight fly ash. In another disclosed embodiment of the present invention, the preferred cementitious material comprises 0% by weight fly ash, approximately 5% by weight fly ash, approximately 10% by weight fly ash, approximately 15% by weight fly ash, approximately 20% by weight fly ash, approximately 25% by weight fly ash, approximately 30% by weight fly ash, approximately 35% by weight fly ash, approximately 40% by weight fly ash, approximately 45% by weight fly ash or approximately 50% by weight fly ash, approximately 55% by weight fly ash, approximately 60% by weight fly ash, approximately 65% by weight fly ash, approximately 70% by weight fly ash or approximately 75% by weight fly ash, approximately 80% by weight fly ash or any sub-combination thereof. Preferably the fly ash has an average particle size of <10 μm; more preferably 90% or more of the particles have a particles size of <10 μm.

In one disclosed embodiment, the preferred cementitious material for use with the present invention comprises approximately equal parts by weight of portland cement, slag cement and fly ash; i.e., approximately 33⅓% by weight portland cement, approximately 33⅓% by weight slag cement and approximately 33⅓% by weight fly ash. In another disclosed embodiment, a preferred cementitious material for use with the present invention has a weight ratio of portland cement to slag cement to fly ash of 1:1:1. In another disclosed embodiment, the preferred cementitious material for use with the present invention has a weight ratio of portland cement to slag cement to fly ash of approximately 0.85-1.15:0.85-1.15:0.85-1.15, preferably approximately 0.9-1.1:0.9-1.1:0.9-1.1, more preferably approximately 0.95-1.05:0.95-1.05:0.95-1.05.

The cementitious material disclosed above can also optionally include 0% to approximately 50% by weight ceramic fibers, preferably 0% to 40% by weight ceramic fibers, more preferably 0% to 30% by weight ceramic fibers, most preferably 0% to 20% by weight ceramic fibers, especially 0% to 15% by weight ceramic fibers, more especially 0% to 10% by weight ceramic fibers, most especially 0% to 5% by weight ceramic fibers. A preferred ceramic fiber is Wollastonite. Wollastonite is a calcium inosilicate mineral ($CaSiO_3$) that may contain small amounts of iron, magnesium, and manganese substituted for calcium. In addition the cementitious material can optionally include 0.1-25% calcium oxide (quick lime), calcium hydroxide (hydrated lime), calcium carbonate or latex or polymer admixtures, either mineral or synthetic, that have reactive hydroxyl groups.

In one disclosed embodiment, the cementitious material for use with the present invention comprises 0% to approximately 100% by weight portland cement, 0% to approximately 90% by weight slag cement, and 0% to approximately 80% by weight fly ash. In one disclosed embodiment, the cementitious material for use with the present invention comprises 0% to approximately 80% by weight portland cement, 0% to approximately 90% by weight slag cement, and 0% to approximately 80% by weight fly ash. In another disclosed embodiment, the cementitious material for use with the present invention comprises 0% to approximately 70% by weight portland cement, 0% to approximately 90% by weight slag cement, and 0% to approximately 80% by weight fly ash. In another disclosed embodiment, the cementitious material for use with the present invention comprises 0% to approximately 60% by weight portland cement, 0% to approximately 90% by weight slag cement, and 0% to approximately 80% by weight fly ash. In another disclosed embodiment, the cementitious material for use with the present invention comprises 0% to approximately 50% by weight portland cement, 0% to approximately 90% by weight slag cement, and 0% to approximately 80% by weight fly ash. In another disclosed embodiment, the cementitious material for use with the present invention comprises less than 50% by weight portland cement, 10% to approximately 90% by weight slag cement, and 10% to approximately 80% by weight fly ash. In another disclosed embodiment, the cementitious material for use with the present invention comprises approximately 10% to approximately 45% by weight portland cement, approximately 10% to approximately 90% by weight slag cement, and 10% to approximately 80% by weight fly ash. In another disclosed embodiment, the cementitious material for use with the present invention comprises approximately 10% to approximately 40% by weight portland cement, approximately 10% to approximately 90% by weight slag cement, and 10% to approximately 80% by weight fly ash. In another disclosed embodiment, the cementitious material for use with the present invention comprises approximately 10% to approximately 35% by weight portland cement, approximately 10% to approximately 90% by weight slag cement, and 10% to approximately 80% by weight fly ash.

In another disclosed embodiment, the cementitious material for use with the present invention comprises 0% to approximately 100% by weight portland cement; 0% to approximately 90% by weight slag cement; 0% to approximately 80% by weight fly ash; 0% to 10% by weight ceramic fiber; and 0% to approximately 25% by weight calcium oxide, calcium hydroxide, latex, acrylic, or polymer admixtures, either mineral or synthetic, that have reactive hydroxyl groups, or mixtures thereof. In one disclosed embodiment, the cementitious material for use with the present invention comprises 0% to approximately 80% by weight portland cement; 0% to approximately 90% by weight slag cement; 0% to approximately 80% by weight fly ash; 0% to approximately 20% by weight ceramic fiber; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 70% by weight portland cement; 0% to approximately 90% by weight slag cement; 0% to approximately 80% by weight fly ash; 0% to approximately 10% by weight ceramic fiber; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 60% by weight portland cement; 0% to approximately 90% by weight slag cement; 0% to approximately 80% by weight fly ash; 0% to approximately 10% by weight ceramic fiber; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 50% by weight portland cement; 0% to approximately 90% by weight slag cement; 0% to approximately 80% by weight fly ash; 0% to approximately 10% by weight ceramic fiber; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises less than 50% by weight portland cement; 10% to approximately 90% by weight slag cement; 10% to approximately 80% by weight fly ash; 0% to approximately 10% by weight ceramic fiber; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 45% by weight portland cement; approximately 10% to approximately 90% by weight slag cement; 10% to approximately 80% by weight fly ash; 0% to approximately 10% by weight ceramic fiber; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 40% by weight portland cement; approximately 10% to approximately 90% by weight slag cement; 10% to approximately 80% by weight fly ash; 0% to approximately 10% by weight ceramic fiber; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 35% by weight portland cement; approximately 10% to approximately 90% by weight slag cement; 10% to approximately 80% by weight fly ash; 0% to approximately 10% by weight ceramic fiber; and 0% to approximately 25% by weight calcium oxide, calcium hydroxide, or latex or polymer admixtures, either mineral or synthetic, that have reactive hydroxyl groups, or mixtures thereof.

In another disclosed embodiment, the cementitious material for use with the present invention comprises 0% to approximately 100% by weight portland cement; 0% to approximately 90% by weight slag cement; 0% to approximately 80% by weight fly ash; and 0.1% to 15% by weight ceramic fiber. In one disclosed embodiment, the cementitious material for use with the present invention comprises 0% to approximately 80% by weight portland cement; 0% to approximately 90% by weight slag cement; 0% to approximately 80% by weight fly ash; and 0.1% to approximately 15% by weight ceramic fiber. In another disclosed embodiment, the cementitious material for use with the present invention comprises 0% to approximately 70% by weight portland cement; 0% to approximately 90% by weight slag cement; 0% to approximately 80% by weight fly ash; and 0.1% to approximately 10% by weight ceramic fiber. In another disclosed embodiment, the cementitious material for use with the present invention comprises 0% to approximately 60% by weight portland cement; 0% to approximately 90% by weight slag cement; 0% to approximately 80% by weight fly ash; and 0.1% to approximately 10% by weight ceramic fiber. In another disclosed embodiment, the cementitious material for use with the present invention comprises 0% to approximately 50% by weight portland cement; 0% to approximately 90% by weight slag cement; 0% to approximately 80% by weight fly ash; and 0.1% to approximately 10% by weight ceramic fiber. In another disclosed embodiment, the cementitious material for use with the present invention comprises less than 50% by weight portland cement; 10% to approximately 90% by weight slag cement; 10% to approximately 80% by weight fly ash; and 0.1% to approximately 10% by weight ceramic fiber. In another disclosed embodiment, the cementitious material for use with the present invention comprises approximately 10% to approximately 45% by weight portland cement; approximately 10% to approximately 90% by weight slag cement;

10% to approximately 80% by weight fly ash; and 0.1% to approximately 10% by weight ceramic fiber. In another disclosed embodiment, the cementitious material for use with the present invention comprises approximately 10% to approximately 40% by weight portland cement; approximately 10% to approximately 90% by weight slag cement; 10% to approximately 80% by weight fly ash; and 0.1% to approximately 10% by weight ceramic fiber. In another disclosed embodiment, the cementitious material for use with the present invention comprises approximately 10% to approximately 35% by weight portland cement; approximately 10% to approximately 90% by weight slag cement; 10% to approximately 80% by weight fly ash; and 0.1% to approximately 10% by weight ceramic fiber.

In another disclosed embodiment, the cementitious material for use with the present invention comprises 0% to approximately 100% by weight portland cement; 0% to approximately 90% by weight slag cement; 0% to approximately 80% by weight fly ash; 0% to 30% by weight Wollastonite; and 0% to approximately 25% by weight calcium oxide, calcium hydroxide, latex, acrylic or polymer admixtures, either mineral or synthetic, that have reactive hydroxyl groups, or mixtures thereof. In one disclosed embodiment, the cementitious material for use with the present invention comprises 0% to approximately 80% by weight portland cement; 0% to approximately 90% by weight slag cement; 0% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 70% by weight portland cement; 0% to approximately 90% by weight slag cement; 0% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 60% by weight portland cement; 0% to approximately 90% by weight slag cement; 0% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 50% by weight portland cement; 0% to approximately 90% by weight slag cement; 0% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises less than 50% by weight portland cement; 10% to approximately 90% by weight slag cement; 10% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 45% by weight portland cement; approximately 10% to approximately 90% by weight slag cement; 10% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 40% by weight portland cement; approximately 10% to approximately 90% by weight slag cement; 10% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 35% by weight portland cement; approximately 10% to approximately 90% by weight slag cement; 10% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof.

In another disclosed embodiment, the cementitious material for use with the present invention comprises 0% to approximately 100% by weight portland cement; 0% to approximately 90% by weight slag cement; 0% to approximately 80% by weight fly ash; and 0.1% to 30% by weight Wollastonite. In one disclosed embodiment, the cementitious material for use with the present invention comprises 0% to approximately 80% by weight portland cement; 0% to approximately 90% by weight slag cement; 0% to approximately 80% by weight fly ash; and 0.1% to approximately 30% by weight Wollastonite. In another disclosed embodiment, the cementitious material for use with the present invention comprises 0% to approximately 70% by weight portland cement; 0% to approximately 90% by weight slag cement; 0% to approximately 80% by weight fly ash; and 0.1% to approximately 30% by weight Wollastonite. In another disclosed embodiment, the cementitious material for use with the present invention comprises 0% to approximately 60% by weight portland cement; 0% to approximately 90% by weight slag cement; 0% to approximately 80% by weight fly ash; and 0.1% to approximately 30% by weight Wollastonite. In another disclosed embodiment, the cementitious material for use with the present invention comprises 0% to approximately 50% by weight portland cement; 0% to approximately 90% by weight slag cement; 0% to approximately 80% by weight fly ash; and 0.1% to approximately 30% by weight Wollastonite. In another disclosed embodiment, the cementitious material for use with the present invention comprises less than 50% by weight portland cement; 10% to approximately 90% by weight slag cement; 10% to approximately 80% by weight fly ash; and 0.1% to approximately 30% by weight Wollastonite. In another disclosed embodiment, the cementitious material for use with the present invention comprises approximately 10% to approximately 45% by weight portland cement; approximately 10% to approximately 90% by weight slag cement; 10% to approximately 80% by weight fly ash; and 0.1% to approximately 30% by weight Wollastonite. In another disclosed embodiment, the cementitious material for use with the present invention comprises approximately 10% to approximately 40% by weight portland cement; approximately 10% to approximately 90% by weight slag cement;

10% to approximately 80% by weight fly ash; and 0.1% to approximately 30% by weight Wollastonite. In another disclosed embodiment, the cementitious material for use with the present invention comprises approximately 10% to approximately 35% by weight portland cement; approximately 10% to approximately 90% by weight slag cement; 10% to approximately 80% by weight fly ash; and 0.1% to approximately 30% by weight Wollastonite.

In another disclosed embodiment, the cementitious material for use with the present invention comprises 0% to approximately 100% by weight portland cement; 0% to approximately 90% by weight slag cement; 0% to approximately 80% by weight fly ash, wherein the combination of portland cement, slag cement and fly ash comprise at least 50% by weight; and 0.1% to approximately 50% by weight polymer for making polymer modified concrete, mortar or plaster. In another disclosed embodiment, the cementitious material for use with the present invention comprises approximately 10% to approximately 45% by weight portland cement; approximately 10% to approximately 90% by weight slag cement; 10% to approximately 80% by weight fly ash; and 0.1% to approximately 50% by weight polymer for making polymer modified concrete, mortar or plaster.

In another disclosed embodiment, the cementitious material for use with the present invention comprises 0% to approximately 100% by weight portland cement; 0% to approximately 90% by weight slag cement; 0% to approximately 80% by weight fly ash, wherein the combination of portland cement, slag cement and fly ash comprise at least 50% by weight; and 0.1% to approximately 50% by weight ceramic fiber. In another disclosed embodiment, the cementitious material for use with the present invention comprises approximately 10% to approximately 45% by weight portland cement; approximately 10% to approximately 90% by weight slag cement; 10% to approximately 80% by weight fly ash; and 0.1% to approximately 50% by weight ceramic fiber.

In another disclosed embodiment, the cementitious material for use with the present invention comprises 0% to approximately 100% by weight portland cement; 0% to approximately 90% by weight slag cement; 0% to approximately 80% by weight fly ash, wherein the combination of portland cement, slag cement and fly ash comprise at least 50% by weight; 0.1% to approximately 50% by weight ceramic fiber and 0.1% to approximately 50% by weight polymer for making polymer modified concrete, mortar or plaster. In another disclosed embodiment, the cementitious material for use with the present invention comprises approximately 10% to approximately 45% by weight portland cement; approximately 10% to approximately 90% by weight slag cement; 10% to approximately 80% by weight fly ash; and 0.1% to approximately 50% by weight ceramic fiber and 0.1% to approximately 50% by weight polymer for making polymer modified concrete, mortar or plaster.

The portland cement, slag cement and fly ash can be combined physically or mechanically in any suitable manner and is not a critical feature. For example, the portland cement, slag cement and fly ash can be mixed together to form a uniform blend of dry material prior to combining with the aggregate and water. If dry polymer powder is used, it can be combined with the cementitious material and mixed together to form a uniform blend prior to combining with the aggregate or water. If the polymer is a liquid, it can be added to the cementitious material and combined with the aggregate and water. Or, the portland cement, slag cement and fly ash can be added separately to a conventional concrete mixer, such as the transit mixer of a ready-mix concrete truck, at a batch plant.

The water and aggregate can be added to the mixer before the cementitious material, however, it is preferable to add the cementitious material first, the water second, the aggregate third and any makeup water last.

Chemical admixtures can also be used with the preferred concrete for use with the present invention. Such chemical admixtures include, but are not limited to, accelerators, retarders, air entrainments, plasticizers, superplasticizers, coloring pigments, corrosion inhibitors, bonding agents and pumping aid. Although chemical admixtures can be used with the concrete of the present invention, it is believed that chemical admixtures are not necessary.

Mineral admixtures or additional supplementary cementitious material ("SCM") can also be used with the concrete of the present invention. Such mineral admixtures include, but are not limited to, silica fume, glass powder and high reactivity metakaolin. Although mineral admixtures can be used with the concrete of the present invention, it is believed that mineral admixtures are not necessary.

The concrete mix cured in a concrete form in which the temperature of the curing concrete is controlled in accordance with the present invention, especially controlled to follow a predetermined temperature profile, produces concrete with superior early strength and ultimate strength properties compared to the same concrete mix cured in a conventional form without the use of any chemical additives to accelerate or otherwise alter the curing process. Thus, in one disclosed embodiment of the present invention, the preferred cementitious material comprises at least two of portland cement, slag cement and fly ash in amounts such that at seven days the concrete mix cured in accordance with the present invention has a compressive strength at least 25% greater than the same concrete mix would have after seven days in a conventional (i.e., non-insulated) concrete form under ambient conditions. In another disclosed embodiment, the preferred concrete mix cured in accordance with the present invention has a compressive strength at least 50%, at least 100%, at least 150%, at least 200%, at least 250% or at least 300% greater than the same concrete mix would have after seven days in a conventional (i.e., non-insulated) concrete form under the same conditions.

In another disclosed embodiment of the present invention, the preferred cementitious material comprises portland cement, slag cement and fly ash in amounts such that at seven days the concrete mix cured in accordance with the present invention has a compressive strength at least 25% greater than the same concrete mix would have after seven days in a conventional concrete form under ambient conditions. In another disclosed embodiment the preferred concrete mix cured in accordance with the present invention has a compressive strength at least 50%, at least 100%, at least 150%, at least 200%, at least 250% or at least 300% greater than the same concrete mix would have after seven days in a conventional (i.e., non-insulated) concrete form under the same conditions.

In another disclosed embodiment of the present invention, the preferred cementitious material comprises portland cement and slag cement in amounts such that at seven days the concrete mix cured in accordance with the present invention has a compressive strength at least 25% greater than the same concrete mix would have after seven days in a conventional concrete form under ambient conditions. In another disclosed embodiment, the preferred concrete mix cured in accordance with the present invention has a compressive strength at least 50%, at least 100%, at least 150%, at least 200%, at least 250% or at least 300% greater than the same concrete mix would have after seven days in a conventional (i.e., non-insulated) concrete form under the same conditions.

In another disclosed embodiment of the present invention, the preferred cementitious material comprises portland cement and fly ash in amounts such that at seven days the concrete mix cured in accordance with the present invention has a compressive strength at least 25% greater than the same concrete mix would have after seven days in a conventional concrete form under ambient conditions. In another disclosed embodiment the preferred concrete mix cured in accordance with the present invention has a compressive strength at least 50%, at least 100%, at least 150%, at least 200%, at least 250% or at least 300% greater than the same concrete mix would have after seven days in a conventional (i.e., non-insulated) concrete form under the same conditions.

As a part of the present invention, it has been found that concrete, mortar or other cementitious-based materials, especially polymer modified concrete, will bond quite securely with expanded polystyrene foam that has not been formed in a mold so that the surface of the foam does not have a polished or shinny surface. Suitable polystyrene foam can be obtained by cutting, such as with a knife blade, a saw or a hot wire, foam panels of a desired thickness from a larger block of polystyrene foam. The bond between the concrete, mortar or other cementitious-based materials and polystyrene foam is also enhanced by using the concrete mix comprising portland cement, slag cement and fly ash, as disclosed above. Furthermore, the bond between the concrete, mortar or other cementitious-based materials and polystyrene foam is also enhanced by curing the concrete, mortar or other cementitious-based materials in insulated concrete forms or molds, as disclosed herein. Additionally, the bond between the concrete, mortar or other cementitious-based materials and polystyrene foam is also enhanced by curing the concrete, mortar or other cementitious-based materials at elevated temperatures, such as produced by the insulated concrete forms, electrically heated blankets, electrically heated concrete forms or steam curing, for example above 100° F. (approximately 35° C.), preferably at approximately 60 to 65° C., for an extended period of time, such as 1 day to 3 days; preferably, 1 day to 7 days. Under these conditions, the concrete, mortar or other cementitious-based materials and polystyrene foam seem to fuse together. Especially stronger bonds are formed between expanded polystyrene foam panels cut from a larger molded block. When cutting the expanded polystyrene foam panels, the individual polystyrene cells are cut creating interstitial space. In contact with and under the concrete pressure, the interstitial space is filled with concrete at an elevated temperature. Since the expanded polystyrene melting point is between 140-180° F., the concrete pressure and elevated temperature retained by the insulated concrete form, filling the interstitial space between the polystyrene cells, create a temperature induced fusion between the foam and the concrete. It is believed that the concrete heat of hydration retained by the insulated concrete form reaches a temperature close, but slightly below the polystyrene melting point temperature, thereby creating a heat fusion and achieving a far greater bond between the foam and the concrete. In fact, the bond between the concrete, mortar or other cementitious-based materials and polystyrene foam, as disclosed above, is so strong that the bond between individual polystyrene foam beads will fail before the bond between the concrete, mortar or other cementitious-based materials and the polystyrene foam.

It is specifically contemplated that the cementitious-based material from which the concrete 390 is made can include reinforcing fibers made from material including, but not limited to, steel, plastic polymers, glass, basalt, Wollastonite, carbon, and the like. The use of reinforcing fiber is particularly preferred in the concrete 390 made from polymer modified concrete, mortar and plasters, which provide the concrete wall in accordance with the present invention improved flexural strength, as well as improved wind load capability and blast and seismic resistance.

The concrete form system of the present invention provides a very versatile building system. And, unlike the modular insulated concrete forms of the prior art, the concrete form system of the present invention provides a building system that can perform all of the same tasks as conventional steel and/or wood concrete form systems, including building high-rise buildings.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A form for concrete comprising:

a removable concrete form panel;

a foam insulating panel spaced from the removable concrete form panel defining a space therebetween, wherein the foam insulating panel has a first primary surface and an opposite second primary surface;

a plurality of anchor members extending through the foam insulating panel and extending outwardly from the first primary surface into the space between the removable concrete form panel and the foam insulating panel whereby an end of each of the plurality of anchor members is disposed between the foam insulating panel and the removable concrete form panel;

an elongate hollow sleeve disposed between the removable concrete form panel and the foam insulating panel;

a first rod extending through the foam insulating panel and into the elongate hollow sleeve; and an elongate panel bracing member supporting the foam insulating panel.

2. The form of claim 1 further comprising:

a second rod extending through the removable concrete form panel and into the elongate hollow sleeve.

3. The form of claim 2, wherein an end of the first rod is attached to the elongate panel bracing member.

4. The form of claim 3, wherein an end of the second rod is attached to a frame member of the removable concrete form panel.

5. The form of claim 1, wherein each of the plurality of anchor members has a first end and an opposite second end and wherein a flange is disposed adjacent the first end and extends radially outwardly therefrom and wherein the flange contacts the second primary surface of the foam insulating panel.

6. The form of claim 5, wherein each of the plurality of anchor members has an enlarged portion adjacent the second end disposed between the foam insulating panel and the removable concrete form panel.

7. The form of claim 5 further comprising a layer of reinforcing material on the second primary surface of the foam insulating panel whereby at least a portion of the layer of reinforcing material is captured between the flange of each of the plurality of anchor members and the second primary surface of the foam insulating panel.

8. The form of claim 7, wherein the layer of reinforcing material is a discontinuous material.

9. The form of claim 8, wherein the layer of reinforcing material is a fabric, a mesh or a web.

10. The form of claim 9, wherein the fabric, mesh or web is made from polymer fibers, fiberglass, basalt fibers, aramid fibers, or carbon fibers.

11. The form of claim 7, wherein the layer of reinforcing material is a fiberglass mesh.

12. The form of claim 1, wherein the removable concrete form panel is a removable insulated concrete form panel.

13. The form of claim 1, wherein the removable concrete form panel is a removable electrically heated concrete form panel.

14. The form of claim 1, wherein the removable concrete form panel comprises:

a face panel having a first primary surface for contacting plastic concrete and a second primary surface opposite the first primary surface, wherein the face panel is made from a heat conducting material; and an electric heating element in thermal contact with the second primary surface of the face panel.

15. The form of claim 1, wherein the foam insulating panel has an R-value of greater than 4.

16. The form of claim 12, wherein the removable insulated concrete form panel has an R-value of greater than 4.

17. The form of claim 12, wherein the removable insulated concrete form panel has an R-value of greater than 4 and the foam insulating panel has an R-value of greater than 4.

18. The form of claim 12, wherein the removable insulated concrete form panel has an R-value of greater than 4 and the foam insulating panel has an R-value of greater than 8.

* * * * *